US008025408B2

(12) United States Patent
Sato et al.

(10) Patent No.: US 8,025,408 B2
(45) Date of Patent: Sep. 27, 2011

(54) METHOD, APPARATUS AND PROGRAM FOR IMAGE PROCESSING AND METHOD AND APPARATUS FOR IMAGE SYNTHESIZING

(75) Inventors: Satoshi Sato, Osaka (JP); Katsuhiro Kanamori, Nara (JP)

(73) Assignee: Panasonic Corporation, Osaka (JP)

( * ) Notice: Subject to any disclaimer, the term of this patent is extended or adjusted under 35 U.S.C. 154(b) by 9 days.

(21) Appl. No.: 12/672,940

(22) PCT Filed: May 15, 2009

(86) PCT No.: PCT/JP2009/002165
§ 371 (c)(1),
(2), (4) Date: Feb. 10, 2010

(87) PCT Pub. No.: WO2010/004677
PCT Pub. Date: Jan. 14, 2010

(65) Prior Publication Data
US 2010/0303344 A1    Dec. 2, 2010

(30) Foreign Application Priority Data

Jul. 8, 2008   (JP) .................................. 2008-178025

(51) Int. Cl.
*G06K 9/00* (2006.01)
(52) U.S. Cl. ............ 353/20; 353/28; 353/121; 382/162; 382/167; 356/364
(58) Field of Classification Search .................... 353/28, 353/121, 122; 382/162–167, 173; 356/364, 356/369, 416, 419
See application file for complete search history.

(56) References Cited

U.S. PATENT DOCUMENTS

| 5,028,138 | A   |   | 7/1991  | Wolff           |         |
|-----------|-----|---|---------|-----------------|---------|
| 6,545,265 | B1  | * | 4/2003  | Czarnetzki et al. | 250/234 |
| 7,136,217 | B2  |   | 11/2006 | Kawakami et al. |         |
| 7,336,810 | B2  |   | 2/2008  | Fujii et al.    |         |

(Continued)

FOREIGN PATENT DOCUMENTS

JP    11-041514    2/1999

(Continued)

OTHER PUBLICATIONS

International Search Report for corresponding application No. PCT/JP2009/002165 dated Aug. 25, 2009.

(Continued)

*Primary Examiner* — William C Dowling
(74) *Attorney, Agent, or Firm* — Renner, Otto, Boisselle & Sklar, LLP

(57) ABSTRACT

An image processing apparatus captures an object's image and separates the object's image into multiple components. The apparatus includes: a light projecting section 101 for projecting light emitted from a light source toward the object; a color and polarization obtaining section 102 for getting a color polarized image of the object; a polarization information processing section 104 for generating color and polarization information based on an association between the intensity of the light that has been transmitted through a polarizer with three or more polarization principal axis directions and the polarization principal axis directions for each of unit pixels that form the color polarized image; a light source color information collecting section 105 for collecting color information of the light source; and an image component separating section 106 for separating the color image into multiple components based on the polarization information and the color information of the light source.

19 Claims, 47 Drawing Sheets

U.S. PATENT DOCUMENTS

| | | | | |
|---|---|---|---|---|
| 7,688,363 | B2* | 3/2010 | Sato et al. | 348/240.2 |
| 7,792,367 | B2* | 9/2010 | Kanamori et al. | 382/224 |
| 2007/0223887 | A1 | 9/2007 | Kanamori et al. | |
| 2008/0151194 | A1* | 6/2008 | Segev | 353/28 |
| 2008/0240606 | A1* | 10/2008 | Yamaguchi | 382/274 |
| 2009/0290039 | A1* | 11/2009 | Kanamori et al. | 348/222.1 |
| 2010/0002923 | A1* | 1/2010 | Jiang et al. | 382/128 |
| 2010/0013965 | A1* | 1/2010 | Pugh et al. | 348/254 |
| 2010/0119150 | A1* | 5/2010 | Kanai | 382/167 |
| 2010/0290713 | A1* | 11/2010 | Kanamori et al. | 382/254 |
| 2010/0296724 | A1* | 11/2010 | Chang et al. | 382/154 |
| 2010/0303344 | A1* | 12/2010 | Sato et al. | 382/162 |

FOREIGN PATENT DOCUMENTS

| | | |
|---|---|---|
| JP | 11-211433 | 8/1999 |
| JP | 2005-004468 | 1/2005 |
| JP | 2005-333336 | 12/2005 |
| JP | 2006-254331 | 9/2006 |
| JP | 2007-174689 | 7/2007 |
| WO | 2007/006630 A1 | 1/2007 |

OTHER PUBLICATIONS

Y Sato et al., "Object Shape and Reflectance Modeling from Observation", SIGGRAPH 97, pp. 379-387, 1997 (cited in [0003], p. 2 of the specification).

Daisuke Miyazaki et al., "Wavelet-Texture Method: BTF Compression by Using Daubechies Wavelet, Parametric Reflection Model and Circular Polarizer", Transaction of the Institute of Electronics, Information and Communication Engineers, vol. J90-D, No. 8, pp. 2081-2093, 2007 and concise explanation (cited in [0003], p. 2 of the specification).

T. Shibata et al., "Creating Photorealistic Virtual Model with Polarization-based Vision System" in Proceedings of SPIE (Polarization Science and Remote Sensing II, Part of SPIE's International Symposium on Optics and Photonics 2005), vol. 5888, pp. 25-35, 2005 (cited in [0003], p. 2 of the specification).

K. Nayar et al., "Separation of Reflection Components Using Color and Polarization", International Journal of Computer Vision, vol. 21, Iss. 3, pp. 163-186, 1997 (cited in [0010], p. 6 of the specification).

T. Kawashima et al., "Development of polarization imaging device and applications by using patterned polarizer", Institute of Electronics, Information and Communication Engineers of Japan, National Conference 2006, No. D-11-52, p. 52, 2006 (cited in [0060], p. 43 of the specification).

Masayuki Kanbara and Naokazu Yokoya, "Geometric and Photometric Registration for Vision-based Augmented Reality", Technical Report of the Institute of Electronics, Information and Communication Engineers, Pattern Recognition and Media Understanding, PRMU 2002-190, pp. 1(7)-7(12), 2003 (cited in [0092], p. 58 of the specification).

L.B. Wolff and T.E. Boult, "Constraining Object Features Using a Polarization Reflectance Model", IEEE Transactions on Pattern Analysis and Machine Intelligence, vol. 13, No. 7, pp. 635-657, 1991 (cited in [0100], p. 62 of the specification).

Jianbo Shi and Carlo Tomasi, "Good Features to Track", IEEE Conference on Computer Vision and Pattern Recognition, pp. 593-600, 1994 (cited in [0136], p. 83 of the specification).

Daisuke Miyazaki and Katsushi Ikeuchi, "A Method to Estimate Surface Shape of Transparent Objects by Using Polarization Raytracing Method", Transaction of the Institute of Electronics, Information and Communication Engineers, vol. J88-D-II, No. 8, pp. 1432-1439, 2005 (cited in [0165], p. 103 of the description) and a concise explanation.

H. Hayakawa, "Photometric Stereo under a light source with arbitrary motion", Journal of the Optical Society of America A, vol. 11, No. 11, pp. 3079-3089, 1994 (cited in [0166], p. 104 of the specification).

Noboru Ota, "Fundamentals of Color Reproduction Optics", pp. 90-92, Corona Publishing Co., Ltd. (cited in [0204], p. 123 of the specification) and a concise explanation.

K. Ikeuchi and K. Sato, "Determining Reflectance Properties of an Object Using Range and Brightness Images", IEEE Transactions on Pattern Analysis and Machine Intelligence, vol. 13, No. 11, pp. 1139-1153, 1991 (cited in [0227], p. 135 of the specification).

* cited by examiner

FIG. 11
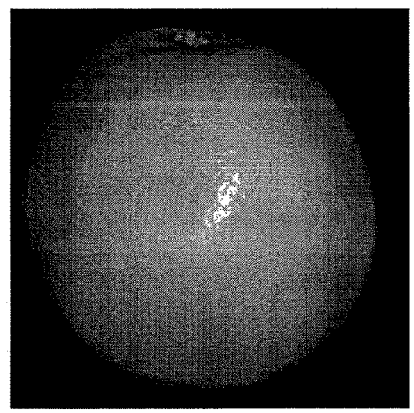
(a)
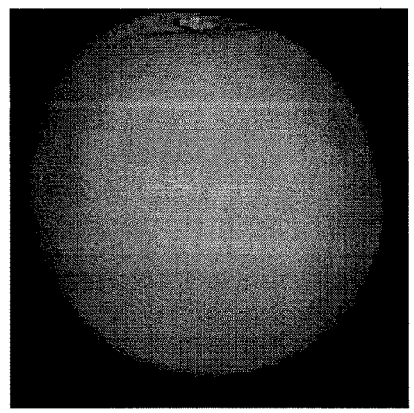
(b)  Imin(x,y)
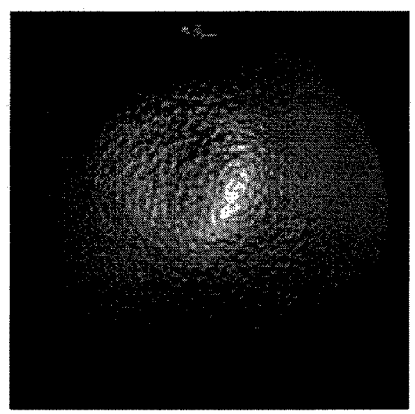
(c)  Iamp(x,y)
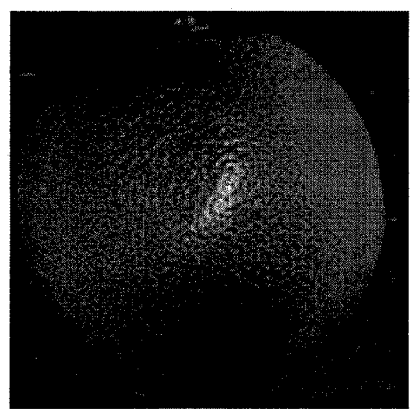
(d) DIFFUSE REFLECTION POLARIZED COMPONENT
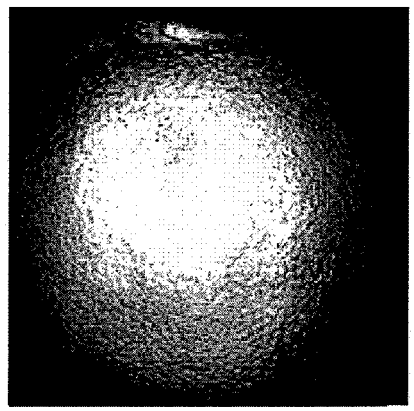
(e) SPECULAR REFLECTION POLARIZED COMPONENT
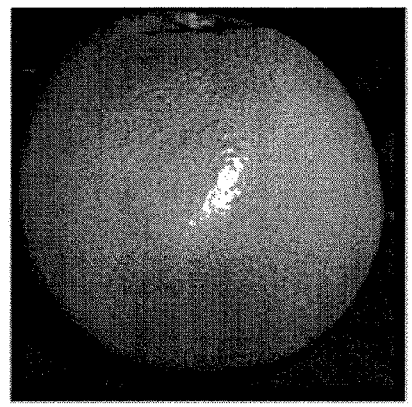
(f) DIFFUSE REFLECTION COMPONENT

FIG. 19

|  |  | COLOR INFORMATION ||
|---|---|---|---|
|  |  | LIGHT SOURCE COLOR VECTOR | POLARIZATION MINIMUM COLOR VECTOR |
| POLARIZATION INFORMATION | POLARIZED LIGHT | SPECULAR REFLECTION POLARIZED COMPONENT | DIFFUSE REFLECTION POLARIZED COMPONENT |
|  | NON-POLARIZED LIGHT | DIFFUSE REFLECTION NON-POLARIZED COMPONENT ||

FIG. 20

|  |  | COLOR INFORMATION ||
|---|---|---|---|
|  |  | LIGHT SOURCE COLOR VECTOR | POLARIZATION MINIMUM COLOR VECTOR |
| POLARIZATION INFORMATION | POLARIZED LIGHT | SPECULAR REFLECTION COMPONENT | DIFFUSE REFLECTION COMPONENT |
|  | NON-POLARIZED LIGHT | DIFFUSE REFLECTION COMPONENT ||

FIG. 22

| COLOR INFORMATION | LIGHT SOURCE COLOR VECTOR | POLARIZATION MINIMUM COLOR VECTOR |
|---|---|---|
| SEPARATION RESULT | SPECULAR REFLECTION COMPONENT | DIFFUSE REFLECTION COMPONENT |

FIG. 24

|  |  |  | | COLOR INFORMATION | |
|---|---|---|---|---|---|
|  |  |  | | LIGHT SOURCE COLOR VECTOR | POLARIZATION MINIMUM COLOR VECTOR |
| INTENSITY | HIGH | POLARIZATION INFORMATION | POLARIZED LIGHT | SPECULAR REFLECTION POLARIZED AREA | DIFFUSE REFLECTION POLARIZED AREA |
|  |  |  | NON-POLARIZED LIGHT | DIFFUSE REFLECTION NON-POLARIZED AREA | |
|  | LOW |  | | SHADOW AREA | |

*FIG. 45*
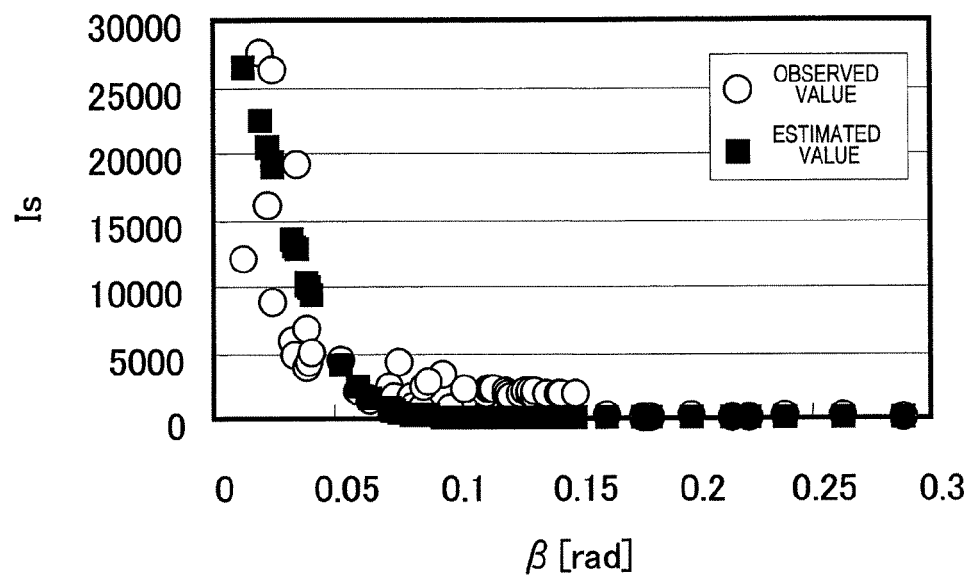
(a)
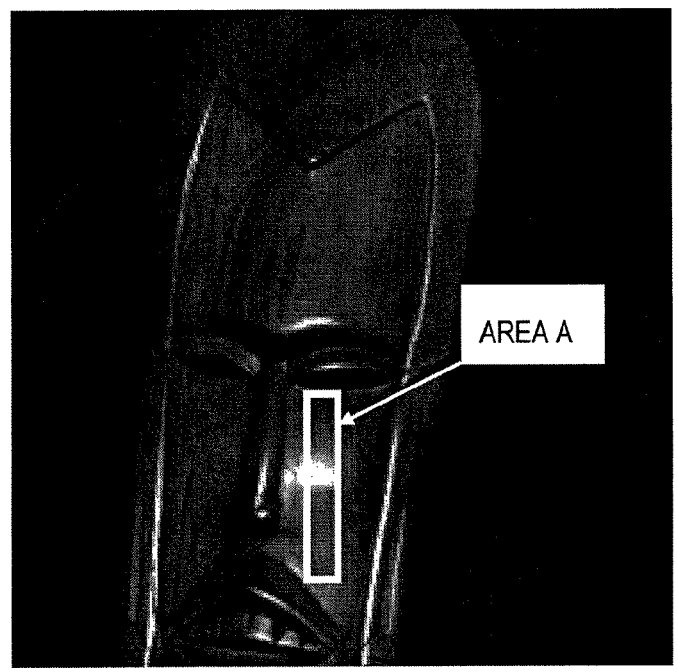
(b)

*FIG. 48*

| PIXEL LOCATION(x,y) | ... | (100,200) | ... |
|---|---|---|---|
| ALBEDO $\rho d$ (PSEUDO-ALBEDO $t_f \rho_{dp}$) | ... | (200,200,100) | ... |
| SPECULAR REFLECTION COMPONENT COEFFICIENT ks | ... | 0.8 | ... |
| REFRACTIVE INDEX $\eta$ | ... | 1.4 | ... |
| SPARSENESS m | ... | 0.3 | ... |
| NORMAL x DIRECTION nx | ... | 0.43 | ... |
| NORMAL y DIRECTION ny | ... | 0.31 | ... |
| NORMAL z DIRECTION nz | ... | -0.85 | ... |

METHOD, APPARATUS AND PROGRAM FOR IMAGE PROCESSING AND METHOD AND APPARATUS FOR IMAGE SYNTHESIZING

TECHNICAL FIELD

The present invention generally relates to an image processing technology and more particularly relates to a technique for increasing the accuracy of image division that needs to be done to obtain information about the shape of an object and to synthesize an image.

BACKGROUND ART

It is known that the "appearance" of an object is determined by a number of components including a specular reflection component, which is a part of incoming light that has been reflected from the object and then sensed as a sort of "gloss", and a diffuse reflection component, which is sensed after the incoming light has been scattered a number of times inside the object. That is to say, every image of an object that we view daily is normally the sum of various components of the light that strike our eyes after having gone through multiple different courses from the object. And examples of those components include the "specular reflection component" and the "diffuse reflection component". That is why as for a huge number of pixels that form an object's image, their light intensities may be graded according to their "specular reflection components" and "diffuse reflection components". Specifically, pixels, of which the specular reflection component dominates, may be treated as pixels that form a "specular reflection region", while pixels, of which the diffuse reflection component dominates, may be treated as pixels that form a "diffuse reflection region".

Recently, in order to compress given information and archive it digitally or to obtain information about the shape and surface property of an object, an image component separating technique, by which a given image is separated into those various components (and which will be simply referred to herein as an "image separation technique"), has been adopted more and more often (see Non-Patent Documents Nos. 1, 2 and 3). Such an image separation is done more and more frequently because processing could be carried out more accurately on a component by component basis, compared to a situation where the entire image is subjected to the same processing collectively. For example, if someone needs to know what impact reflection of incoming light from an object's surface will have, it is very important to separate the incoming light into a component of the light that is being transmitted from inside of the object and a component of the light that is being reflected from the object's surface. And a technique for estimating the ratio of those components in a given image and separating the image into them on a pixel-by-pixel basis is the image component separating technique (or simply an "image separation technique").

As a technique using such image separation, a so-called "model based image processing" technique for representing those separated image components on their own models is well known in the art.

In particular, a "model based image synthesis" is a technique that is used extensively in the field of computer graphics (CG). According to that technique, the appearance of a given object is modeled as a function of the respective locations of a viewpoint and a light source and a normal to the object, thereby performing various kinds of image processing to obtain a viewpoint changed image, which represents how the same object would look when viewed from a different viewpoint from the one for shooting, or a light source environment changed image, which represents how the same object would look when irradiated with a light source at a different location from the one for shooting. In addition, since an image can be represented using only model parameters, data can be compressed efficiently, too. For example, a technique for separating a given image into a specular reflection component and a diffuse reflection component and modeling those specular and diffuse reflection components after the Cook-Torrance model and the Lambertian model, respectively, is known.

Various techniques for separating a given image into a specular reflection component and a diffuse reflection component have been known so far. Among other things, techniques that use polarization information and techniques that use color information have been researched extensively these days because the given image can be separated into specular and diffuse reflection components with a simple device according to such techniques.

According to the separation technique using the polarization information, linearly polarized light is projected toward an object and a polarization filter, which is arranged between a camera and the object, is rotated within a plane that intersects with the optical axis at right angles, thereby separating the light reflected from the object into a specular reflection component and a diffuse reflection component (see Patent Document No. 1, for example).

It is known that if the angle of rotation of a linear polarization filter (which is also called a "polarization principal axis angle" that is an angle defining the polarization principal axis direction) is identified by $\phi$, then the light intensity at each of the pixels of an image viewed varies like a sin function with respect to the angle of rotation $\phi$. If the amplitude component and bias component of that sin function are used as a "specular reflection component" and a "diffuse reflection component", respectively, the image can be separated. That is to say, the specular and diffuse reflection components can be obtained quantitatively for each of multiple pixels that form the image.

According to such a technique, however, in a region where the angle of emittance is rather great (near the occluding edge), a specular reflection component that should not be present there would be detected anyway as will be described later. That problem prevents the specular/diffuse reflection component separating technique using the polarization information from achieving sufficiently high accuracy.

Meanwhile, a technique using color information is known widely as a dichroic reflection model (see Non-Patent Document No. 4, for example). This is a technique for separating light into a specular reflection component and a diffuse reflection component by paying attention to the fact that the color vector of a specular reflection component is observed as a light source color vector but the color vector of a diffuse reflection component is observed as an object color vector. In general, the light source color vector is already known because the color is often white or observed by another technique. According to that technique, however, unless the object color vector of the object is known, the light cannot be separated into specular and diffuse reflection components unambiguously. For that reason, such a technique cannot be used to separate light into a specular reflection component and a diffuse reflection component accurately.

And it is known that such inaccurate separation into specular and diffuse reflection components should be a grave issue when a model-based image synthesis, which is adopted in the fields of digital archiving and augmented reality, needs to be carried out.

Citation List

Patent Literature

Patent Document No. 1: Japanese Patent Application Laid-Open Publication No. 11-41514

Non-Patent Literature

Non-Patent Document No. 1: Y. Sato, M. D. Wheeler, and K. Ikeuchi, "Object Shape and Reflectance Modeling from Observation", SIGGRAPH 97, pp. 379-387, 1997

Non-Patent Document No. 2: Daisuke Miyazaki, Takushi Shibata and Katsushi Ikeuchi, "Wavelet-Texture Method: BTF Compression Using Daubechies Wavelet, Parametric Reflection Model and Circular Polarizer", Transaction of the Institute of Electronics, Information and Communication Engineers, Vol. J90-D, No. 8, pp. 2081-2093, 2007

Non-Patent Document No. 3: T. Shibata, T. Takahashi, D. Miyazaki, Y. Sato, and K. Ikeuchi, "Creating Photorealistic Virtual Model with Polarization Based Vision System", in Proceedings of SPIE (Polarization Science and Remote Sensing II, Part of SPIE's International Symposium on Optics and Photonics 2005), Vol. 5888, pp. 25-35, 2005

Non-Patent Document No. 4: S. K. Nayar, X. S. Fang, and T. Boult, "Separation of Reflection Components Using Color and Polarization", International Journal of Computer Vision, Vol. 21, Iss. 3, pp. 163-186, 1997

SUMMARY OF INVENTION

Technical Problem

According to the technique as disclosed in Patent Document No. 1 that uses polarization information, a specular reflection component that should not be observed near the occluding edge would be detected there anyway. Also, according to the technique disclosed in Non-Patent Document No. 4 that uses color information, since the object color vector is unknown to begin with, it is impossible to separate light into specular and diffuse reflection components unambiguously using such a dichroic reflection model.

Those problems will get more and more serious as the dynamic range of cameras, which has already been expanded remarkably recently, is further expanded in the near future. As conventional cameras do not have a sufficiently high dynamic range of light intensities, the degree of polarization of diffuse reflection has rarely been observed. Recently, however, the dynamic range of cameras has been further expanding, thus decreasing the degree of accuracy of separation as described above.

It is therefore an object of the present invention to provide an image processing technique that contributes to getting light component separation done more accurately by using the color information of a light source with the presence of such polarization component of diffuse reflection taken into account.

Solution to Problem

An image processing apparatus according to the present invention is designed to capture an object's image and separate the object's image into multiple components. The apparatus includes: a light projecting section for projecting linearly polarized light, which has been emitted from a light source, toward the object; a color and polarization obtaining section for getting a color polarized image of the object; a polarization information processing section for generating color and polarization information based on an association between the intensity of the light that has been transmitted through a polarizer with three or more polarization principal axis directions and the polarization principal axis directions for each of unit pixels that form the color polarized image; a light source color information collecting section for collecting color information of the light source; and an image component separating section for separating the image into multiple components based on the color and polarization information and the color information of the light source.

In one preferred embodiment, the image processing apparatus includes a color information processing section for generating a color image based on the color polarized image, and the image component separating section separates the color image into multiple components.

In another preferred embodiment, the color and polarization obtaining section includes: a polarizer that has three or more different polarization principal axis directions; a color filter, which is arranged so as to face the polarizer; and an image sensor that receives light that has been transmitted through the polarizer and the color filter.

In this particular preferred embodiment, the polarization information processing section generates at least one of a polarization minimum color component and a polarization amplitude color component as the color and polarization information.

In a specific preferred embodiment, the image component separating section separates the color vector of each of the pixels that form the object's image into a diffuse reflection component and a specular reflection component.

In an alternative preferred embodiment, the image component separating section separates the color vector of each of the pixels that form the object's image into a diffuse reflection non-polarized component, a diffuse reflection polarized component and a specular reflection polarized component.

In a more specific preferred embodiment, the image component separating section separates at least a portion of the object's image as a shadow area.

In another preferred embodiment, the image component separating section separates the color and polarization information into the respective color vectors of the light source and the polarization minimum color component.

In this particular preferred embodiment, the image component separating section separates the polarization amplitude color component into the respective color vectors of the light source and the polarization minimum color component.

In another preferred embodiment, the image component separating section separates the color image into the respective color vectors of the light source and the polarization minimum color component.

In still another preferred embodiment, the color and polarization obtaining section performs synchronized processing with the light projecting section.

In yet another preferred embodiment, the light projecting section is characterized by being spaced apart from the color and polarization obtaining section.

An image processing system according to the present invention includes a projector and an image processing apparatus and captures an object's image and separates the object's image into multiple components. The projector includes a light projecting section for projecting linearly polarized light, which has been emitted from a light source, toward the object. The image processing apparatus includes: a color and polarization obtaining section for getting a color polarized image of the object by receiving light that has been transmitted through a polarizer with three or more different polarization principal axis directions at a color filter; a color information processing section for generating a color image based on the color polarized image; a polarization information processing section for generating color and polarization information based on an association between the intensity of the light that has been transmitted through the polarizer and the polarization principal axis directions for each of unit pixels that form the color polarized image; a light source color information collecting section for collecting color information of the light source; and an image component separating section for separating the color image into multiple components by reference to the color and polarization information and the color information of the light source.

An image processing system according to the present invention includes a projector and an image processing apparatus and captures an object's image and separates the object's image into multiple components. The projector includes: a light projecting section for projecting linearly polarized light, which has been emitted from a light source, toward the object; and a communication section for transmitting a signal indicating projection of light to the image processing apparatus. The image processing apparatus includes: a communication section for receiving the signal indicating the projection of the light from the projector; a color and polarization obtaining section for getting a color polarized image of the object by receiving light that has been transmitted through a polarizer with three or more different polarization principal axis directions at a color filter; a color information processing section for generating a color image based on the color polarized image; a polarization information processing section for generating color and polarization information based on an association between the intensity of the light that has been transmitted through the polarizer and the polarization principal axis directions for each of unit pixels that form the color polarized image; a light source color information collecting section for collecting color information of the light source; a light source color information collecting section for collecting color information of the light source; and an image component separating section for separating the color image into multiple components by reference to the color and polarization information and the color information of the light source.

In one preferred embodiment, the communication sections exchange not only the signal indicating projection of the light but also the color information of the light source, and the light source color information collecting section obtains the color information of the light source from the communication sections.

An image processing method according to the present invention is a method for capturing an object's image and separating the object's image into multiple components. The method includes the steps of: projecting linearly polarized light, which has been emitted from a light source, toward the object; getting a color polarized image of the object by receiving light that has been transmitted through a polarizer with three or more different polarization principal axis directions at a color filter; processing color information to generate a color image based on the color polarized image; processing polarization information to generate color and polarization information, which is color information about the polarized light received, based on an association between the intensity of the light that has been transmitted through the polarizer and the polarization principal axis directions for each of unit pixels that form the color polarized image; collecting color information of the light source; and separating the color image into multiple components by reference to the color and polarization information and the color information of the light source.

A program according to the present invention is intended to be used in an image processing apparatus that captures an object's image and separates the object's image into multiple components. The program has been defined to get the respective processing steps of the image processing method of the present invention executed by a computer.

A model-based image synthesizing apparatus according to the present invention includes a parameter estimator and an image synthesizer and synthesizes an images. The parameter estimator includes: an image capturing section for capturing an object's image; an image separating section for separating the image that has been captured by the image capturing section into multiple components by the image processing method of the present invention described above; a light source information estimating section for estimating light source information including information about at least one of the direction, position, intensity, color and spectrum of a light source that irradiates the object; a shape information collecting section for obtaining, as shape information, information about a normal to the object's surface or information about its three-dimensional position; a parameter estimating section for estimating a reflection model parameter by modeling the light source information that has been estimated by the light source information estimating section and the shape information that has been obtained by the shape information collecting section for each of the multiple components that have been separated by the image separating section with respect to the object's image captured; and a parameter DB for storing the reflection parameter that has been estimated by the parameter estimating section. The image synthesizer includes: a viewpoint/light source information collecting section for obtaining information about the viewpoints and light sources of an image to be synthesized; and a rendering section for synthesizing the image in accordance with the viewpoint and light source information that has been obtained by the viewpoint/light source information collecting section by using the reflection parameter that is stored in the parameter DB.

A model-based image synthesizing method according to the present invention includes a parameter estimating step and an image synthesizing step and is used to synthesize an image. The parameter estimating step includes: an image capturing step for capturing an object's image; an image separating step for separating the image that has been captured by the image capturing section into multiple components by the image processing method of claim 16; a light source information estimating step for estimating light source information; a shape information collecting step for obtaining, as shape information, information about a normal to the object's surface or information about its three-dimensional position; and a parameter estimating step for estimating a reflection model parameter for each of the multiple components that have been separated by the image separating section with respect to the object's image captured. The image synthesizing step includes the steps of: a viewpoint/light source information collecting step for obtaining information about the viewpoints and light sources of the image to be synthesized; and a rendering step for synthesizing the image in accordance with the viewpoint and light source information that has been obtained in the viewpoint/light source information collecting step by using the reflection parameter that has been estimated in the shape information collecting step.

Advantageous Effects of Invention

According to the image processing method of the present invention, two different kinds of information that are polarization information and color information are used, thus making it possible to accurately separate the image of each pixel into a specular reflection component and a diffuse reflection component. Also, if such a technique for separating an image into multiple components using the polarization information and the color information as two different kinds of information is used to estimate parameters in a model-based image synthesizing method, the image can be synthesized to produce a high-fidelity object's image.

BRIEF DESCRIPTION OF DRAWINGS

FIG. 11 shows results of an image component separation that was carried out in accordance with an image separating method according to the first preferred embodiment of the present invention.

FIG. 19 shows a component separation standard for an image component separating section according to the first preferred embodiment of the present invention.

FIG. 20 shows another component separation standard for the image component separating section of the first preferred embodiment of the present invention.

FIG. 22 shows another component separation standard for the image component separating section of the first preferred embodiment of the present invention.

FIG. 24 shows another component separation standard for the image component separating section of the first preferred embodiment of the present invention.

FIG. 45(a) is a graph showing relations between the intensity Is of a specular reflection component and the half-way vector β that were obtained by using the image processing apparatus of the first preferred embodiment of the present invention, and FIG. 45(b) shows an object's image.

FIG. 48 summarizes model parameters that are stored in a parameter DB in image synthesis processing according to a preferred embodiment of the present invention.

DESCRIPTION OF EMBODIMENTS

Hereinafter, preferred embodiments of the present invention will be described with reference to the accompanying drawings.

Embodiment 1

First of all, the Configuration of an Image processing apparatus as a first specific preferred embodiment of the present invention will be outlined.

Figure 1:
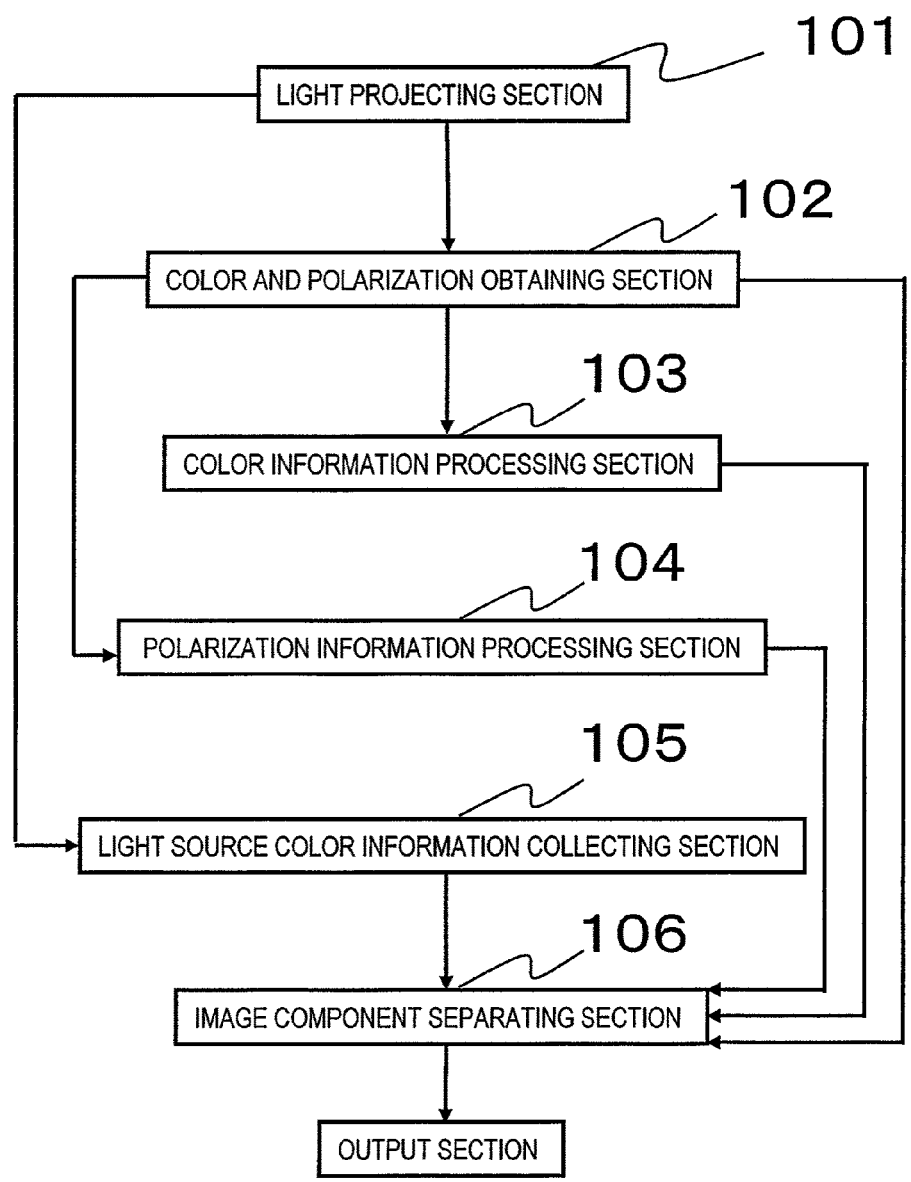
FIG. 1 is a block diagram illustrating an image processing apparatus as a first preferred embodiment of the present invention.

FIG. 1 is a block diagram illustrating an image processing apparatus as a first preferred embodiment. This image processing apparatus is designed to capture an object's image and separate the object's image into multiple components. The apparatus includes: a light projecting section 101 for projecting linearly polarized light toward the object; a color and polarization obtaining section 102 for getting a color polarized image of the object by receiving light that has been transmitted through a polarizer with three or more different polarization principal axis directions at a color filter; a color information processing section 103 for generating a color image based on the image obtained by the color and polarization obtaining section 102; a polarization information processing section 104 for generating, based on the image obtained by the color and polarization obtaining section 102, color and polarization information, which is the color information of the polarized light received, in accordance with an association with the intensity of the light that has been transmitted through the polarizer with the three or more directions for each of unit pixels that form the polarized image; a light source color information collecting section 105 for collecting color information of the light source that projects the light toward the object; an image component separating section 106 for separating the color image, generated by the color information processing section 103, into multiple components based on the polarization information generated by the polarization information processing section 104 and the light source color information obtained by the light source color information collecting section 105; and an output section for outputting a signal generated by the image component separating section 106.

As used herein, a "polarized image" means an image produced by the light that has been transmitted through a polarization filter (or polarizer) with a particular polarization principal axis angle. Thus, mutually different "polarized images" can be generated with respect to a number of polarization principal axis angles. Meanwhile, "color polarized images" refer herein to images to be generated by a number of light rays with mutually different dominant wavelengths in such light that has been transmitted through a polarization filter (or polarizer) with a particular polarization principal axis angle. Typically, based on the light that has been transmitted through a polarization filter (or polarizer) with a particular polarization principal axis angle, color polarized images of red (R), green (G) and blue (B) are generated. Once such color polarized images have been obtained, a color vector consisting of R, G and B intensities is defined on a unit pixel basis. Likewise, once a color image has been generated by the light that has not been transmitted through a polarization filter, the color vector of that color image is also determined. As used herein, the "component separation" corresponds to representing a single color vector as the sum of multiple color vectors (or components).

Figure 2:
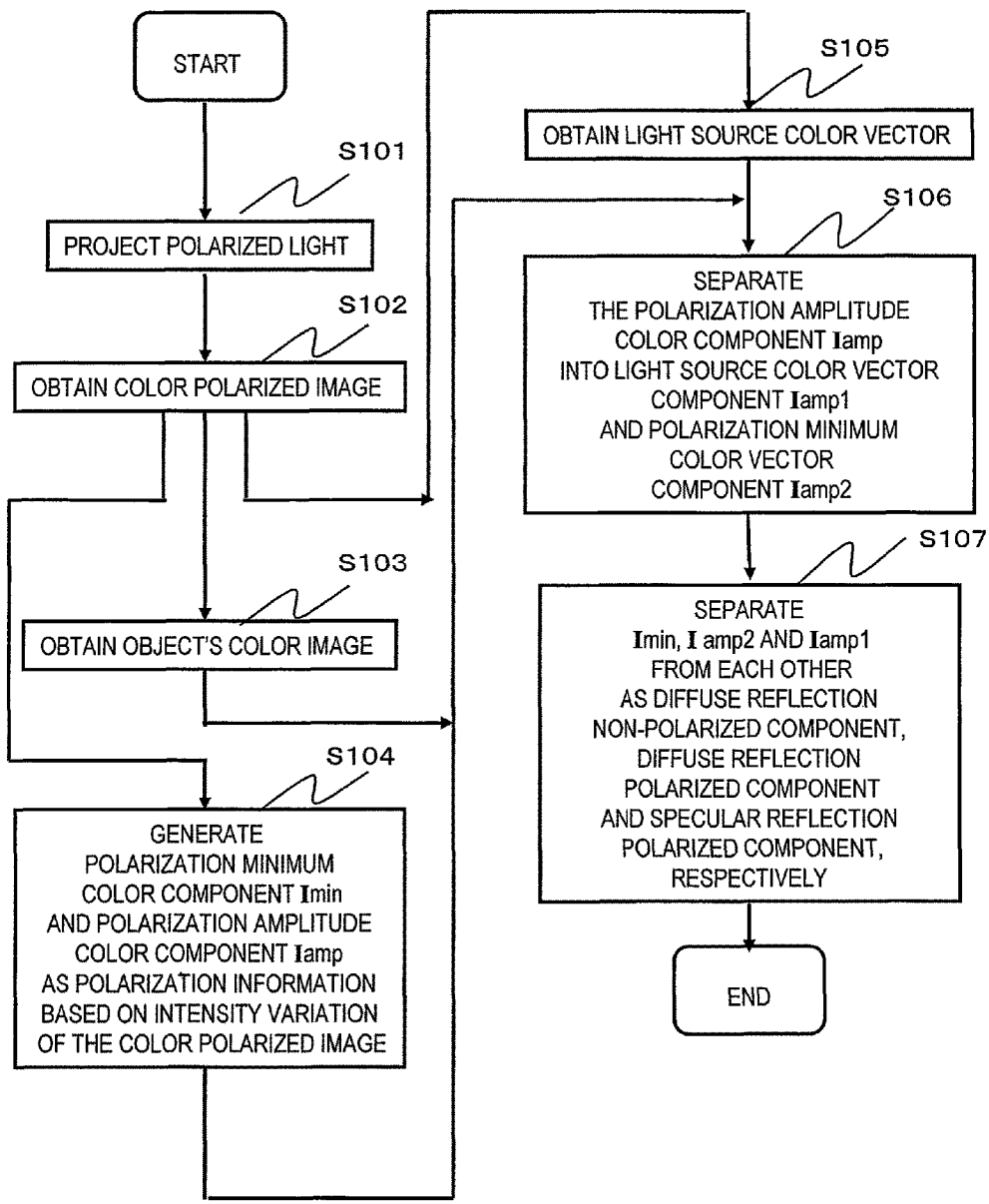
FIG. 2 is a flowchart showing the processing flow of an image separating method according to the first preferred embodiment of the present invention.

Hereinafter, it will be described how to get the image processing done according to this preferred embodiment. FIG. 2 is a flowchart illustrating how the image processing apparatus of this preferred embodiment operates. First of all, in Step S101 shown in FIG. 2, the light projecting section 101 projects polarized light toward an object. Next, in Step S102, the color and polarization obtaining section 102 receives the light reflected from the object at an image capture device by way of a patterned polarizer and a color filter, thereby obtaining a color polarized image with color and polarization information. As will be described later, the patterned polarizer has at least three polarization principal axis angles (i.e., the angles of rotation of the polarization transmission axis).

Next, in Step S103, the color information processing section 103 obtains color image information based on the information provided by the color and polarization obtaining section 102. The polarization information processing section 104 generates polarization minimum color component $I_{min}$ and polarization amplitude color component $I_{amp}$ as pieces of polarization information based on the information provided by the color and polarization obtaining section 102 (in Step S104). Meanwhile, the light source color information collecting section 105 obtains the color vector $I_{Light}$ of the light source that is now irradiating the object (in Step S105). It should be noted that these processing steps S103, S104 and S104 may be carried out in an arbitrary order and could be performed either in parallel with each other or sequentially.

Next, in Step S106, the image component separating section 106 separates the polarization amplitude color component $I_{amp}$, which has been generated by the polarization information processing section 104, into a polarization amplitude light source color vector component $I_{amp1}$ and a polarization amplitude polarization minimum color vector component $I_{amp2}$. Furthermore, in Step S107, the image component separating section 106 separates the color image into the polarization amplitude polarization minimum color component $I_{min}$, which has been generated by the polarization information ized component, the polarization amplitude polarization minimum color vector component $I_{amp2}$ as a diffuse reflection polarized component, and the polarization amplitude light source color vector component $I_{amp1}$ as a specular reflection polarized component.

Figure 3:
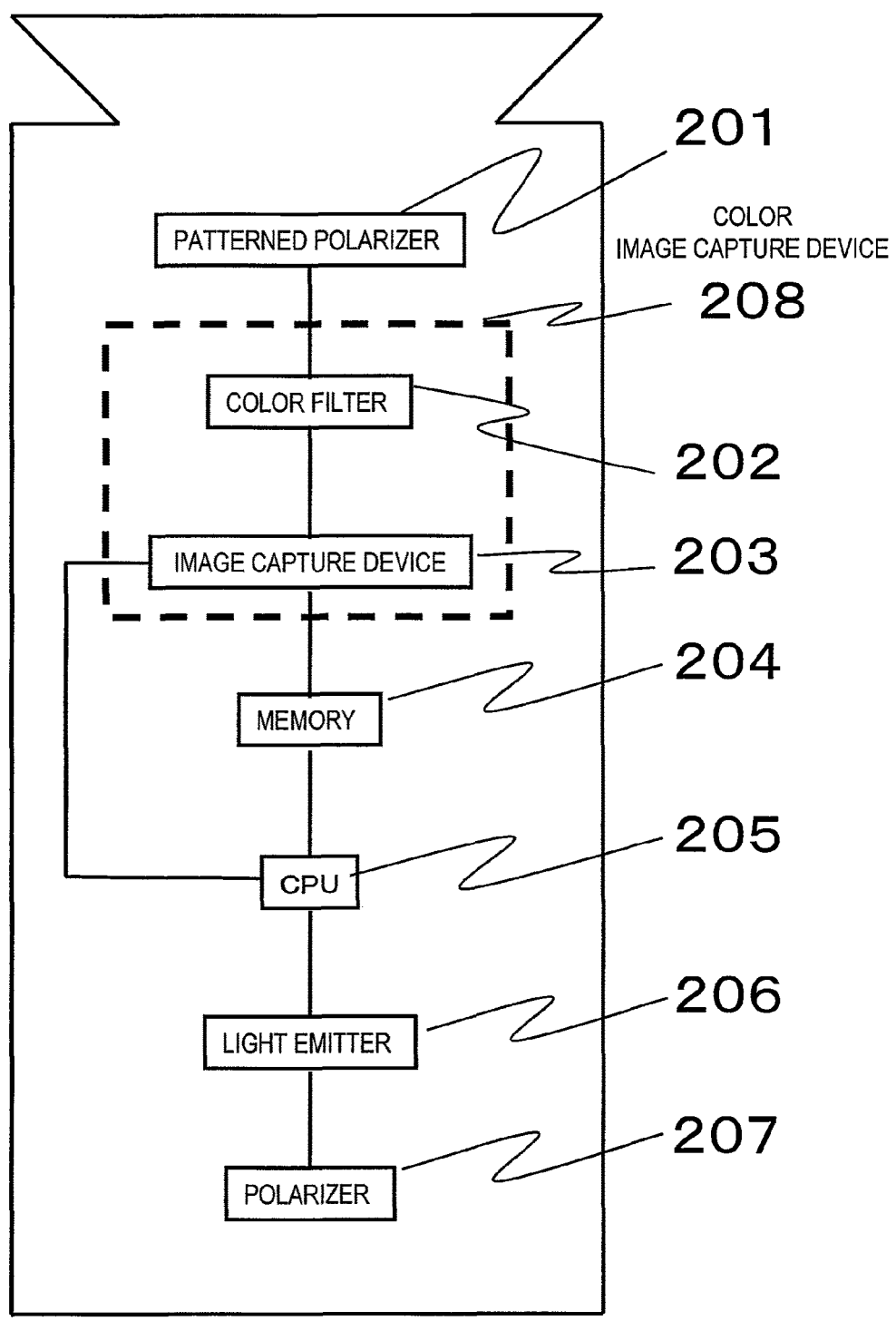
FIG. 3 illustrates an exemplary configuration for a camera in which the image processing apparatus of the first preferred embodiment of the present invention is built.

In this preferred embodiment, the color and polarization obtaining section 102, the color information processing section 103, the polarization information processing section 104, the light source color information collecting section 105 and the image component separating section 106 are implemented by getting a program executed by the CPU 205 shown in FIG. 3. However, part or all of those functions could be performed by using hardware components. Also, the memory 204 shown in FIG. 3 stores the information obtained by the color and polarization obtaining section 102, the color image information obtained by the color information processing section 103, the polarization information obtained by the polarization information processing section 104 and the light source color vector information obtained by the light source color information collecting section 105.

Next, the configuration and operation of a camera, in which the image processing apparatus of this preferred embodiment is built, will be described with reference to FIG. 3, which is a block diagram illustrating an exemplary configuration for such a camera. The camera shown in FIG. 3 includes a patterned polarizer 201, a color image capture device 208, a memory 204, a CPU 205, a light emitter 206, and a polarizer 207. The color image capture device 208 includes a color filter 202 and an image sensor capture device 203.

The light projecting section 101 projects polarized light toward the object by using the light emitter 206 and the polarizer 207. If a flashlight unit of the camera is used as the light emitter 206, such an operation can be done by arranging a polarization filter (i.e., the polarizer 207) in front of the flashlight unit. Alternatively, a liquid crystal polarizer may be used as a means for using the polarized light.

The color and polarization obtaining section 102 gets an object's image captured by the image sensor through the patterned polarizer 201 and the color filter 202, thereby obtaining a color polarized image, which is a color image with color and polarization information. Meanwhile, the color information processing section 103 obtains color image information based on the information provided by the color and polarization obtaining section 102. Furthermore, the polarization information processing section 104 obtains polarization information based on the information provided by the color and polarization obtaining section 102. Hereinafter, this processing will be described in detail.

Figure 4:
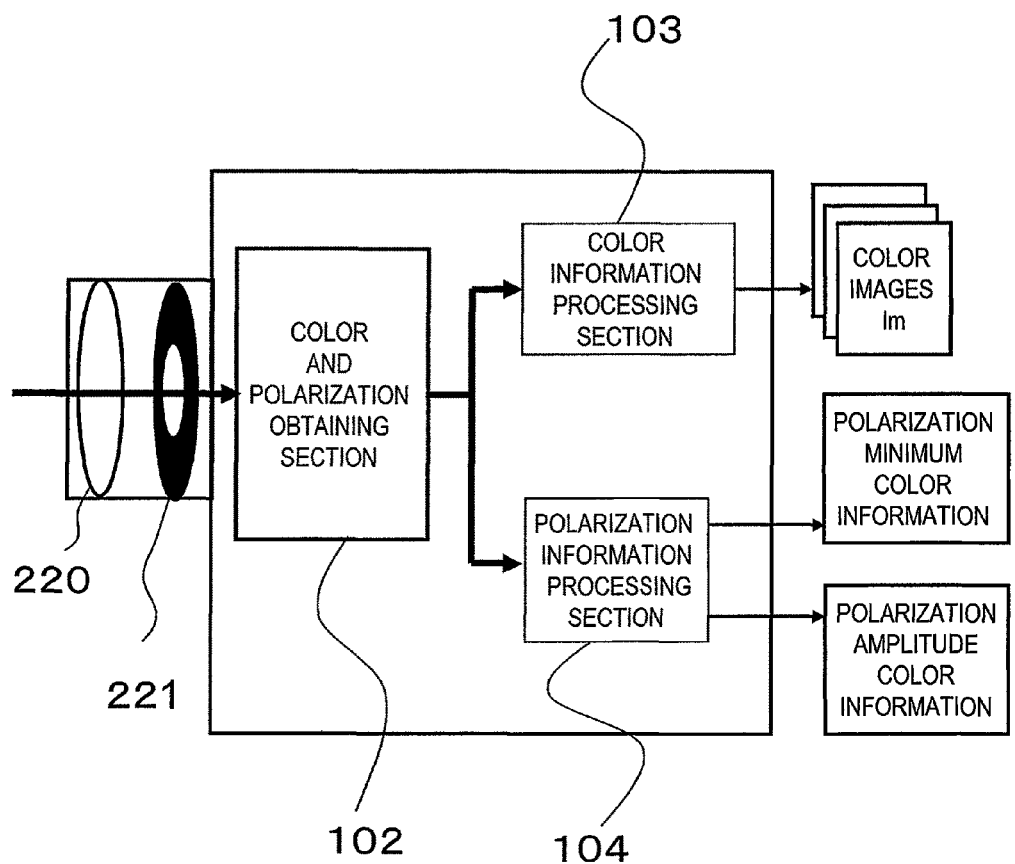
FIG. 4 is a block diagram illustrating a configuration for a color and polarization obtaining section, a color information processing section and a polarization information processing section Z according to the first preferred embodiment of the present invention.

FIG. 4 is a block diagram illustrating a configuration for the color and polarization obtaining section 102, the color information processing section 103 and the polarization information processing section 104. The apparatus of this preferred embodiment obtains not only color image information but also polarized image information from an object in real time, and outputs polarization minimum color information, which is a non-polarized component, as a piece of polarization information. After having passed through a lens 220 and an aperture 221, the incident light enters the color and polarization obtaining section 102. From this incident light, the color and polarization obtaining section 102 can obtain both color image information and polarized image information in real time. The color and polarization obtaining section 102 outputs a signal representing the color image information and a signal representing the polarization information to the color information processing section 103 and the polarization information processing section 104, respectively. In response, the color information processing section 103 and the polarization information processing section 104 subject those signals to various types of processing, thereby outputting color images Im and polarization minimum color information Imin.

Figure 5:
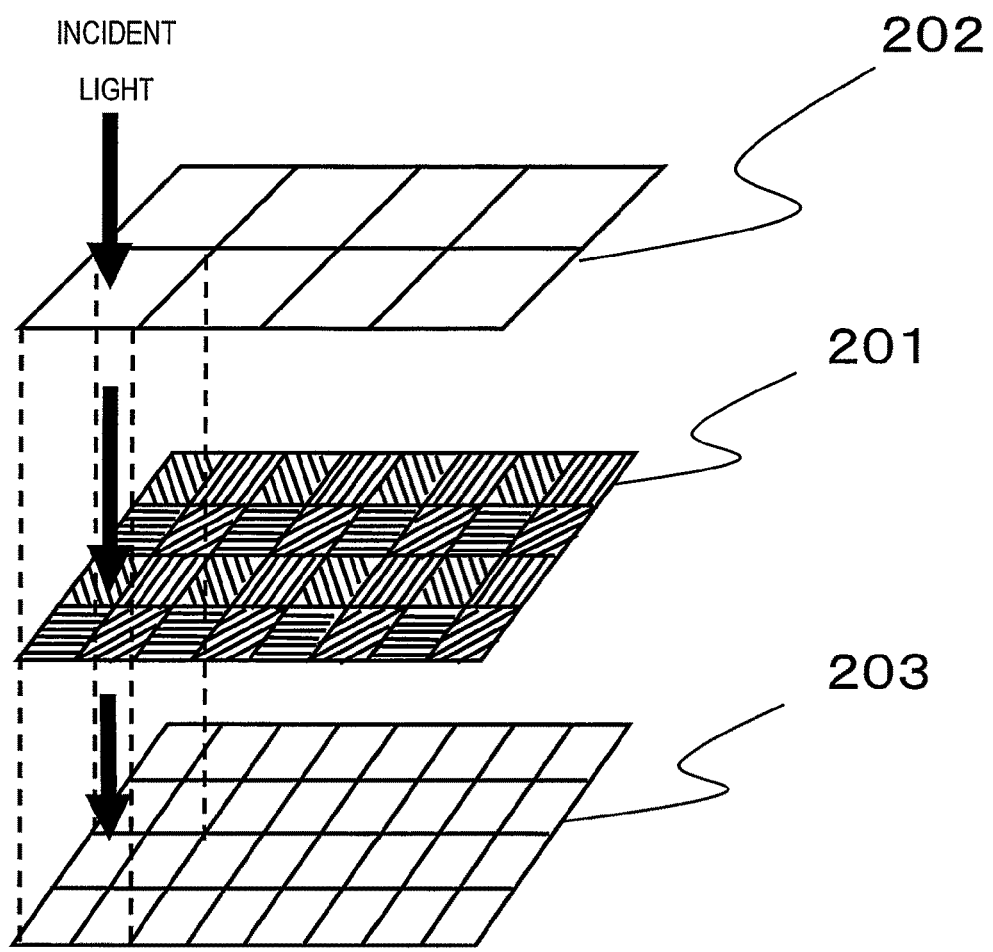
FIG. 5 is a schematic representation illustrating a fundamental configuration for the color and polarization obtaining section of the present invention.

FIG. 5 is a schematic representation illustrating a basic arrangement for the color and polarization obtaining section 102. In the example illustrated in FIG. 5, a color filter 202 and a patterned polarizer 201 are stacked one upon the other in front of image capture device's pixels 203. However, the color filter and the patterned polarizer may be stacked in reverse order. The incident light is transmitted through the color filter 202 and the patterned polarizer 201 to reach the image capture device and have its intensity monitored by the image capture device's pixels 203. Thus, according to this preferred embodiment, color information and polarization information can be obtained at the same time using a color mosaic type, single-panel color image capture device.

Figure 6:
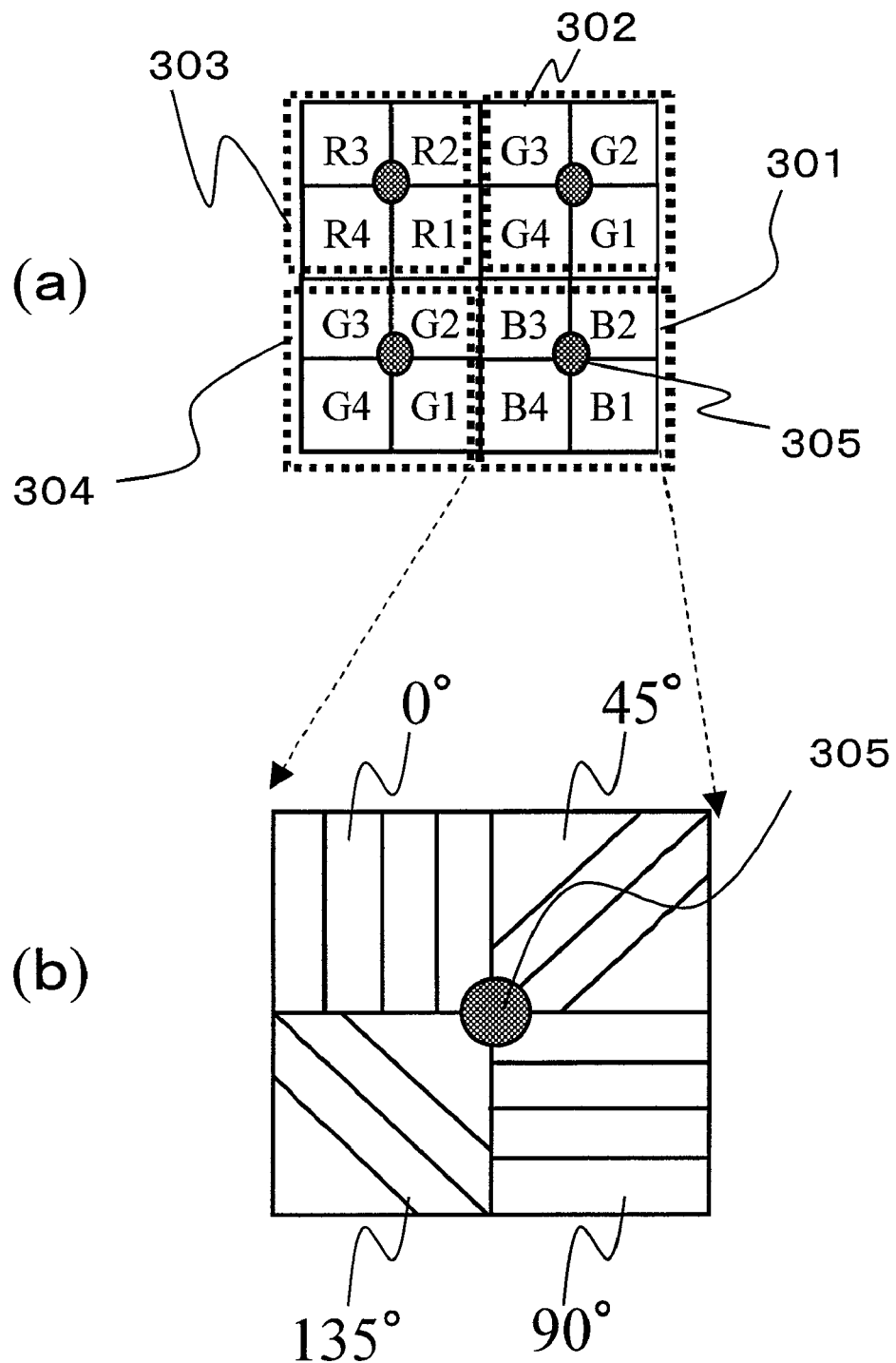
FIG. 6 is a schematic representation illustrating an exemplary pixel arrangement in the color and polarization obtaining section of the present invention.

Portion (a) of FIG. 6 illustrates a portion of the image sensing plane of the color and polarization obtaining section 102 as viewed from right over the plane in the optical axis direction. In portion (a) of FIG. 6, only 16 pixels (i.e., 4×4) on the image sensing plane are illustrated for the sake of simplicity. Each of the four rectangular areas 301 through 304 illustrates an associated portion of a Bayer type color mosaic filter that is arranged on four pixel cells. Specifically, the rectangular area 301 is a B (blue) filter area and covers pixel cells B1 through B4, which B patterned polarizers with mutually different polarization principal axes make close contact with. As used herein, the "polarization principal axis" is an axis that is defined parallel to the polarization plane (i.e., polarization transmission plane) of the light to be transmitted through a polarizer. In this preferred embodiment, a number of polarizer units, of which the polarization transmission planes define mutually different angles (i.e., fine polarization plates), are arranged adjacent to each other within each set of pixels of the same color. More specifically, four types of polarizer units, of which the polarization transmission planes are defined in mutually different directions, are arranged within each set of pixels of the same color that is R, G or B. In this case, one polarizer unit corresponds to one fine polarization pixel. In portion (a) of FIG. 6, the respective polarization pixels are identified by G1 and other reference signs.

Portion (b) of FIG. 6 shows the polarization principal axes that are assigned to the four fine polarization pixels, which the B patterned polarizers make close contact with. In portion (b) of FIG. 6, the lines drawn in each of these fine polarization pixels schematically indicate the polarization principal axis direction of its associated fine polarizing plate. Specifically, in the example illustrated in portion (b) of FIG. 6, the four fine polarization pixels have their polarization principal axes defined by angles φi of 0, 45, 90 and 135 degrees, respectively.

Four G (green) patterned polarizers make close contact with the pixels in the rectangular area 302 and four more G patterned polarizers make close contact with the pixels in the rectangular area 304. On the other hand, four R (red) patterned polarizers make close contact with the pixels in the rectangular area 303. In FIG. 6, the location identified by the reference numeral 305 indicates a virtual pixel location representing its associated four pixels collectively in this image capturing system. The patterned polarizer in each of the other rectangular areas 302 through 304 has also been divided into four portions with four different polarization principal axes just as shown in portion (b) of FIG. 6.

Figure 7:
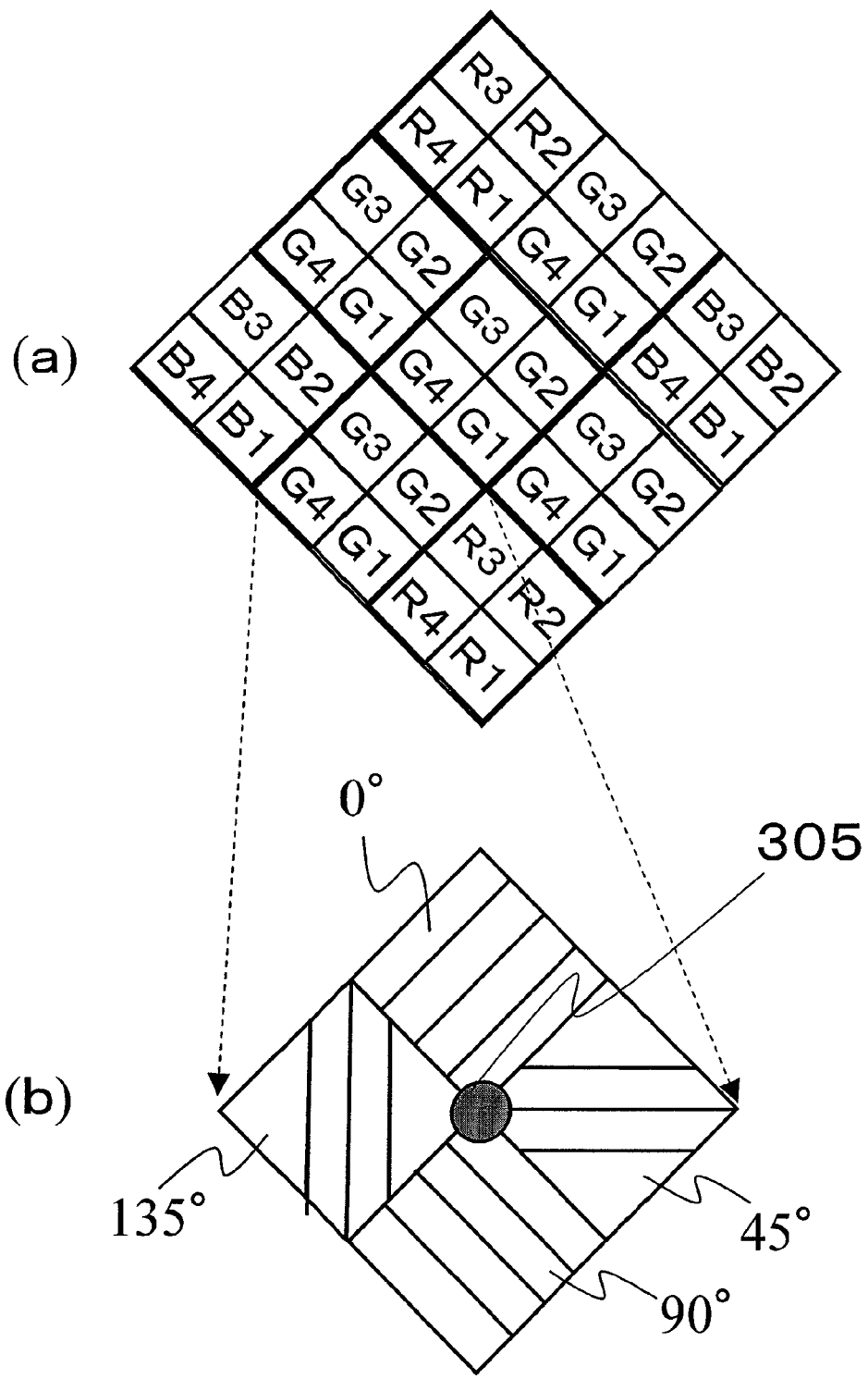
FIG. 7 is a schematic representation illustrating another exemplary pixel arrangement in the color and polarization obtaining section of the present invention.

Portion (a) of FIG. 7 illustrates another exemplary arrangement of pixels in the color and polarization obtaining section 102. In this example, G pixels are arranged in a cross pattern within a 3×3 block that is tilted by 45 degrees, and two sets of R fine polarization pixels and two sets of G fine polarization pixels are arranged alternately in the four pixels surrounding the G pixels. Portion (b) of FIG. 7 illustrates the detailed structure of each color pixel, which consists of four fine polarization pixels.

As described above, this preferred embodiment is characterized in that each color pixel includes a number of fine polarization pixels with mutually different polarization principal axes. Thus, the color mosaic arrangement itself may be determined arbitrarily. In the following description, those fine polarization pixels will be simply referred to herein as "polarization pixels".

FIGS. 8(a) through 8(c) are graphs schematically showing the wavelength characteristics of the B, G, and R polarization pixels, respectively. In these graphs, the ordinate represents the intensity of the transmitted light and the abscissa represents the wavelength. Each of these B, G and R polarization pixels has such a polarization property that transmits a transverse magnetic (TM) wave in the B, G or R wavelength range and reflects (i.e., not transmits) a transverse electric (TE) wave in that wavelength range. The TM wave is a wave in which magnetic field components are transverse to the incident plane, while the TE wave is a wave in which electric field components are transverse to the incident plane.

In FIG. 8(a), shown are the polarization properties 402 and 403 of the B polarization pixel and the transmission property 401 of a B color filter. The polarization properties 402 and 403 represent the transmittances of the TM and TE waves, respectively.

In FIG. 8(b), shown are the polarization properties 405 and 406 of the G polarization pixel and the transmission property 404 of a G color filter. The polarization properties 405 and 406 represent the transmittances of the TM and TE waves, respectively.

In FIG. 8(c), shown are the polarization properties 408 and 409 of the R polarization pixel and the transmission property 407 of an R color filter. The polarization properties 408 and 409 represent the transmittances of the TM and TE waves, respectively.

The properties shown in FIGS. 8(a) through 8(c) are realized by using the photonic crystal disclosed by Kawashima, Sato, Kawakami, Nagashima, Ota and Aoki in "Development of polarization imaging device and applications by using patterned polarizer", Institute of Electronics, Information and Communication Engineers of Japan, National Conference 2006, No. D-11-52, p. 52, 2006, for example. When the photonic crystal is used, light, of which the electric field vector oscillating plane is parallel to the groove that has been cut on its surface, becomes a TE wave, and light, of which the electric field vector oscillating plane is perpendicular to the groove on its surface, becomes a TM wave.

What counts in this preferred embodiment is to use a patterned polarizer that exhibits polarization separation ability in each of the B, G and R transmission wavelength ranges as shown in FIGS. 8(a) through 8(c).

Figure 9:
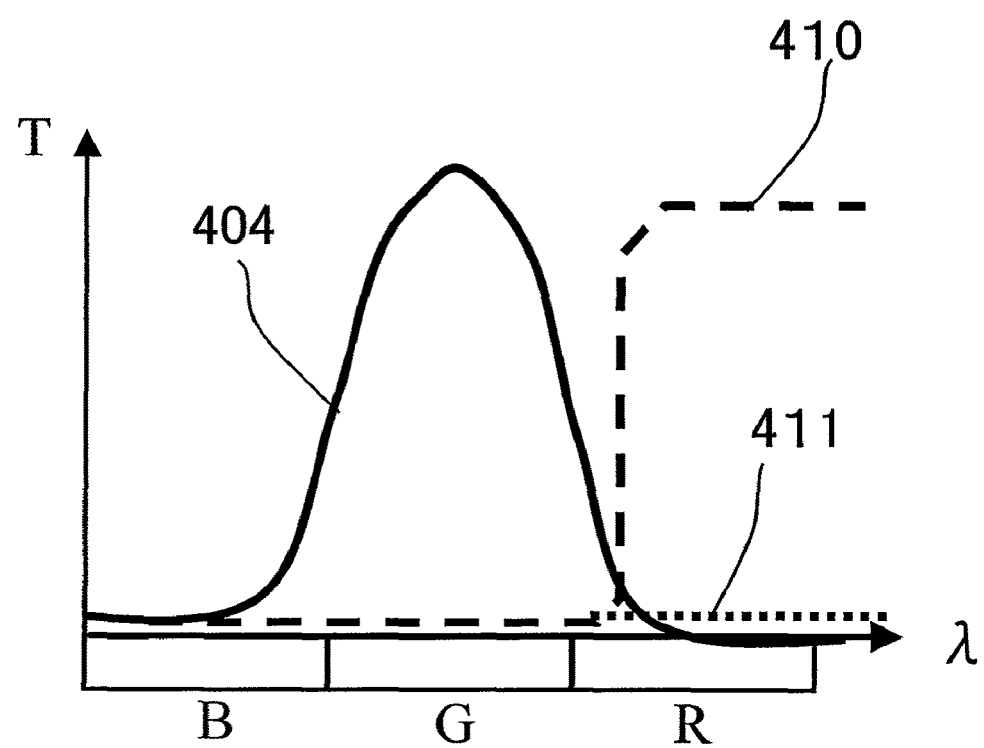
FIG. 9 schematically shows a situation where the transmission wavelength range of a G color filter and the polarization separation wavelength range determined by the polarization properties disagree with each other.

FIG. 9 shows a situation where the transmission wavelength range of a G color filter and the polarization separation wavelength range determined by the polarization properties 410 and 411 disagree with each other. A polarizer that exhibits such characteristics cannot operate as intended by the present invention.

If the intensity of a monochrome image should be adjusted with polarization filters, there is no need to optimize the wavelength range in which the polarization separation is achieved. On the other hand, to obtain polarization information on a color pixel basis, the color separation ability and the polarization separation property should be matched to each other.

In this description, the property of a polarization pixel will be represented by a combination (such as "R1" or "G1") of one of the four numerals "1", "2", "3" and "4" representing the polarization principal axis direction of the polarization pixel and one of the three color codes "R", "G" and "B" representing the color of that polarization pixel. For example, the polarization pixels R1 and G1 have the same numeral, and therefore, their polarization principal axis directions agree with each other. However, since their RGB codes are different from each other, these are polarization pixels, of which the wavelength ranges of the light to be transmitted are different from each other. In this preferred embodiment, the arrangement of such polarization pixels is realized by the combination of the color filter 202 and the patterned polarizer 201 shown in FIG. 5.

To obtain polarization components included in a particularly bright specular reflected portion of an object and polarization components included in a shadow area of the object just as intended, the dynamic range of the light intensity of the image capture device and the number of bits thereof are preferably as large as possible (which may be 16 bits, for example).

Also, it is preferred that the color and polarization obtaining section 102 perform synchronized processing with the light projecting section 101. That is to say, if the flash unit of a camera is used as the light projecting section 101, for example, the color and polarization obtaining section 102 may capture an image right after the light projecting section 101 has been fired.

The light intensity information that has been obtained on a polarization pixel basis by using the arrangement shown in FIG. 5 is processed by the polarization information processing section 104 shown in FIG. 4. Hereinafter, this processing will be described.

Figure 10:
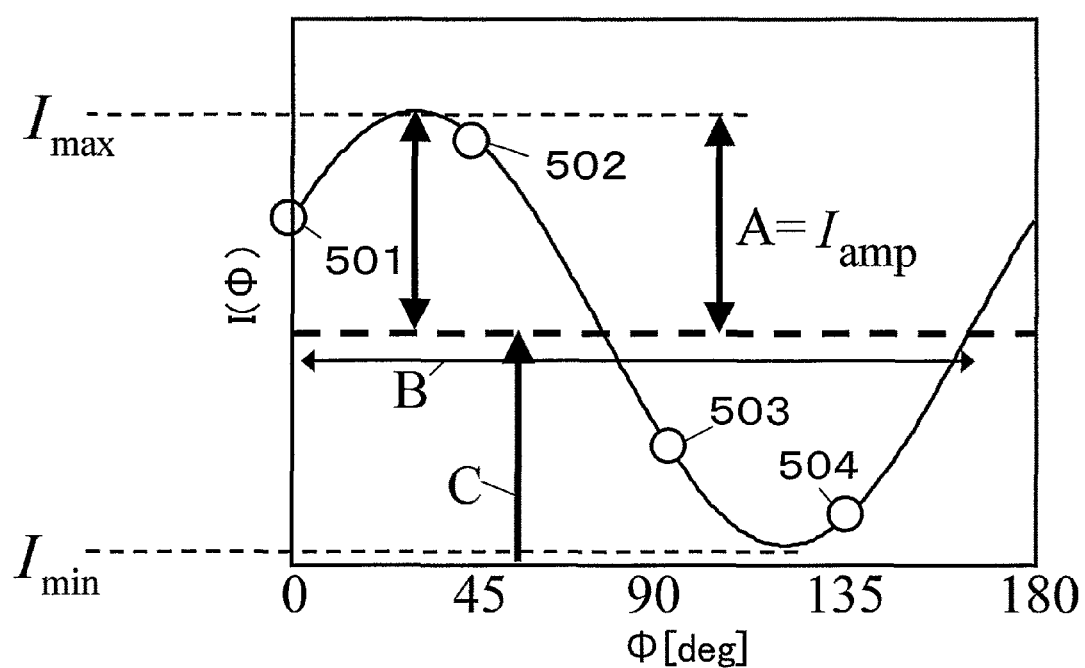
FIG. 10 shows the intensities of light rays that have been transmitted through four types of polarizers, of which the polarization principal axes are defined in four different directions.

FIG. 10 shows the intensities 501 through 504 of light rays that have been transmitted through four types of polarizers, of which the polarization principal axes (with $\Phi i=0$, 45, 90 and 135 degrees, respectively) are defined in four different directions. In this example, if the angle of rotation $\Phi$ of the polarization principal axis is $\Phi_i$, then the intensity measured will be identified by $I_i(\Phi i)$, where i is an integer that falls within the range of 1 to N and N is the number of samples. In the example shown in FIG. 10, N=4, and therefore, i=1, 2, 3 or 4. In FIG. 10, the intensities 501 through 504 associated with the four pixel samples ($\Phi_i$, Ii($\Phi i$)) are shown.

The relation between the angle $\Phi i$ of the polarization principal axis and the intensities 501 through 504 is represented by a sinusoidal curve. In FIG. 10, all of the four points representing the intensities 501 through 504 are illustrated as being located on a single sinusoidal curve. However, if a sinusoidal curve is plotted based on a greater number of intensities measured, some of those intensities measured may be slightly off the sinusoidal curve in some cases.

As used herein, the "polarization information" means information about the degree of modulation of the amplitude of such a sinusoidal curve, representing the degree of dependence of the intensity on the angle of the polarization principal axis, and the phase information thereof.

In actual processing, using the four pixel intensity values in each of the areas 301 to 304 in the same color shown in portion (a) of FIG. 6 as samples, the reflected light intensity I with respect to the principal axis angle Φ of the patterned polarizer is approximated by the following Equation (1):

$$I(\phi) = A \cdot \sin 2(\phi - B) + C \quad (1)$$

Figure 8:
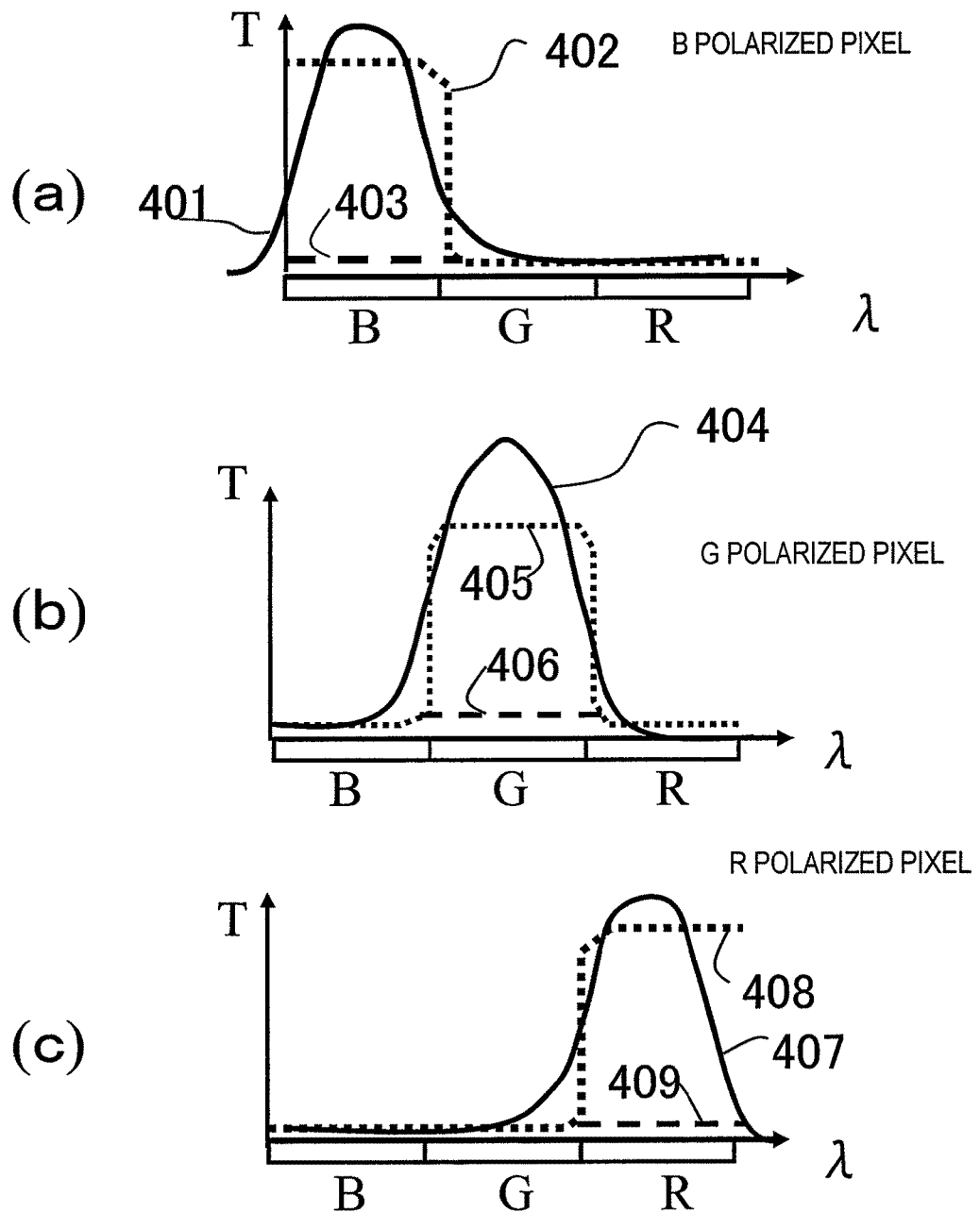
FIG. 8 schematically shows the wavelength properties of B, G and R polarization pixels according to the present invention.

In this case, A, B and C are constants as shown in FIG. 8 and respectively represent the amplitude, phase and average of the curve showing a variation in polarized light intensity. Equation (1) can be expanded as in the following Equation (2):

$$I(\phi) = a \cdot \sin 2\phi + b \cdot \cos 2\phi + C \quad (2)$$

In this case, A and B are given by the following Equations (3) and (4), respectively:

$$A = \sqrt{a^2 + b^2}, \quad (3)$$
$$\sin(-2B) = \frac{b}{\sqrt{a^2 + b^2}},$$
$$\cos(-2B) = \frac{a}{\sqrt{a^2 + b^2}}$$

$$B = -\frac{1}{2}\tan^{-1}\left(\frac{b}{a}\right) \quad (4)$$

The relation between the intensity I and the polarization principal axis angle Φ can be approximated by the sinusoidal function represented by Equation (1) if A, B and C that will minimize the following Equation (5) can be obtained:

$$f(a, b, C) = \sum_{i=1}^{N} (I_i - a \cdot \sin 2\phi_i - b\cos 2\phi_i - C)^2 \quad (5)$$

By performing these processing steps, the three parameters A, B and C can be approximated by the sinusoidal function with respect to a single color.

In this manner, the polarization minimum intensity $I_{min}$ that is a non-polarized component and the polarization amplitude intensity $I_{amp}$ that is a polarized component can be obtained by the following Equations (6) and (7), respectively.

polarization minimum intensity $I_{min}$:

$$I_{min} = C - A \quad (6)$$

polarization amplitude intensity $I_{amp}$:

$$I_{amp} = A \quad (7)$$

The image processing apparatus of this preferred embodiment is supposed to output the polarization minimum intensity $I_{min}$ and polarization amplitude intensity $I_{amp}$. However, any other pieces of information may be output as long as those pieces of information are obtained from the sinusoidal function shown in FIG. 10. For example, a degree-of-polarization image ρ, a polarization phase image $\Phi_{max}$, a polarization estimated error E, a maximum intensity $I_{max}$ of the sinusoidal function, and their combination may be output as alternative pieces of polarization information.

degree of polarization ρ:

$$\rho = \frac{I_{max} - I_{min}}{I_{max} + I_{min}} = \frac{A}{C} = \frac{A}{\bar{I}} \quad (8)$$

polarization phase $\phi_{max}$ ($0 \leq \phi_{max} \leq \pi$[rad]):

$$\phi_{max} = \frac{\pi}{4} + B \quad (9)$$

polarization estimated error E:

$$E = \sum_{i=0}^{N-1} (I_i - A \cdot \sin 2(\phi_i - B) - C)^2 \quad (10)$$

polarization maximum intensity $I_{max}$:

$$I_{max} = A + C \quad (11)$$

In this case, the degree of polarization ρ represents how much the light on a given pixel has been polarized. The polarization phase $\phi_{max}$ represents the principal axis angle of partial polarization of the light on a given pixel. The polarization estimated error is the sum of the errors between the intensities that have been actually measured on four sample pixels and the intensities estimated with the sinusoidal function approximated as described above. It should be noted that the polarization principal axis angles of 0 and 180 degrees (π) are the same.

The color information processing section 103 calculates a color intensity based on the information that has been provided by the color and polarization obtaining section 102. The intensity of light that has been transmitted through a polarizer is different from the original intensity of the light yet to be incident on the polarizer. Theoretically speaking, under a non-polarized illumination, the average of the intensities measured along all polarization principal axes of polarized light corresponds to the original intensity of the light yet to be incident on the polarizer. Supposing the measured intensity of a polarization pixel R1 is identified by $I_{R1}$, the color intensity can be calculated by the following Equation (12):

$$\bar{I}_R = (I_{R1} + I_{R2} + I_{R3} + I_{R4})/4$$
$$\bar{I}_G = (I_{G1} + I_{G2} + I_{G3} + I_{G4})/4$$
$$\bar{I}_B = (I_{B1} + I_{B2} + I_{B3} + I_{B4})/4 \quad (12)$$

An image consisting of unit pixels with such color intensities will be referred to herein as a "color image I".

By obtaining the intensities of respective polarization pixels, a normal color mosaic image can be generated. And by converting the mosaic image into a color image, of which the respective pixels have RGB pixel values, a color image I can be generated. Such a conversion can be done by a known interpolation technique such as a Bayer mosaic interpolation technique.

By adopting such a technique, as "color information" represented by a color vector consisting of R, G and B intensities, the polarization minimum color component $I_{min}$ and the polarization amplitude color component $I_{amp}$ can be obtained separately from the polarization minimum intensity $I_{min}$ and the polarization amplitude intensity $I_{amp}$ that are pieces of polarization information. Also, in that case, the color image I and the color information satisfy the following Equation (13):

$$I(x,y) = I_{amp}(x,y) + I_{min}(x,y) \quad (13)$$

Figure 12:
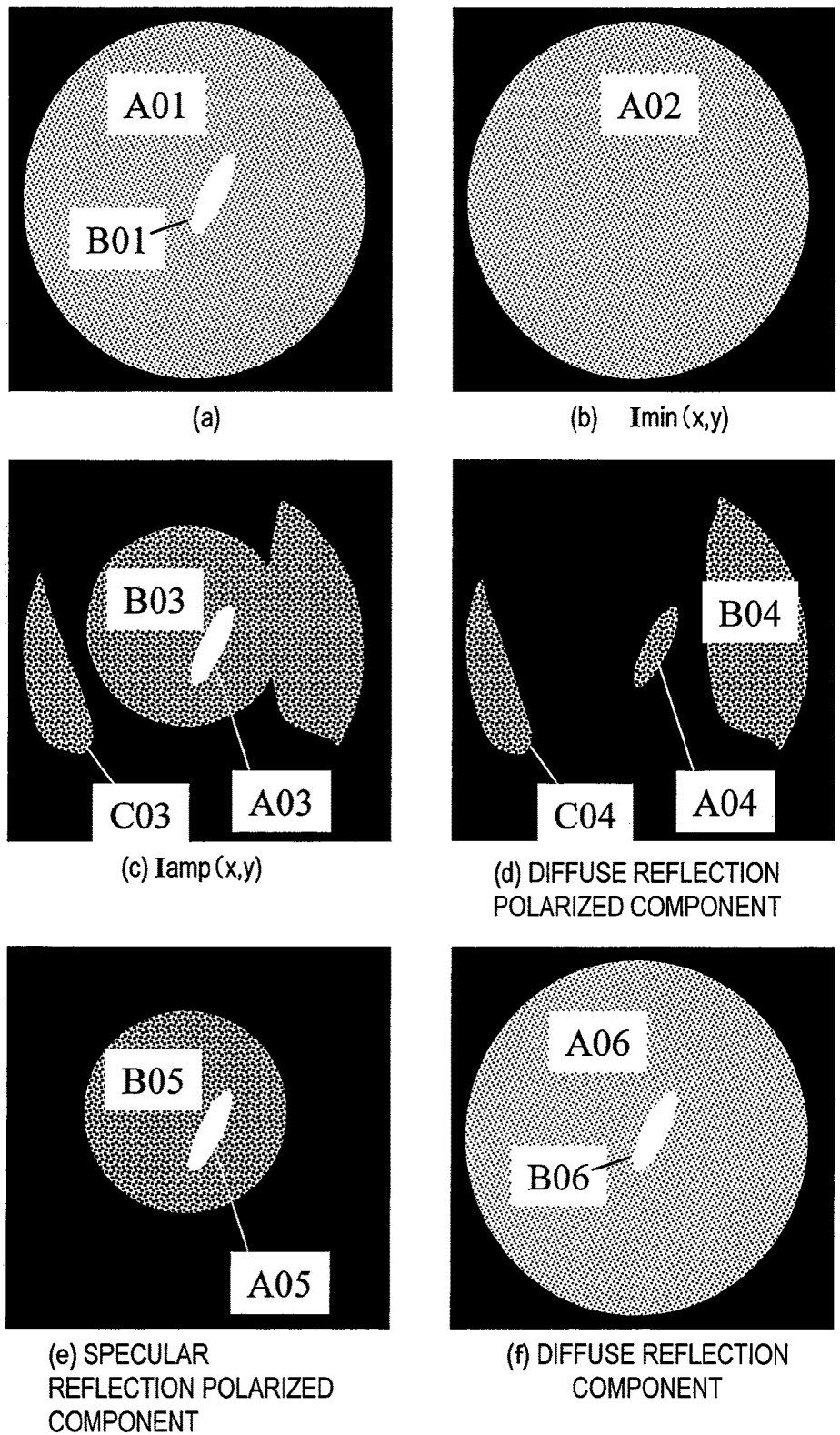
FIG. 12 schematically shows results of an image component separation that was carried out in accordance with an image separating method according to the first preferred embodiment of the present invention.
Figure 13:
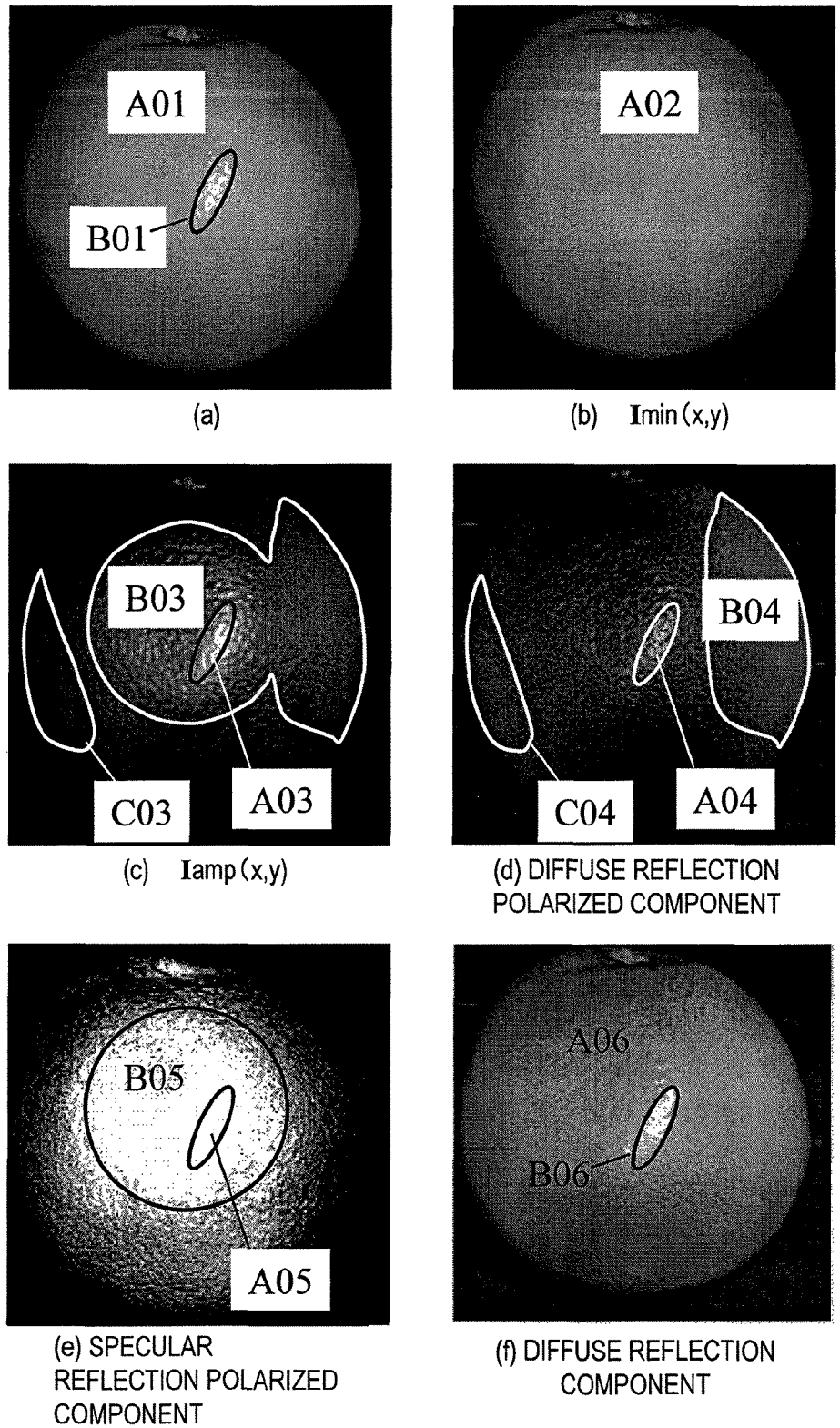
FIG. 13 illustrates multiple areas defined by dividing the images shown in FIG. 11 according to their intensities.

FIG. 11(*a*) shows only the light intensity of a color image I(x, y) representing a grapefruit as an object. FIGS. 11(*b*) and 11(*c*) shows exemplary images representing the polarization minimum intensity $I_{min}$(x, y) and the polarization amplitude intensity $I_{amp}(x, y)$ of the object shown in FIG. 11(a). These images are originally color images but are printed as monochrome images in this drawing. On the other hand, FIG. 12 illustrates schematic representations of the respective drawings of FIG. 11 to indicate their color distribution more clearly. In these drawings, the respective areas A01 through B06 correspond to their counterparts shown in FIG. 13.

The color image I(x, y) and information about the intensity and polarization of each pixel can be obtained by using the four polarization pixels shown in FIG. 6(b). That is why each piece of light intensity and polarization information can be regarded as representing a value at the virtual pixel point 305 that is located at the center of four polarization pixels shown in FIG. 6(b). Consequently, the resolution of a color image and that of a polarized image both decrease to one fourth (i.e., a half (vertically) by a half (horizontally)) of that of the image sensor.

In this preferred embodiment, however, there are a number of fine polarizers within a color mosaic pixel in a single color as shown in FIGS. 6 and 7. That is why compared to a situation where non-quadruple color mosaic pixels are used in a fine image, the resolution is almost the same.

Figure 14:
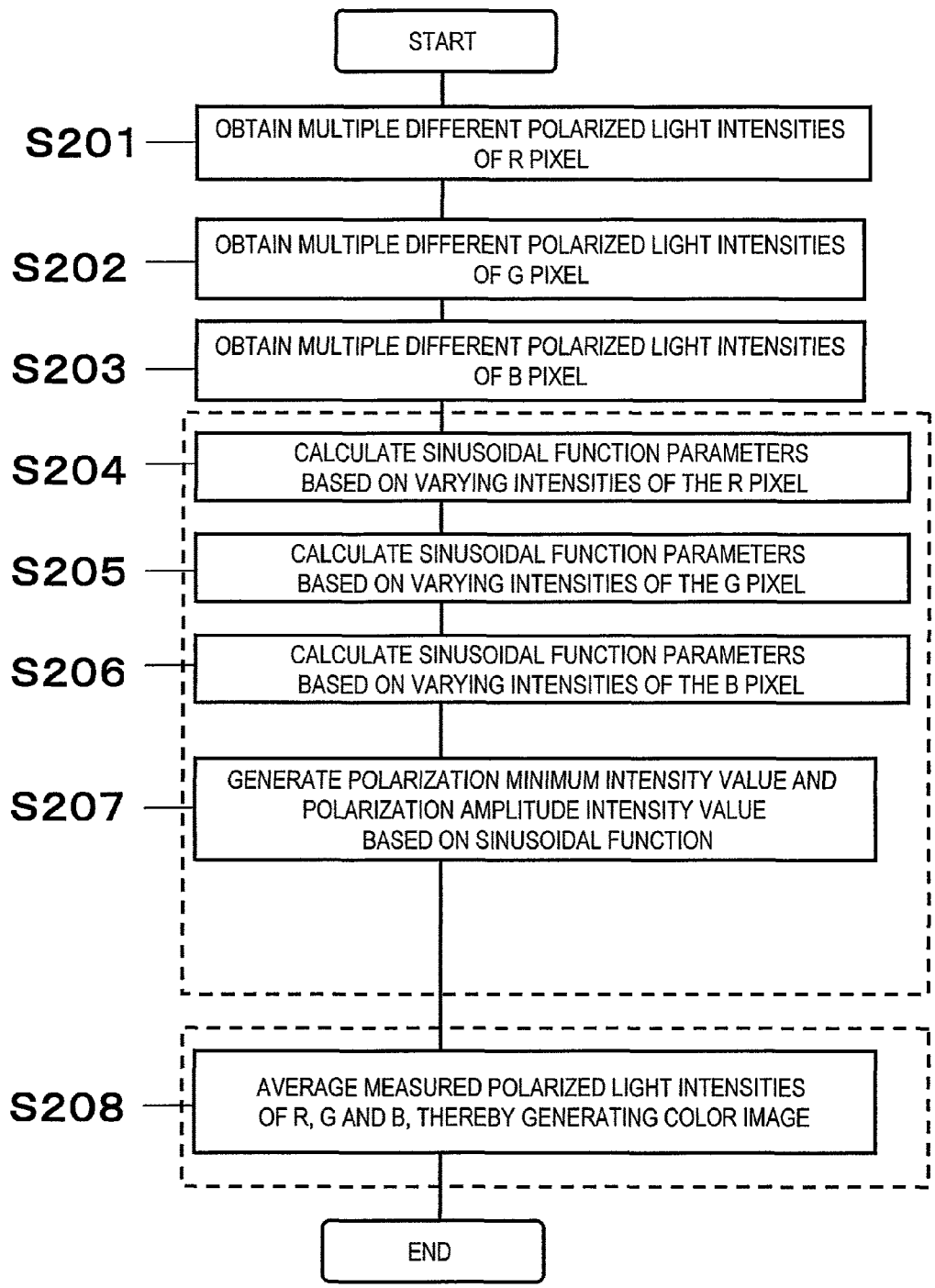
FIG. 14 is a flowchart showing the flow of the processing to be done by a color information processing section 103 and a polarization information processing section 104 according to the present invention.

Hereinafter, it will be described with reference to FIG. 14 how the color information processing section 103 and the polarization information processing section 104 shown in FIG. 1 operate.

First of all, the color and polarization obtaining section 102 obtains a color image and a polarization information image in real time at the same time. In Steps S201 to S203, measured values of polarized light intensities are obtained in each of the R, G and B pixels of the color image. In this case, these processing steps S201, S202 and S203 may be carried out in any arbitrary order and may even be carried out in parallel with each other. Specifically, four different polarized light intensities are obtained in the R, G and B color mosaic pixels. A signal representing these polarized light intensities is sent to the polarization information processing section 104 and then processed there in the following manner in the processing steps S204 through S208.

Specifically, in the processing steps S204, S205 and S206, sinusoidal function parameters are calculated based on the varying intensities obtained from the R, G and B pixels, respectively. The sinusoidal function parameters are defined as A, B and C in the Equation (1) mentioned above. These processing steps S204 through S206 are also independent of each other, and can be carried out in any arbitrary order or even in parallel with each other. Next, in Step S207, the polarization information processing section 104 calculates the minimum intensity and amplitude component of each sinusoidal function, thereby generating the polarization minimum intensity $I_{min}$ as a non-polarized component and the polarization amplitude intensity $I_{amp}$ as a polarized component, respectively.

Thereafter, the color information processing section 103 performs the processing step S208. Specifically, the average intensity of the R, G and B pixels is calculated by the Equation (12) mentioned above, thereby generating a color intensity image I(x, y).

In the preferred embodiment described above, a photonic crystal is used for the patterned polarizer. Alternatively, the polarizer may also be a film type polarizer, a wire grid type polarizer or a polarizer operating on any other principle.

To obtain a color image, a Foveon element could be used, for example, instead of the color filter. In that case, a camera including the image processing apparatus of this preferred embodiment shown in FIG. 3 will use a color filter 202 and an image capture device 203 as a color image capture device 208.

The light source color information collecting section 105 collects the color information of the light source that is now irradiating the object. If the light source irradiating the object is only the light emitter 206 of the light projecting section 101, the color information of the light source is already known. In that case, the color information of the light emitter 206 may be stored in the memory 204 of the image processing apparatus and the light source color information collecting section 105 may retrieve the light source color information from the memory 204. On the other hand, if a different light source, other than the light emitter 206 of the light projecting section 101, is now irradiating the object, then the light source color information collecting section 105 may arrange a target, of which the shape and surface reflectance are already known, near the object to collect estimated light source information and may estimate the color information from the image that has been captured by the color image capture device 208 (see Masayuki Kanbara and Naokazu Yokoya, "Geometric and Photometric Registration for Vision-Based Augmented Reality", Technical Report of the Institute of Electronics, Information and Communication Engineers, Pattern Recognition and Media Understanding, PRMU 2002-190, pp. 7-12(1-6), 2003, for example). This processing will be described in detail later.

Figure 15:
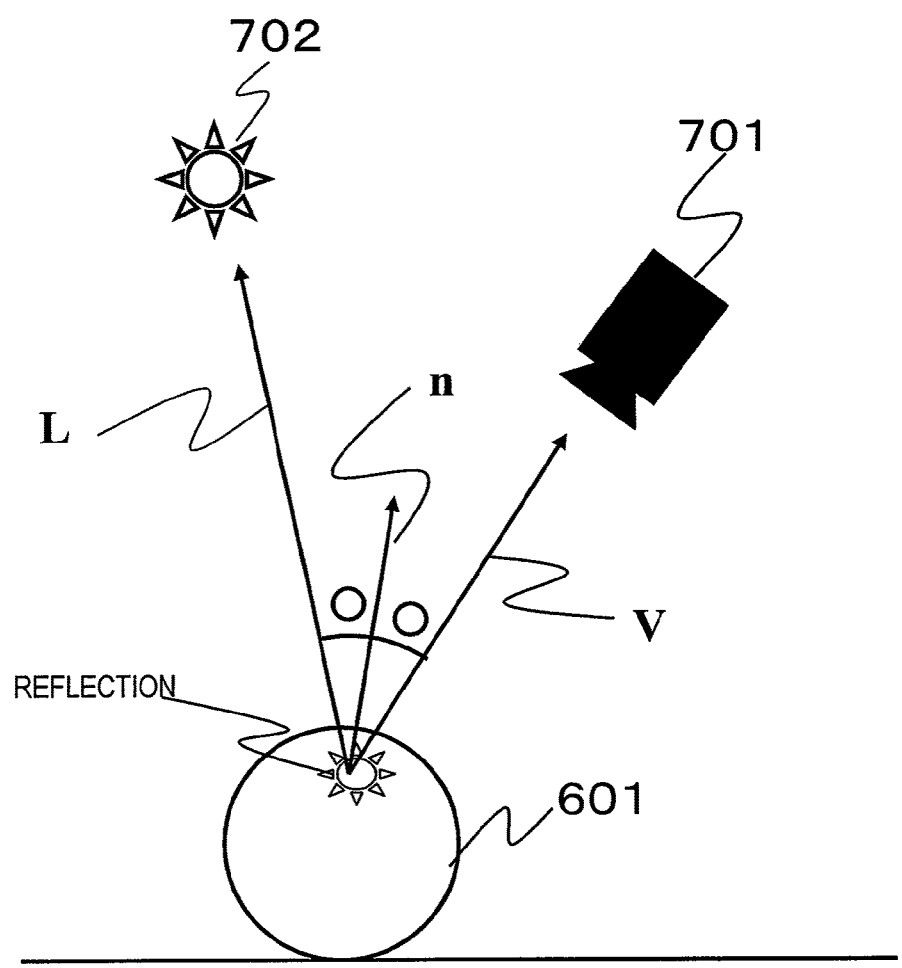
FIG. 15 is a schematic representation illustrating a light source estimating method that uses a mirror ball.

The light source color information can be collected by using a sphere 601 that can be regarded as a mirror ball as shown in FIG. 15, for example. The mirror ball 601 is supposed to be arranged near an object and its position and the direction of its normal are supposed to be already known. An image of such a mirror ball 601 is captured by the color and polarization obtaining section 102 and a color image is obtained by the color information processing section 103. In that case, the shooting environment is reflected on the mirror ball 601. Considering the light source has a high light intensity, a pixel with high light intensity is detected as a specular reflection pixel from the image of the mirror ball that has been shot. Since the reflectance of the specular reflector is also known, the color vector information of the light source can be obtained by detecting the color information of the specular reflection pixel.

Instead of always shooting such a target, light source color information that has been collected previously through shooting operations in the past may also be used. Such a method will be effective in a situation where the light source environment never changes as in an indoor surveillance camera, for example. In that case, the target may be shot and its light source information may be collected when the camera is installed. The processing may be carried out on the supposition that the light source is white. This would be effective in a situation where an image is captured under a fluorescent lamp or in a situation where a shooting operation is carried out outdoors in the daytime.

The image component separating section 106 separates the color image that has been obtained by the color information processing section 103 into multiple components by reference to the polarization information generated by the polarization information processing section 104 and the light source color vector information obtained by the light source color information collecting section 105.

Hereinafter, a conventional separating technique that uses polarization information (see Patent Document No. 1, for example) and its problems will be described. According to such a technique, the polarization minimum intensity $I_{min}$ obtained by the polarization information processing section 104 is separated from a diffuse reflection component and the polarization amplitude intensity $I_{amp}$ is separated from a specular reflection component.

Such a technique depends on the following differences in polarization property between specular reflection and diffuse reflection:

Since a specular reflection component has been produced as a result of surface reflection, the polarization property of the incoming light is still maintained. That is why the specular reflection component is observed as a polarized component of the light intensity that has been measured by a camera.

But as diffuse reflection component has gone through repetitive scattering, the polarization property of the incoming light has already been lost. Thus, the diffuse reflection component is observed as a non-polarized component of the light intensity that has been measured by a camera.

These polarization properties are defined under the following two conditions:

(Condition #1) If linearly polarized light has been projected, the specular reflection component is observed as a polarized component, but (Condition #2) If linearly polarized light has been projected, the diffuse reflection component is observed as a non-polarized component.

According to the conventional component separating technique, the image shown in FIG. 11(b) is treated as representing a diffuse reflection component and the image shown in FIG. 11(c) is treated as representing a specular reflection component. However, in an area where the angle of emittance is sufficiently large (i.e., near the occluding edge), a specular reflection component that should not be there is detected as shown in FIG. 11(c). Thus, it can be determined that sufficiently high accuracy could not be achieved by such a diffuse/specular reflection component separating technique using the polarization information.

Such a problem arises because Condition #2 is not satisfied due to polarization of a portion of the diffuse reflection component. Hereinafter, such a phenomenon will be described in detail.

Figure 16:
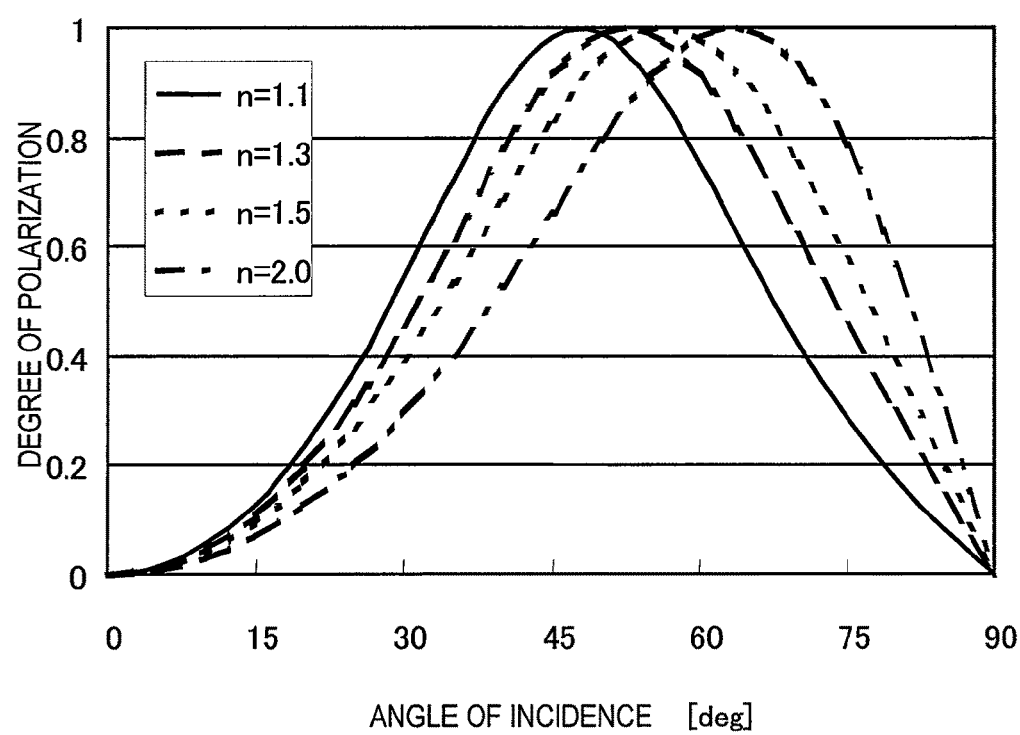
FIG. 16 is a graph showing the degree of polarization of a specular reflection component with respect to the angle of incidence in situations where the object has a refractive index n of 1.1, 1.3, 1.5 or 2.0.
Figure 17:
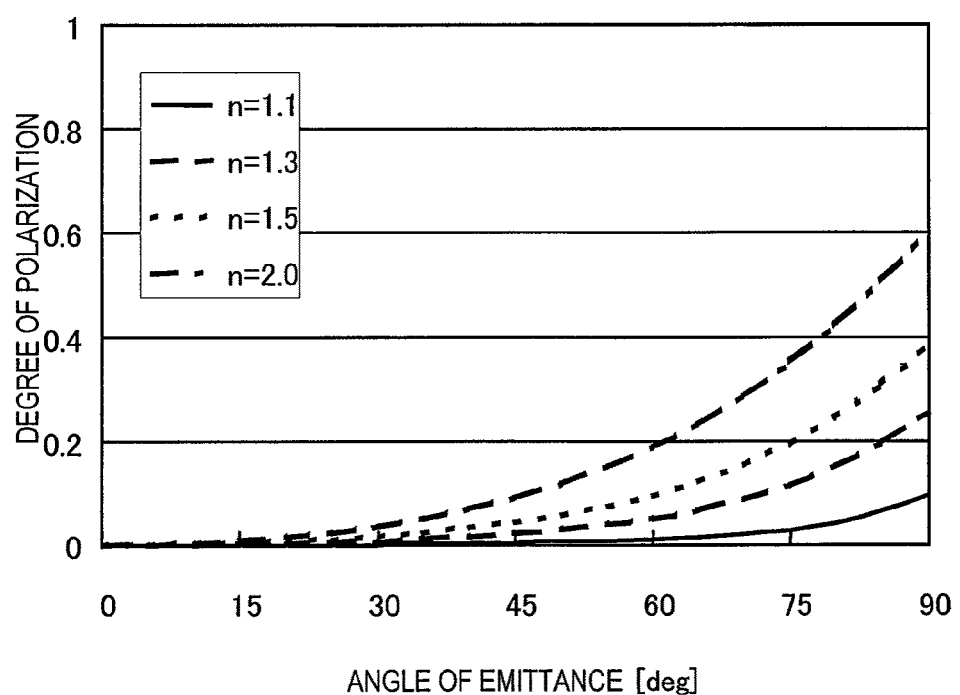
FIG. 17 is a graph showing the degree of polarization of a diffuse reflection component with respect to the angle of emittance in situations where the object has a refractive index n of 1.1, 1.3, 1.5 or 2.0.

FIGS. 16 and 17 are graphs showing the respective degrees of polarization of specular and diffuse reflection components in situations where the object has a refractive index n of 1.1, 1.3, 1.5 or 2.0 (see L. B. Wolff and T. E. Boult, "Constraining Object Features Using a Polarization Reflectance Model", IEEE Transactions on Pattern Analysis and Machine Intelligence, Vol. 13, No. 7, pp. 635-657, 1991, for example).

In FIG. 16, the abscissa represents the angle of incidence, while the ordinate represents the degree of polarization of the specular reflection component. On the other hand, in FIG. 17, the abscissa represents the angle of emittance, while the ordinate represents the degree of polarization of the diffuse reflection component. These graphs show how much the outgoing light or reflected light will be polarized when non-polarized light is projected onto the surface of an object. That is to say, the closer to zero the degree of polarization is, the closer to non-polarized light the outgoing (or reflected) light will be. On the other hand, the closer to one the degree of polarization is, the closer to linearly polarized light the outgoing (or reflected) light will be. From these drawings, it can be said that the diffuse reflection component has a sufficiently low degree of polarization in every range but a range where the angle of emittance is rather large, and the diffuse reflection component has a higher degree of polarization than the specular reflection component in that range where the angle of emittance is rather large.

Please pay attention to Condition #2. To satisfy that Condition #2, if non-polarized light has been projected, the outgoing light must be non-polarized light, too. That is to say, its degree of polarization needs to be sufficiently low. In view of this consideration, it can be estimated that Condition #2 is not satisfied in the range where the angle of emittance is sufficiently large (i.e., near the occluding edge).

This is a major reason why the specular and diffuse reflection components could not be separated from each other accurately enough in FIGS. 11(b) and 11(c).

The image component separating section 106 of this preferred embodiment overcomes such a problem by utilizing color information. Hereinafter, the image component separating section 106 of this preferred embodiment will be described in detail.

First of all, a dichroic reflection model, which is used extensively to separate specular and diffuse reflection components from each other by reference to color information, will be described.

According to the dichroic reflection model, the color vector I(x, y) of the object to be observed at a pixel (x, y) of a color image can be resolved as represented by the following Equation (14):

$$I(x,y)=C_1'(x,y) \cdot I_{Light}+C_2'(x,y) \cdot I_{Object}(x,y) \tag{14}$$

In Equation (14), $I_{Light}$ indicates the color vector of the light source and $I_{object}$ indicates the object color vector at the pixel (x, y). The color vector is a three-dimensional vector that represents the intensities of the respective colors R, G and B as a vector. Also, C'1(x, y) and C'2(x, y) indicate the weights of the light source color vector and the object color vector, respectively. As can be seen from this equation, the specular reflection component $I_s(x, y)$ and the diffuse reflection component $I_d(x, y)$ at the pixel (x, y) can be separated from each other as represented by the following Equations (15) and (16):

$$I_s(x,y)=C_1'(x,y) \cdot I_{Light} \tag{15}$$

$$I_d(x,y)=C_2'(x,y) \cdot I_{Object}(x,y) \tag{16}$$

According to the conventional method of separating specular and diffuse reflection components by reference to color information, however, the object color vector is unknown, and therefore, the component separation represented by Equation (14) cannot be done. Thus, the image component separating section 106 of this preferred embodiment overcomes such a problem by using the polarization minimum color information $I_{min}$, provided by the polarization information processing section 104, as the object color vector.

As described above, according to the technique of separating specular and diffuse reflection components by reference to polarization information, even if linearly polarized light is projected, the diffuse reflection component will be observed as not only non-polarized component but also as polarized component as well near the occluding edge. However, since the non-polarized component is estimated to be a diffuse reflection component, the polarization minimum color information $I_{min}$ given by Equation (6) is estimated to be equal to an object color vector. That is why the image component separating section 106 of this preferred embodiment separates the specular and diffuse reflection components from each other by using the following Equation (17):

$$I(x, y) = 2 \cdot I_{amp}(x, y) + I_{min}(x, y) \quad (17)$$
$$= \{C_1(x, y) \cdot I_{Light} + C_2(x, y) \cdot I_{min}(x, y)\} + I_{min}(x, y)$$

This equation uses the fact that the color image I(x, y) is the sum of the polarization amplitude color component $I_{amp}$ multiplied by two and the polarization minimum color information $I_{min}$. That is to say, the image component separating section 106 separates the polarization amplitude color component $I_{amp}$ into a light source color vector component and a polarization minimum color vector component. By performing such processing, the image component separating section 106 separate the color image I(x, y) into a polarization amplitude light source color vector component $I_{amp1}(x, y)$, the polarization amplitude polarization minimum color vector component $I_{amp2}(x, y)$ and the polarization minimum color component $I_{min}(x, y)$ by Equation (17).

$$I_{amp1}(x,y) = C_1(x,y) \cdot I_{Light}(x,y)$$

$$I_{amp2}(x,y) = C_2(x,y) \cdot I_{min}(x,y)$$

$$I_{min}(x,y) = I_{min}(x,y) \quad (18)$$

Figure 18:
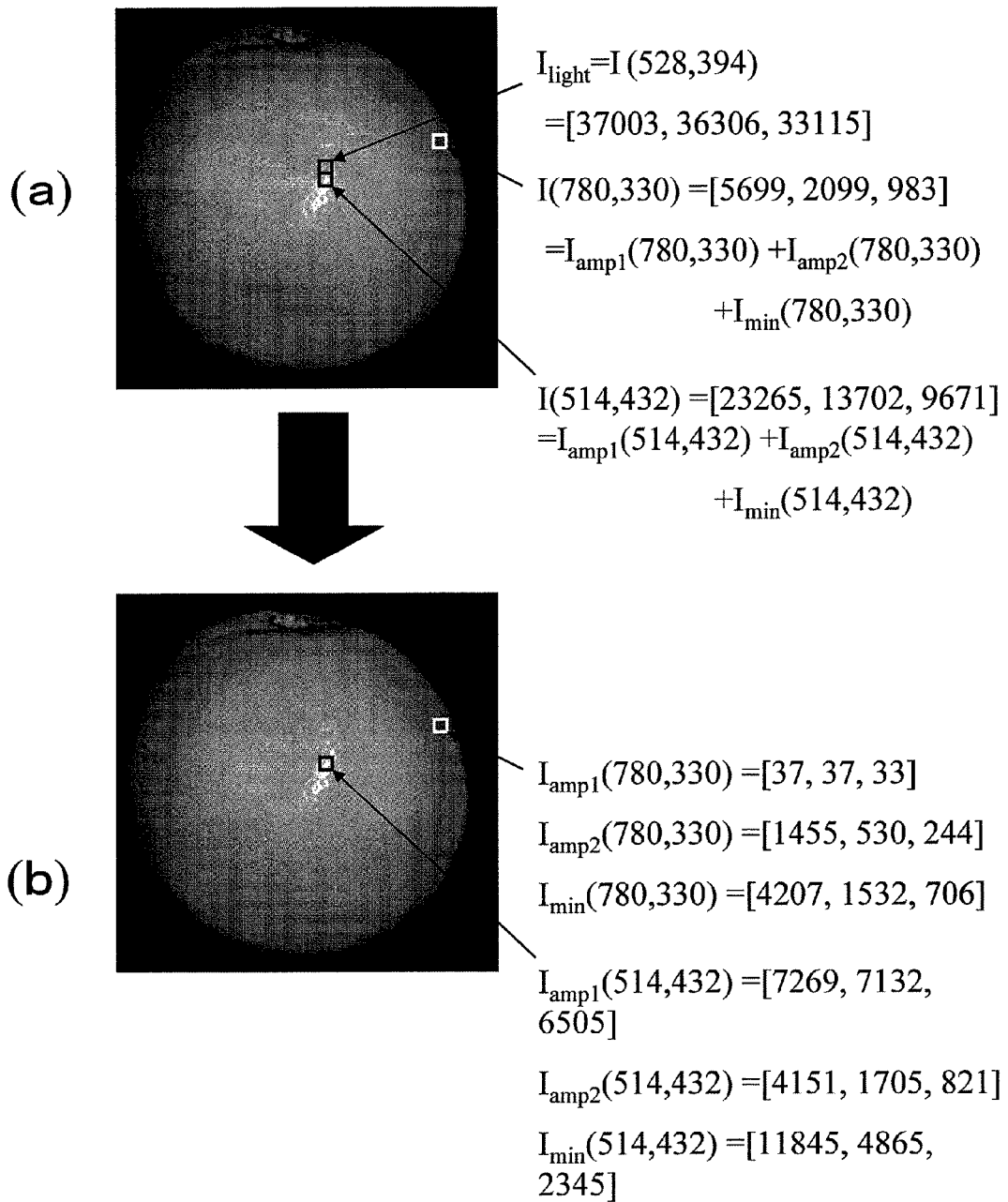
FIG. 18 shows exemplary numerical values of a color vector I(x, y) in a particular pixel.

FIG. 18(a) shows exemplary numerical values of a pixel color vector I(x, y) at positions (x, y)=(514, 432), (780, 330) and (528, 394) on the object. As shown in FIG. 18(a), the pixel color vectors I(x, y) at the positions (x, y)=(514, 432) and (780, 330) are represented by $I_{amp1}(x, y) + I_{amp2}(x, y) + I_{min}(x, y)$.

Meanwhile, the color vector I(x, y) at the position (x, y)=(528, 394) within the specular reflection area has the highest intensity in the image. That is why the color vector at that position (x, y)=(528, 394) is estimated to be the light source color vector $I_{Light}$.

If the image component separation is done by the method to be described later, I(x, y) can be separated into $I_{amp1}(x, y)$, $I_{amp2}(x, y)$ and $I_{min}(x, y)$ on a pixel-by-pixel basis. At the pixel in the position (x, y)=(514, 432) shown as an example in FIG. 18(b), $I_{amp1}(x, y)$, $I_{amp2}(x, y)$ and $I_{min}(x, y)$ are [7269, 7132, 6505], [4151, 1705, 821] and [11845, 4865, 2345], respectively. It should be noted that the three numerical values in each of these brackets [ ] represent the light intensities of the three colors of R, G and B as described above. In the same way, at the pixel in the position (x, y)=(780, 330), $I_{amp1}(x, y)$, $I_{amp2}(x, y)$ and $I_{min}(x, y)$ are [37, 37, 33], [1455, 530, 244] and [4207, 1532, 706], respectively.

In this case, considering that the color vector is a three-dimensional vector of R, G and B, the polarization amplitude color component $I_{amp}(x, y)$ can be represented by the following Equation (19):

$$\begin{bmatrix} R_{amp}(x, y) \\ G_{amp}(x, y) \\ B_{amp}(x, y) \end{bmatrix} = C_1(x, y) \cdot \begin{bmatrix} R_{Light} \\ G_{Light} \\ B_{Light} \end{bmatrix} + C_2(x, y) \cdot \begin{bmatrix} R_{min}(x, y) \\ G_{min}(x, y) \\ B_{min}(x, y) \end{bmatrix} \quad (19)$$

In Equation (19), $R_{amp}(x, y)$, $G_{amp}(x, y)$ and $B_{amp}(x, y)$ are the R, G and B components of the polarization amplitude color component $I_{amp}(x, y)$, $R_{Light}$, $G_{Light}$ and $B_{Light}$ are the R, G and B components of the light source color vector $I_{Light}$, and $R_{min}(x, y)$, $G_{min}(x, y)$ and $B_{min}(x, y)$ are the R, G and B components of the polarization minimum color component $I_{min}(x, y)$.

In Equation (19), the color vector I(x, y) of the subject has been calculated by the color image processing section 103, the light source color vector $I_{Light}$ has already been obtained by the light source color information collecting section 105, and the polarization minimum color information $I_{min}(x, y)$ has already been calculated by the polarization information processing section 104. That is why although there are three equations in Equation (19), only C1(x, y) and C2(x, y) are unknown. Thus, by adopting the minimum square method, C1(x, y) and C2(x, y) can be obtained by the following Equation (20):

$$\begin{bmatrix} C_1(x, y) \\ C_2(x, y) \end{bmatrix} = \left( \begin{bmatrix} R_{Light} & R_{min}(x, y) \\ G_{Light} & G_{min}(x, y) \\ B_{Light} & B_{min}(x, y) \end{bmatrix}^T \cdot \begin{bmatrix} R_{Light} & R_{min}(x, y) \\ G_{Light} & G_{min}(x, y) \\ B_{Light} & B_{min}(x, y) \end{bmatrix} \right)^{-1} \cdot \quad (20)$$

$$\begin{bmatrix} R_{Light} & R_{min}(x, y) \\ G_{Light} & G_{min}(x, y) \\ B_{Light} & B_{min}(x, y) \end{bmatrix}^T \cdot \begin{bmatrix} R_{amp}(x, y) \\ G_{amp}(x, y) \\ B_{amp}(x, y) \end{bmatrix}$$

The image component separating section 106 further separates each of the components that have been separated by the polarization information processing section 104 and the image component separating section 106 itself in accordance with the component separation standard shown in FIG. 19.

The "diffuse reflection non-polarized component", "diffuse reflection polarized component" and "specular reflection polarized component" that have been separated by the image separating method of this preferred embodiment are as shown in FIGS. 11(b), 11(d) and 11(e), respectively. Specifically, FIG. 11(b) shows the polarization minimum color image $I_{min}(x, y)$ as the "diffuse reflection non-polarized component". FIG. 11(d) shows the polarization amplitude polarization minimum color vector component $I_{amp2}(x, y)$ as the "diffuse reflection polarized component". And FIG. 11(e) shows the polarization amplitude light source color vector component $I_{amp1}(x, y)$ as the "specular reflection polarized component".

According to the conventional specular and diffuse reflection component separating technique that uses the polarization information, $I_{amp}(x, y)$ shown in FIG. 11(c) and $I_{min}(x, y)$ shown in FIG. 11(b) are separated by mistake as the "specular reflection component" and "diffuse reflection component", respectively. As a result, in an area where the angle of emittance is rather large (i.e., near the occluding edge), the specular reflection component that should not be present is detected anyway. According to the image separating technique of this preferred embodiment, however, such a problem never arises.

Optionally, the light source color information collecting section 105 may collect the color information of the light source by reference to the object's information that has been obtained by the color information processing section 103 and the polarization information processing section 104. As described above, according to the dichroic reflection model, the color vector I(x, y) of the subject is separated into a specular reflection component that is equal to the color vector of the light source and the diffuse reflection component that has the object color vector.

In the regular reflection area where the specular reflection component is outstanding, the diffuse reflection component could be negligible. Also, supposing a pixel that has the highest intensity in the given image is located in the regular reflection area, the color vector of that pixel would be the same as that of the light source. Thus, the light source color information collecting section 105 detects a pixel that has the highest intensity in the color image information that has been obtained by the color information processing section 103 and estimates the color vector of that pixel to be the color vector of the light source. For instance, in the example illustrated in FIG. 18(a), the pixel with the highest intensity is located at the position (x, y)=(528, 394). Therefore, I(x, y) of that pixel can be estimated to be the light source color vector.

Alternatively, the light source color information collecting section 105 may detect a pixel with the highest intensity at the polarization minimum intensity $I_{min}$ obtained by the color information processing section 103 or at the polarization amplitude intensity $I_{amp}$ obtained by the polarization information processing section 104, and may estimate the polarization minimum intensity $I_{min}$ or the polarization amplitude intensity $I_{amp}$ of that pixel to be the color vector of the light source.

Also, instead of separating the given color image into a diffuse reflection non-polarized component, a diffuse reflection polarized component and a specular reflection polarized component, the image component separating section 106 may separate the color image into a diffuse reflection component and a specular reflection component. To do that, Equation (17) may be modified into the following Equation (21):

$$I(x, y) = C_1(x, y) \cdot I_{Light} + \{C_2(x, y) + 1\} \cdot I_{min}(x, y) \quad (21)$$
$$= C_1(x, y) \cdot I_{Light} + C_3(x, y) \cdot I_{min}(x, y)$$

For that purpose, the polarization amplitude polarization minimum color vector component $I_{amp2}(x, y)$ and the polarization minimum color component $I_{min}(x, y)$ obtained by Equation (18) may be synthesized.

Figure 21:
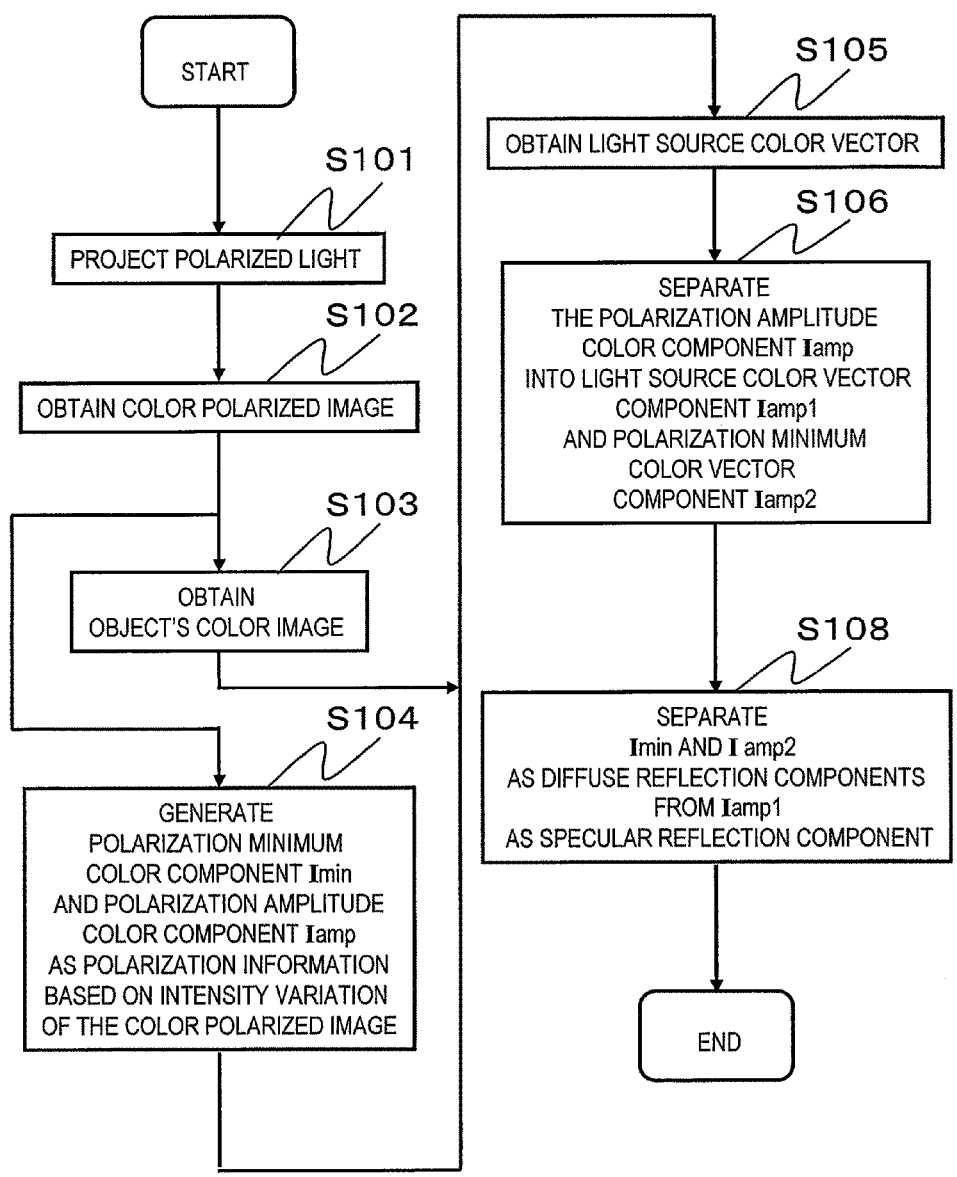
FIG. 21 is a flowchart showing the processing flow of another image separating method according to the first preferred embodiment of the present invention.

FIG. 20 shows a standard by which the components need to be separated from each other in this case. FIG. 21 is a flowchart illustrating the procedure of image separation processing steps to be done according to this preferred embodiment. In FIG. 21, the same processing step as what is also shown in FIG. 2 is identified by the same reference numeral as its counterpart's and a detailed description thereof will be omitted herein to avoid redundancies. In the example illustrated in FIG. 21, a pixel with the highest intensity is detected and the color vector of that pixel is estimated to be the color vector of the light source.

In this example, the image component separating section 106 separates the color image into the polarization minimum color component $I_{min}$, which has been generated by the polarization information processing section 104, as a diffuse reflection non-polarized component, the polarization amplitude polarization minimum color vector component $I_{amp2}$ (generated based on the polarization minimum color component $I_{min}$) as a diffuse reflection component, and the polarization amplitude light source color vector component $I_{amp1}$ as a specular reflection component (in Step S108).

Figure 23:
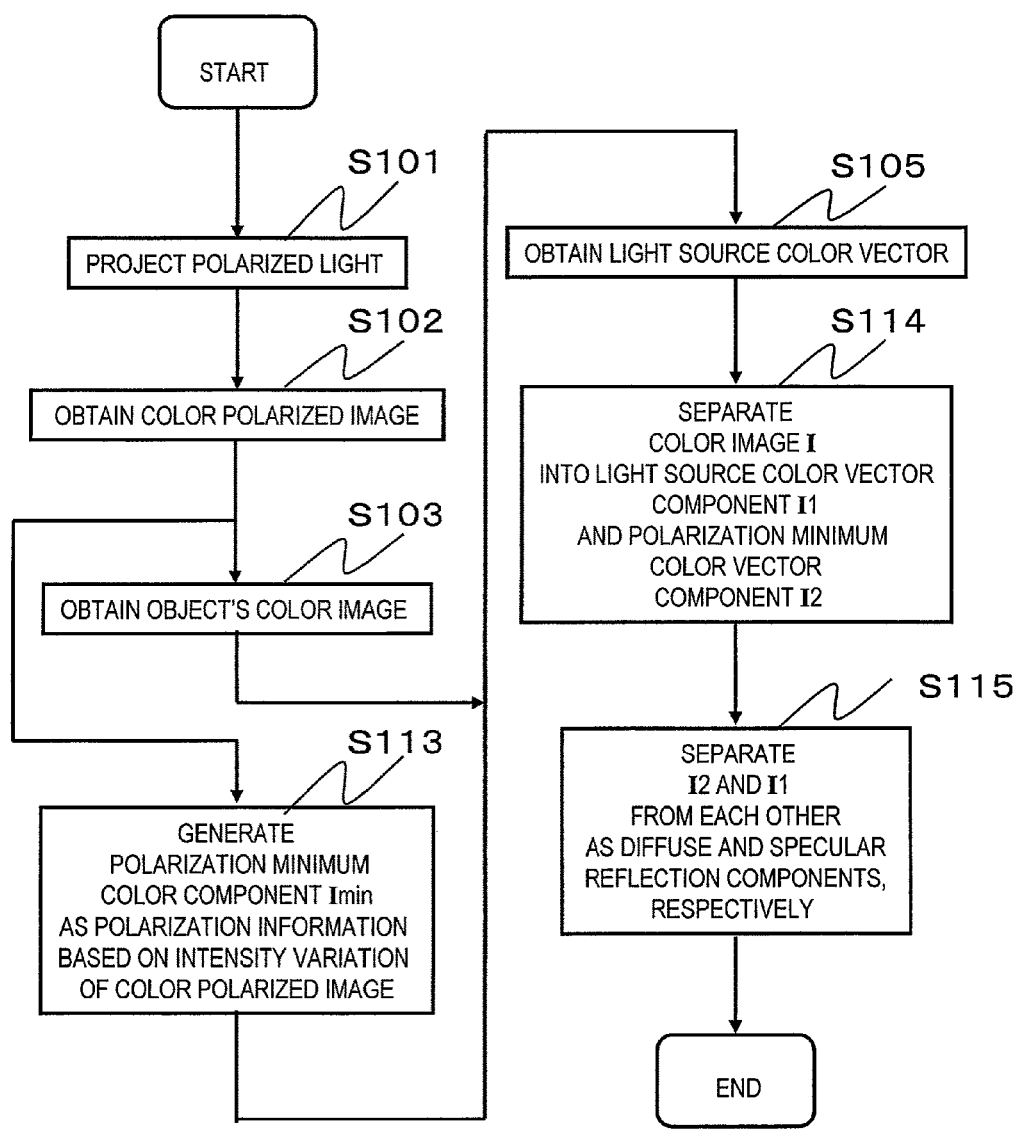
FIG. 23 is a flowchart showing the processing flow of another image separating method according to the first preferred embodiment of the present invention.

According to the image component separating technique of this preferred embodiment, FIG. 11(e) shows a "specular reflection component" and FIG. 11(f) shows a "diffuse reflection component". Instead of separating the polarization amplitude color component $I_{amp}$ into a light source color vector component and a polarization minimum color vector component, the image component separating section 106 may also separate the color image, obtained by the color and polarization obtaining section 102, into a light source color vector component and a polarization minimum color vector component. FIG. 22 shows a standard by which the components need to be separated from each other in that case. FIG. 23 is a flowchart illustrating the procedure of alternative image separation processing steps to be done according to this preferred embodiment. In FIG. 23, the same processing step as what is also shown in FIG. 2 is identified by the same reference numeral as its counterpart's and a detailed description thereof will be omitted herein to avoid redundancies.

In FIG. 23, the polarization information processing section 104 generates a polarization minimum color component $I_{min}$ as a piece of polarization information based on the information provided by the color and polarization obtaining section 102 (in Step S113). In this case, the processing steps S103 and S113 may be performed in an arbitrary order—could be performed either in parallel with each other or sequentially. The light source color information collecting section 105 obtains the color vector $I_{Light}$ of the light source that is now irradiating the object (in Step S105). The light source's color vector can be obtained by any of the various methods described above.

The image component separating section 106 separates the color image I that has been generated by the color information processing section 103 into a color image light source color vector component I1 and a color image polarization minimum color vector component I2 (in Step S114). Then, the image component separating section 106 further separates the color image polarization minimum color vector component I2 as a diffuse reflection non-polarized component and the color image light source color vector component I1 as a specular reflection component from each other (in Step S115).

Optionally, the image component separating section 106 may separate the image in view of shadows. This is because the light rays will get reflected multiple times and gets too complicated in shadows to keep the polarization information reliable enough. Thus, the degree of accuracy of image separation would decrease in a shadow area.

Figure 25:
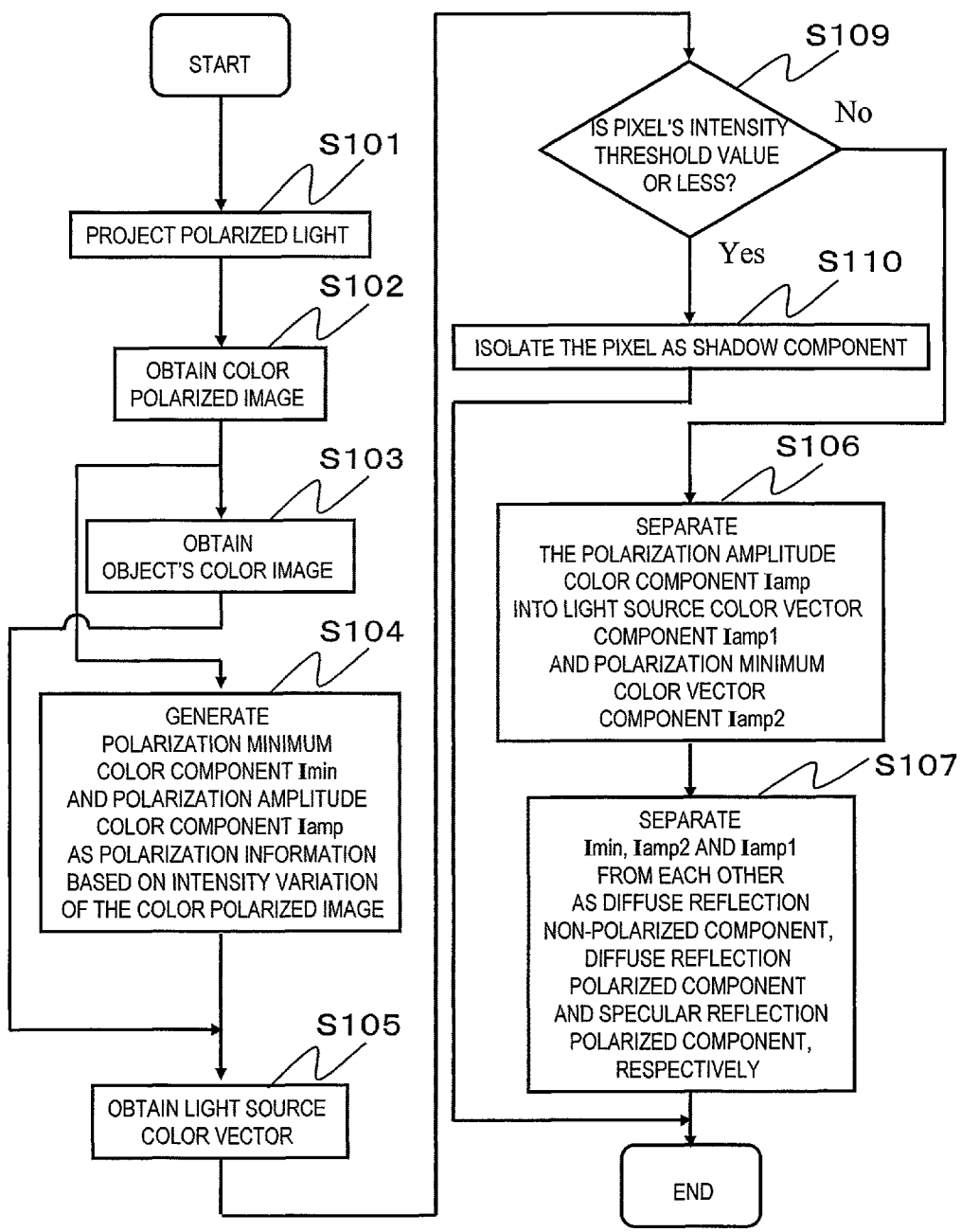
FIG. 25 is a flowchart showing the processing flow of another image separating method according to the first preferred embodiment of the present invention.

FIG. 24 shows a standard by which the components need to be separated from each other in that case. FIG. 25 is a flowchart illustrating the procedure of alternative image separation processing steps to be done according to this preferred embodiment. In FIG. 25, the same processing step as what is also shown in FIG. 2 is identified by the same reference numeral as its counterpart's and a detailed description thereof will be omitted herein to avoid redundancies.

First of all, to see if a given pixel is in a shadow, the image component separating section 106 determines whether or not the intensity of that pixel is equal to or smaller than a threshold value (in Step S109). The intensity should be low in a shadow area. That is why if a pixel of the color image that has been generated by the color information processing section 103 has an intensity that is equal to or smaller than the threshold value, then it can be determined that the pixel is in a shadow area. In this case, the magnitude of the threshold value may be determined empirically. As for a 16-bit monochrome image, for example, the threshold value may be set to be 256, for example. As the intensity for detecting a shadow, the polarization maximum or minimum intensity $I_{max}$ or $I_{min}$ obtained by the polarization information processing section 104 or the average or weighted sum of the polarization maximum and minimum intensities $I_{max}$ and $I_{min}$ (e.g., $I_{max}+I_{min}$ or $I_{max}+2 \cdot I_{min}$) could be used. Among other things, $I_{max}+I_{min}$ represents an image that is equivalent to an image to be captured under a linearly polarized light source without using a polarizer. For that reason, by performing image processing using $I_{max}+I_{min}$, the processing can be carried out in the same way as in a normal situation where polarization is not used. Also, it is very effective to use the polarization minimum intensity $I_{min}$ because the influence of a specular reflection component, which could have so high intensity as to generate whiteout phenomenon, can be minimized by doing that. If the intensity of the given pixel is smaller than the threshold value (i.e., if the answer to the query of the processing step S0109 is Yes), then the pixel is determined to be a shadow component (in Step S110) to end the processing.

On the other hand, if the intensity of the pixel is equal to or greater than the threshold value (i.e., if the answer to the query of the processing step S109 is No), then the pixel is determined to be out of a shadow. The image component separating section 106 will separate the polarization amplitude color component $I_{amp}$ into a polarization amplitude light source color vector component $I_{amp1}$ and a polarization amplitude polarization minimum color vector component $I_{amp2}$ (in Step S106) as described above. And the image component separating section 106 will separate the polarization minimum color component $I_{min}$ generated by the polarization information processing section 104 as a diffuse reflection non-polarized component, the polarization amplitude polarization minimum color vector component $I_{amp2}$ as a diffuse reflection polarized component, and the polarization amplitude light source color vector component $I_{amp1}$ as a specular reflection polarized component from each other (in Step S107).

The light emitter 206 is preferably arranged as far away from the image capture device 203 as possible. The reason is as follows. Specifically, if the light emitter 206 were arranged near the image capture device 203, a specular reflection component would be observed in an area where the angle of incidence is in the proximity of zero degrees. This is because a specular reflection component is observed near a regular reflection area. In such an area where the angle of incidence is in the proximity of zero degrees, however, the specular reflection component is hardly polarized as can be seen from FIG. 16. That is why a lot of specular reflection components would be included in the polarization minimum intensity $I_{min}(x, y)$ and the image component separating section 106 would achieve only a low degree of image separation accuracy.

Figure 26:
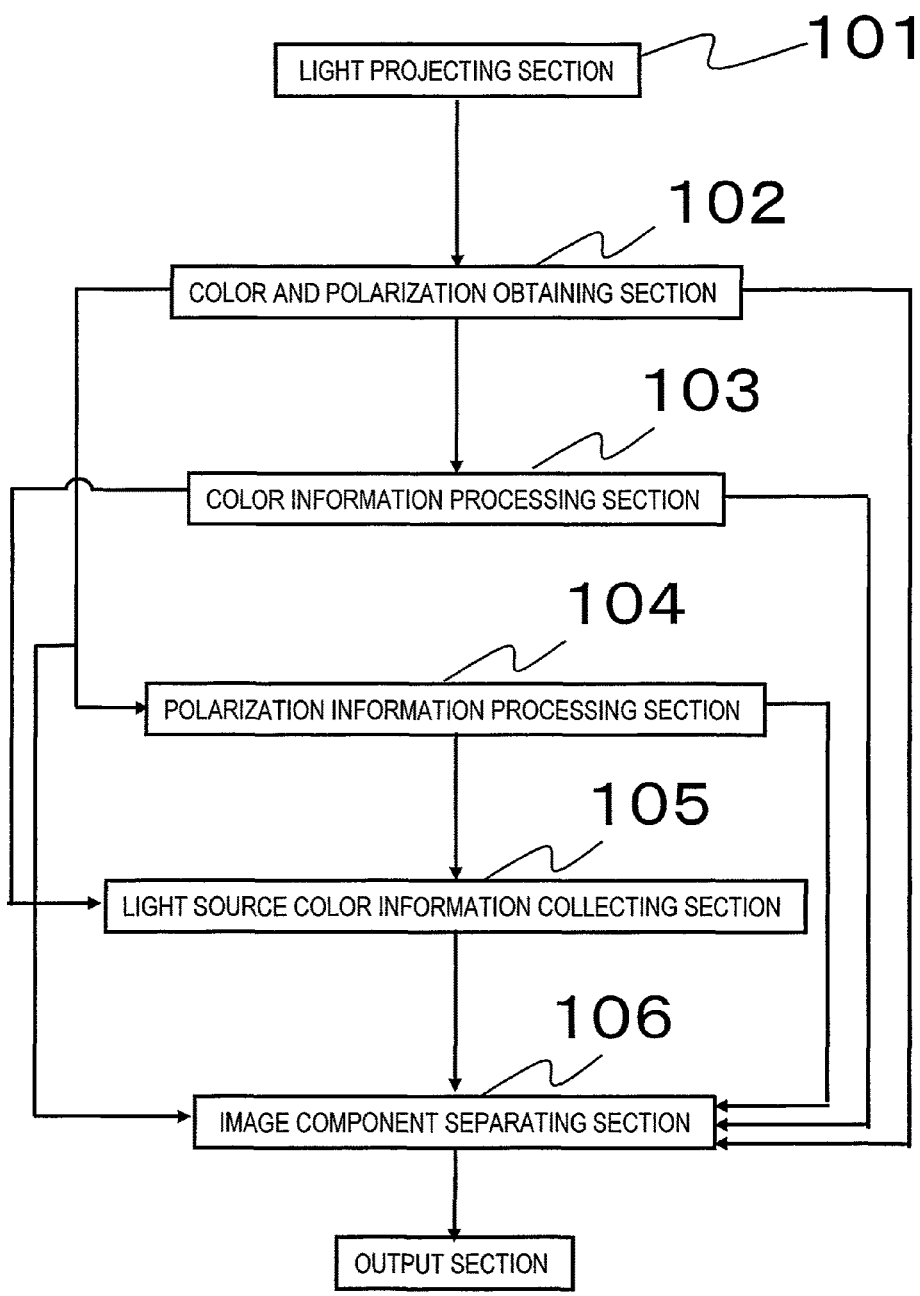
FIG. 26 is a block diagram illustrating an alternative image processing apparatus according to the first preferred embodiment of the present invention.
Figure 27:
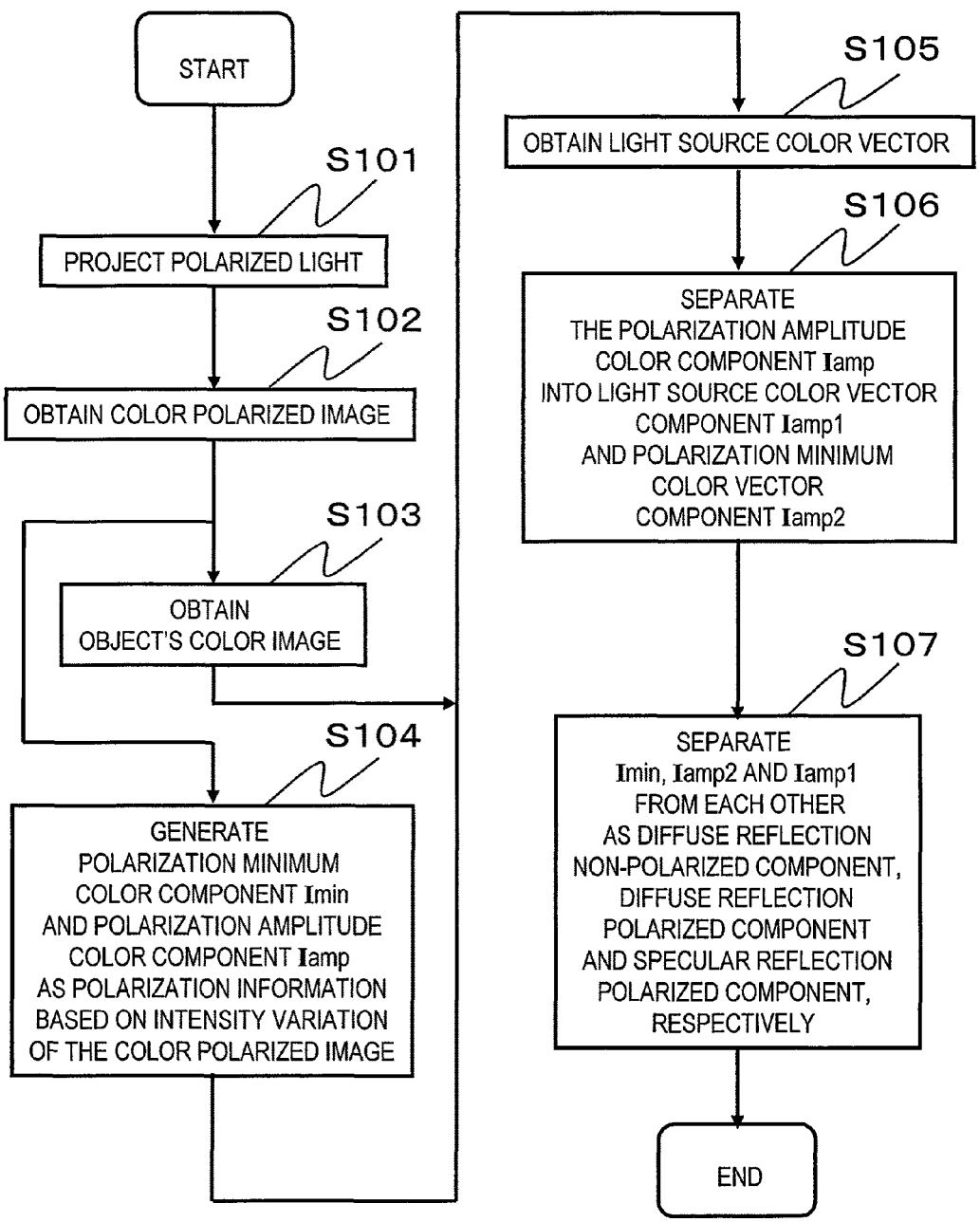
FIG. 27 is a flowchart showing the processing flow of another image separating method according to the first preferred embodiment of the present invention.

FIG. 26 is a block diagram illustrating another exemplary configuration for an image processing apparatus according to this preferred embodiment. This is a block diagram of functional blocks for use to carry out the processing in which the light source color information collecting section 105 collects the color information of the light source by reference to the object's information provided by the color information processing section 103 and the polarization information processing section 104. In FIG. 26, the same element as what is also shown in FIG. 1 is identified by the same reference numeral as its counterpart's and a detailed description thereof will be omitted herein. FIG. 27 is a flowchart illustrating the procedure of image separation processing steps to be done according to this preferred embodiment. In FIG. 27, the same processing step as what is also shown in FIG. 2 is identified by the same reference numeral as its counterpart's and a detailed description thereof will be omitted herein to avoid redundancies. In FIG. 2, the processing steps S103, S104 and S105 may be performed in an arbitrary order. In FIG. 27, however, only the processing steps S103 and S104 may be performed in an arbitrary order. These processing steps S103 and S104 could be performed either in parallel with each other or sequentially.

In the preferred embodiment described above, a photonic crystal is supposed to be used as the patterned polarizer 201. Alternatively, a shooting operation may also be carried out while rotating a polarizer, which is arranged in front of the lens of the image capture device, without using the patterned polarizer so that intensities measured along mutually different polarization principal axes are obtained time sequentially. Such a method is disclosed in Japanese Patent Application Laid-Open Publication No. 11-211433, for example. In that case, if either the object or the camera is in motion, an object tracking technique, which is used extensively in the field of image processing, may be adopted (see, for example, Jianbo Shi and Carlo Tomasi, "Good Features to Track", IEEE Conference on Computer Vision and Pattern Recognition, pp. 593-600, 1994).

Figure 28:
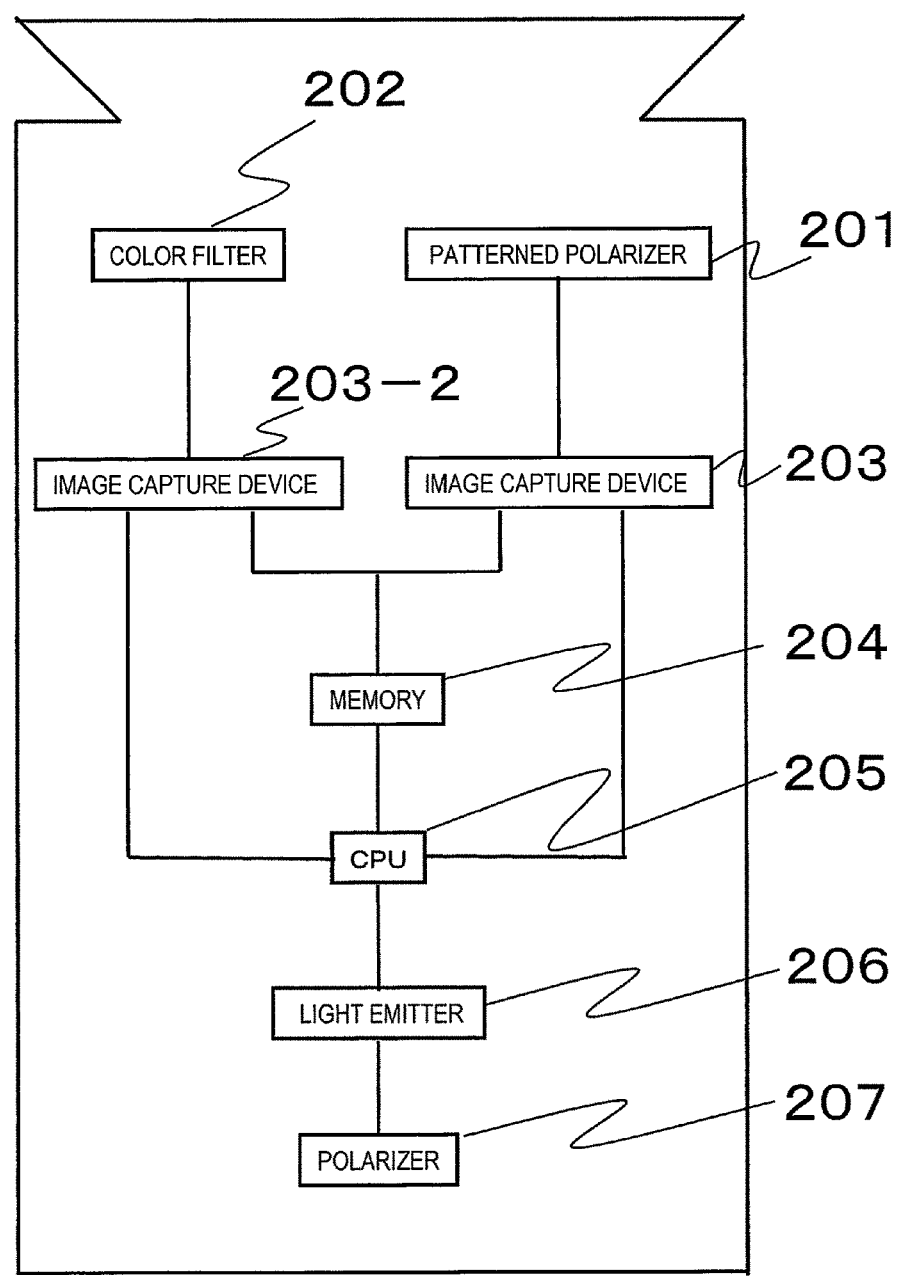
FIG. 28 illustrates an exemplary configuration for a camera in which the image processing apparatus of the first preferred embodiment of the present invention is built.

The color and polarization obtaining section 102 does not have to obtain the color image information and the polarization information using the same image capture device 203 but may also obtain them using two different image capture devices. FIG. 28 illustrates an exemplary configuration for a camera with an image processing apparatus according to this preferred embodiment, of which the color and polarization obtaining section 102 includes two image sensors 203 and 203-2 to collect color image information and polarization information, respectively. In that case, the respective optical axes of those two image sensors 203 and 203-2 are preferably aligned with each other using a beam splitter, for example.

As described above, by adopting the image separation method of the present invention, image separation can be done by reference to polarization information and color information. According to such an image separation method, a specular reflection component and a diffuse reflection component may also be separated from each other with the polarized component of the diffuse reflection component taken into account.

Embodiment 2

Figure 29:
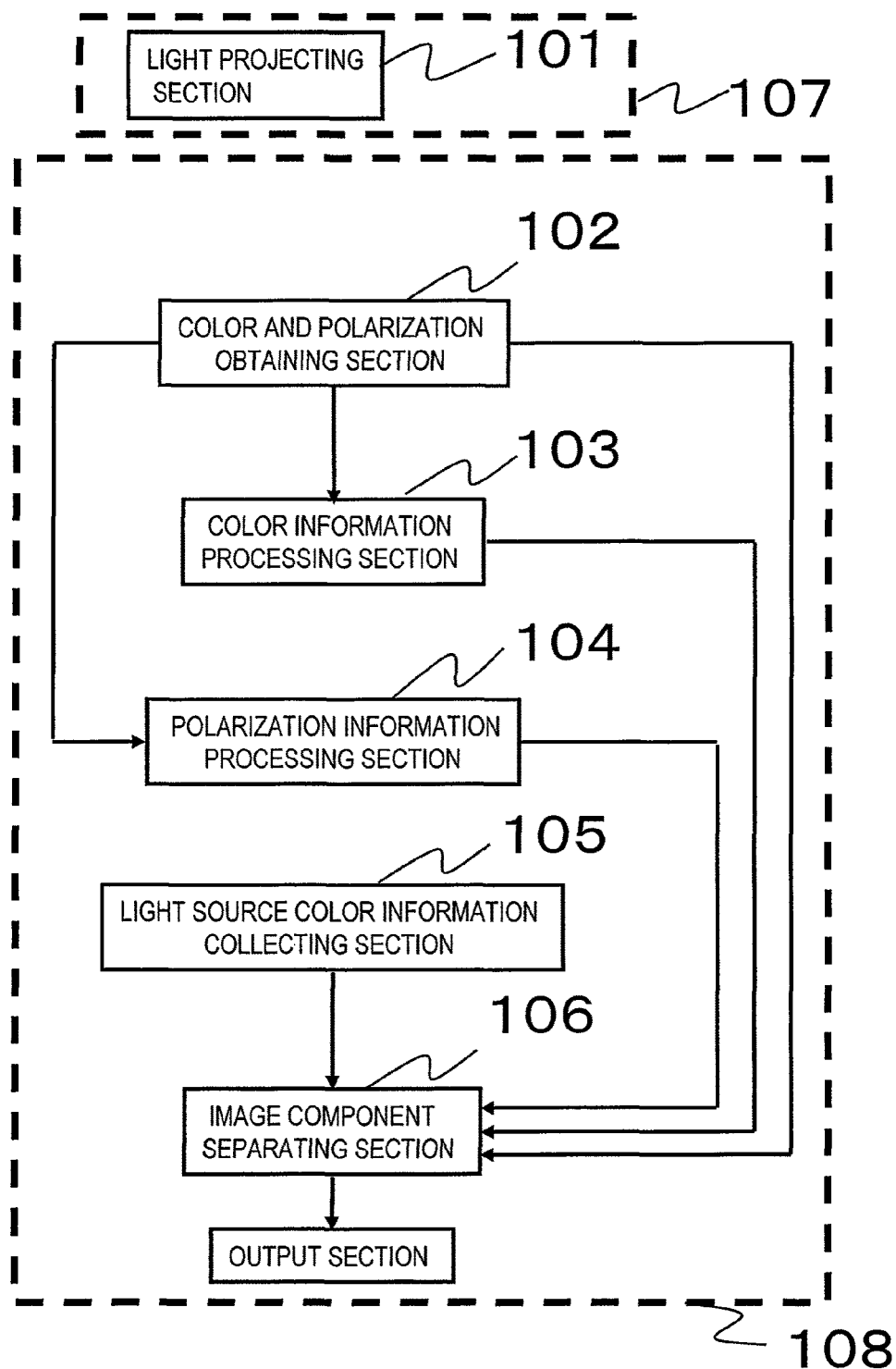
FIG. 29 is a block diagram illustrating an image processing apparatus as a second preferred embodiment of the present invention.
Figure 30:
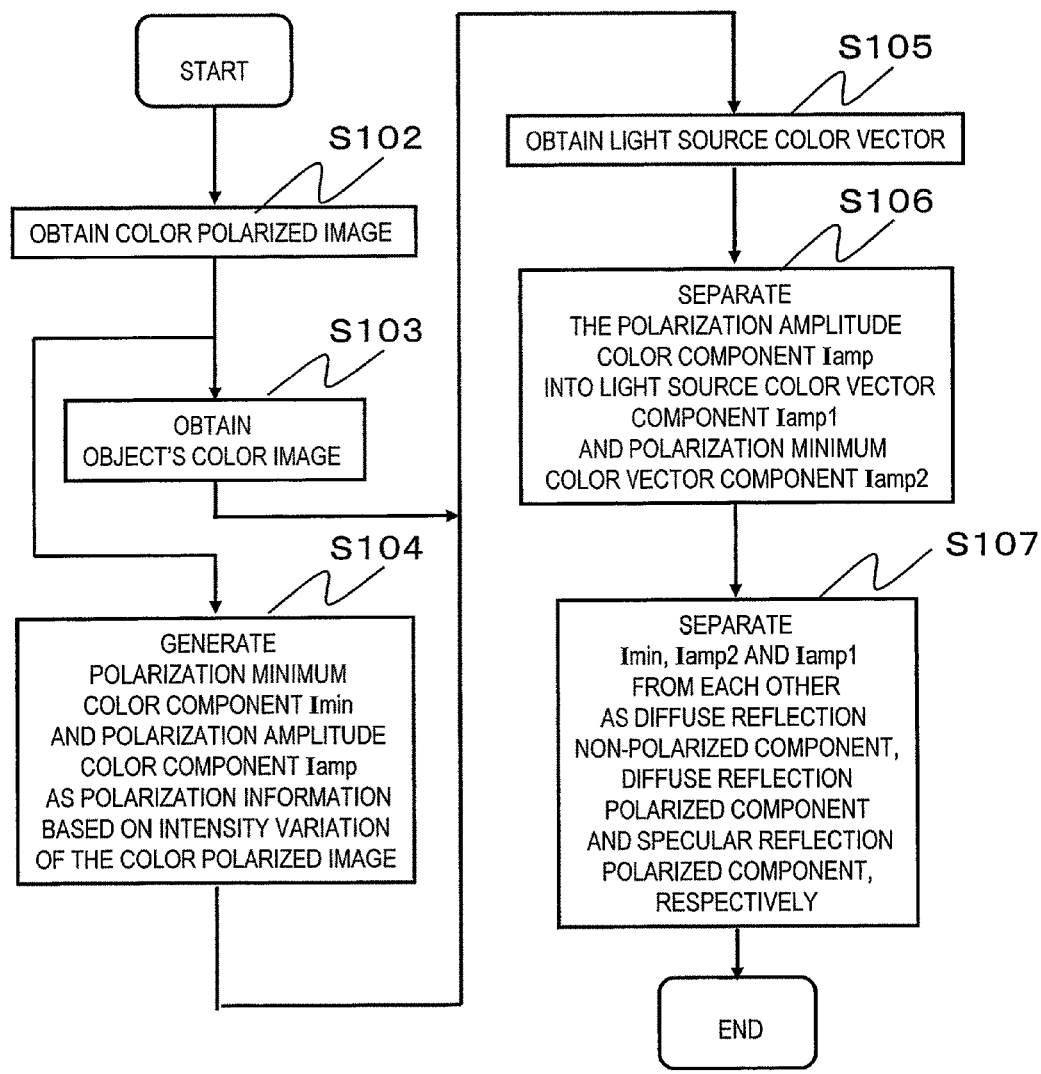
FIG. 30 is a flowchart showing the processing flow of an image separating method according to the second preferred embodiment of the present invention.
Figure 31:
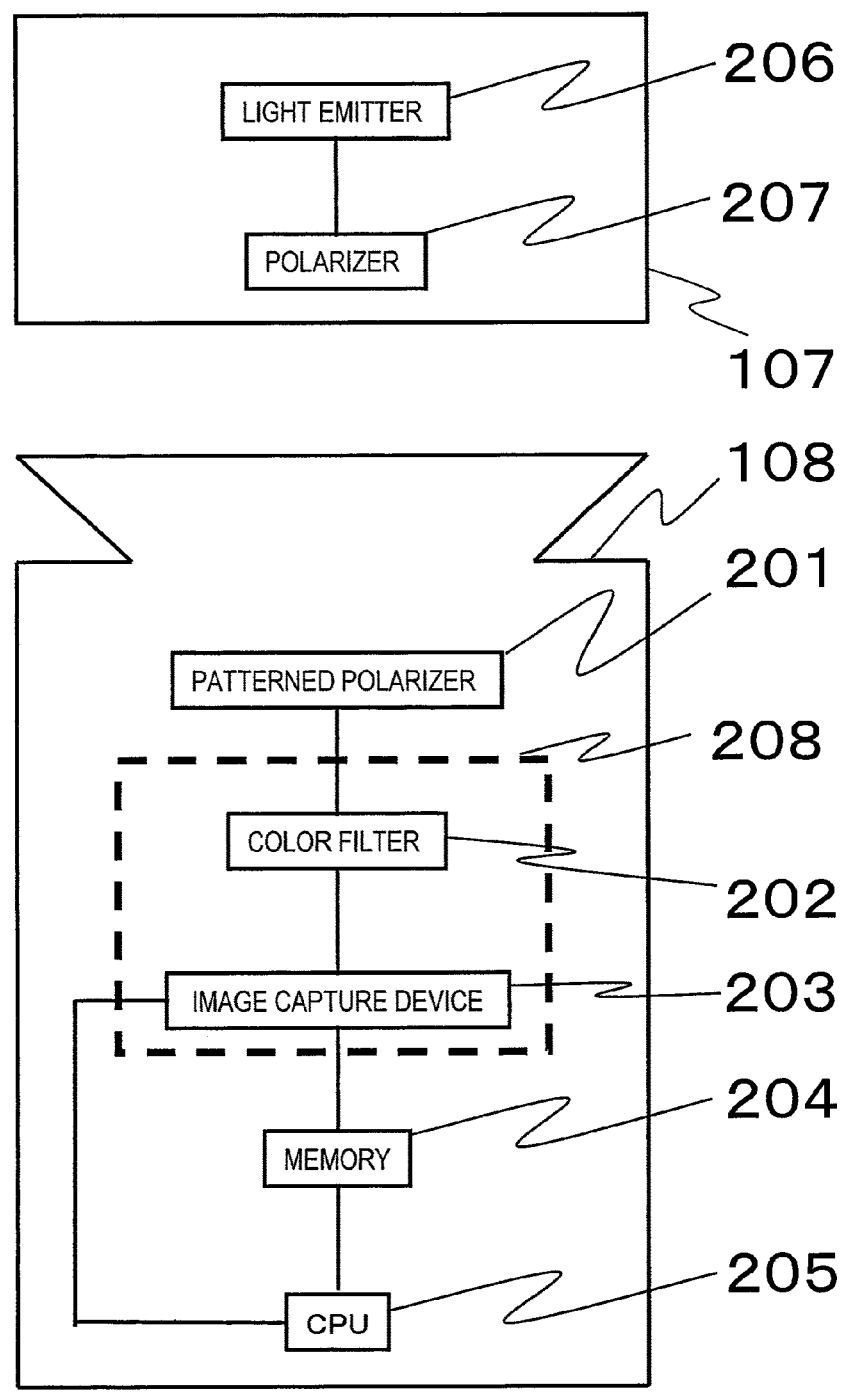
FIG. 31 illustrates an exemplary configuration for a camera in which the image processing apparatus of the second preferred embodiment of the present invention is built.

FIG. 29 is a block diagram illustrating an image separation system as a second specific preferred embodiment of the present invention. In FIG. 29, the same element as what is also shown in FIG. 1 is identified by the same reference numeral as its counterpart's and a detailed description thereof will be omitted herein. The difference from the first preferred embodiment is that the projector 107 and the image processing apparatus 108 are separated from each other according to this preferred embodiment. FIG. 30 is a flowchart illustrating the procedure of image separation processing steps to be done by the image processing apparatus of this preferred embodiment. In FIG. 30, the same processing step as what is also shown in FIG. 2 is identified by the same reference numeral as its counterpart's and a detailed description thereof will be omitted herein to avoid redundancies. Furthermore, FIG. 31 illustrates an exemplary configuration for a camera with the image processing apparatus 108 of this preferred embodiment and for the projector 107. In FIG. 31, the same element as what is also shown in FIG. 3 is identified by the same reference numeral as its counterpart's and a detailed description thereof will be omitted herein.

The image separation system of this preferred embodiment is comprised of a projector 107 and an image processing apparatus 108 and captures an object's image and separates the object's image into multiple components. The projector 107 includes a light projecting section 101 for projecting linearly polarized light toward the object. The image processing apparatus 108 includes: a color and polarization obtaining section 102 for getting a color polarized image of the object by receiving light that has been transmitted through a polarizer with three or more different polarization principal axis directions at a color filter; a color information processing section 103 for generating a color image based on the image obtained by the color and polarization obtaining section 102; a polarization information processing section 104 for generating, based on the image obtained by the color and polarization obtaining section 102, color and polarization information, which is the color information of the polarized light received, in accordance with an association with the intensity of the light that has been transmitted through the polarizer with the three or more directions for each of unit pixels that form the polarized image; a light source color information collecting section 105 for collecting color information of the light source that projects the light toward the object; and an image component separating section 106 for separating the color image, generated by the color information processing section 103, into multiple components based on the polarization information generated by the polarization information processing section 104 and the light source color information collected by the light source color information collecting section 105.

The projector 107 and the image processing apparatus 108 may carry out synchronized processing, and the image processing apparatus 108 may capture an image in response to a sync signal supplied from the projector 107. Hereinafter, such processing will be described.

Figure 32:
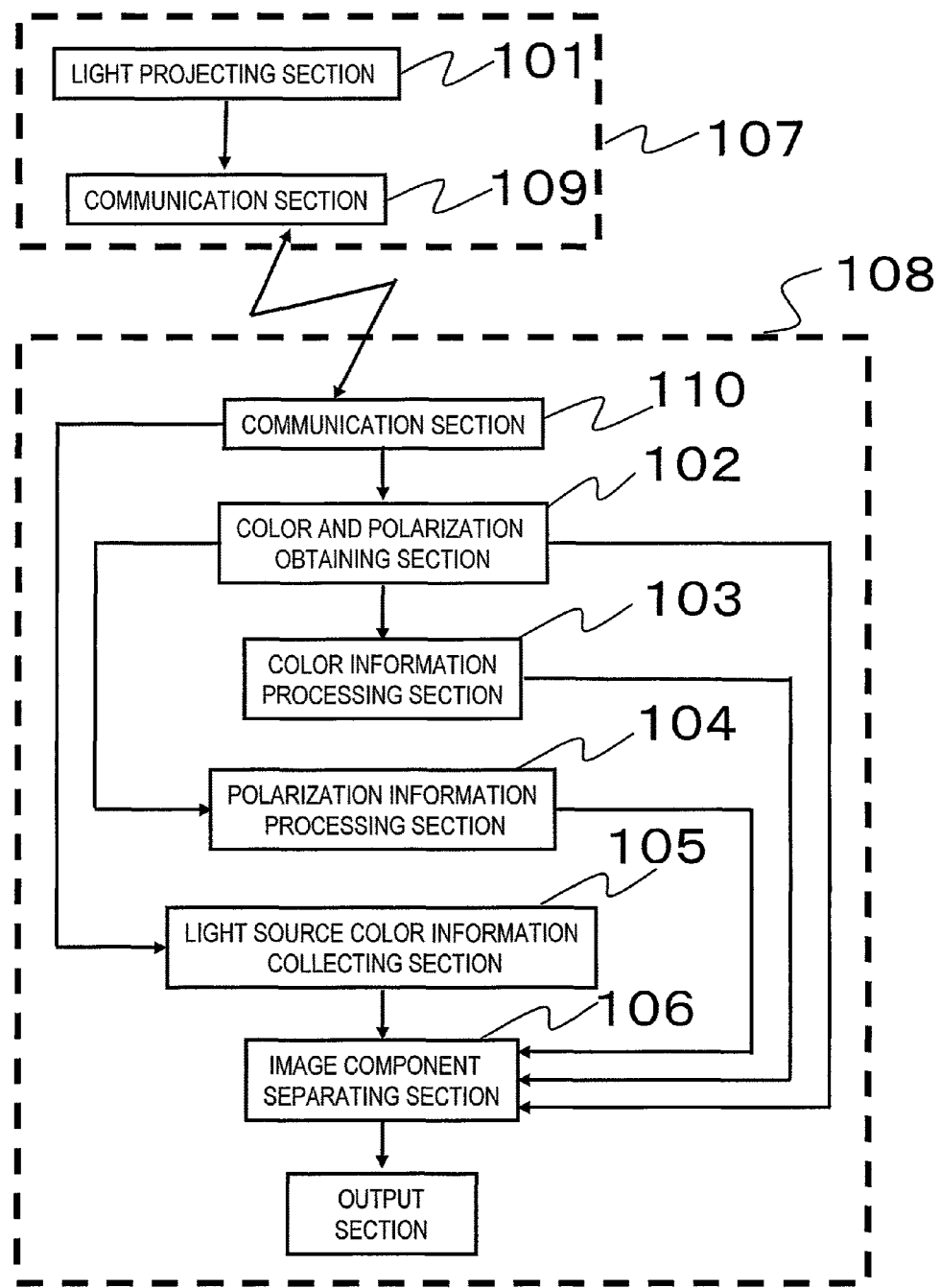
FIG. 32 is a block diagram illustrating another image processing apparatus according to the second preferred embodiment of the present invention.
Figure 33:
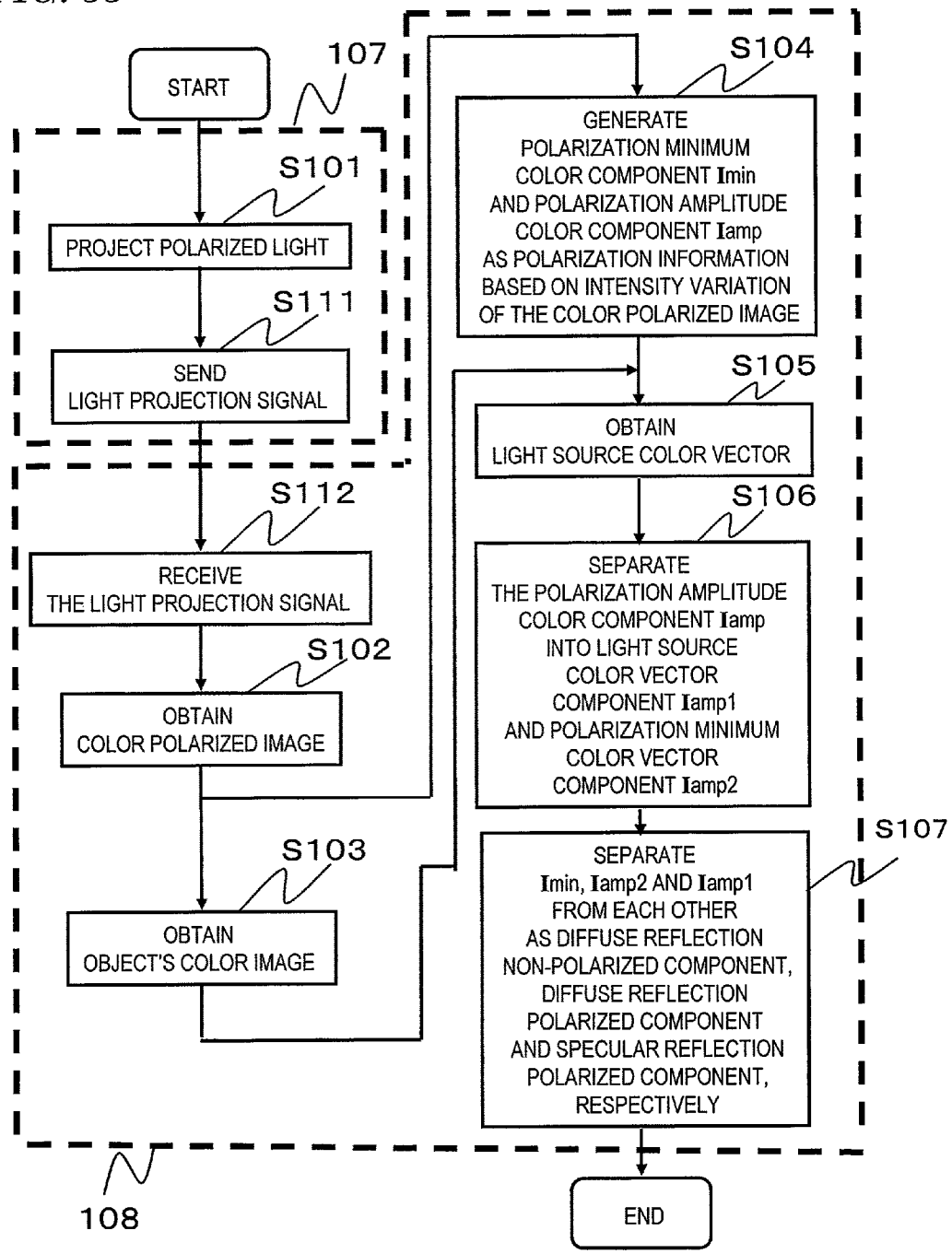
FIG. 33 is a flowchart showing the processing flow of another image separating method according to the second preferred embodiment of the present invention.
Figure 34:
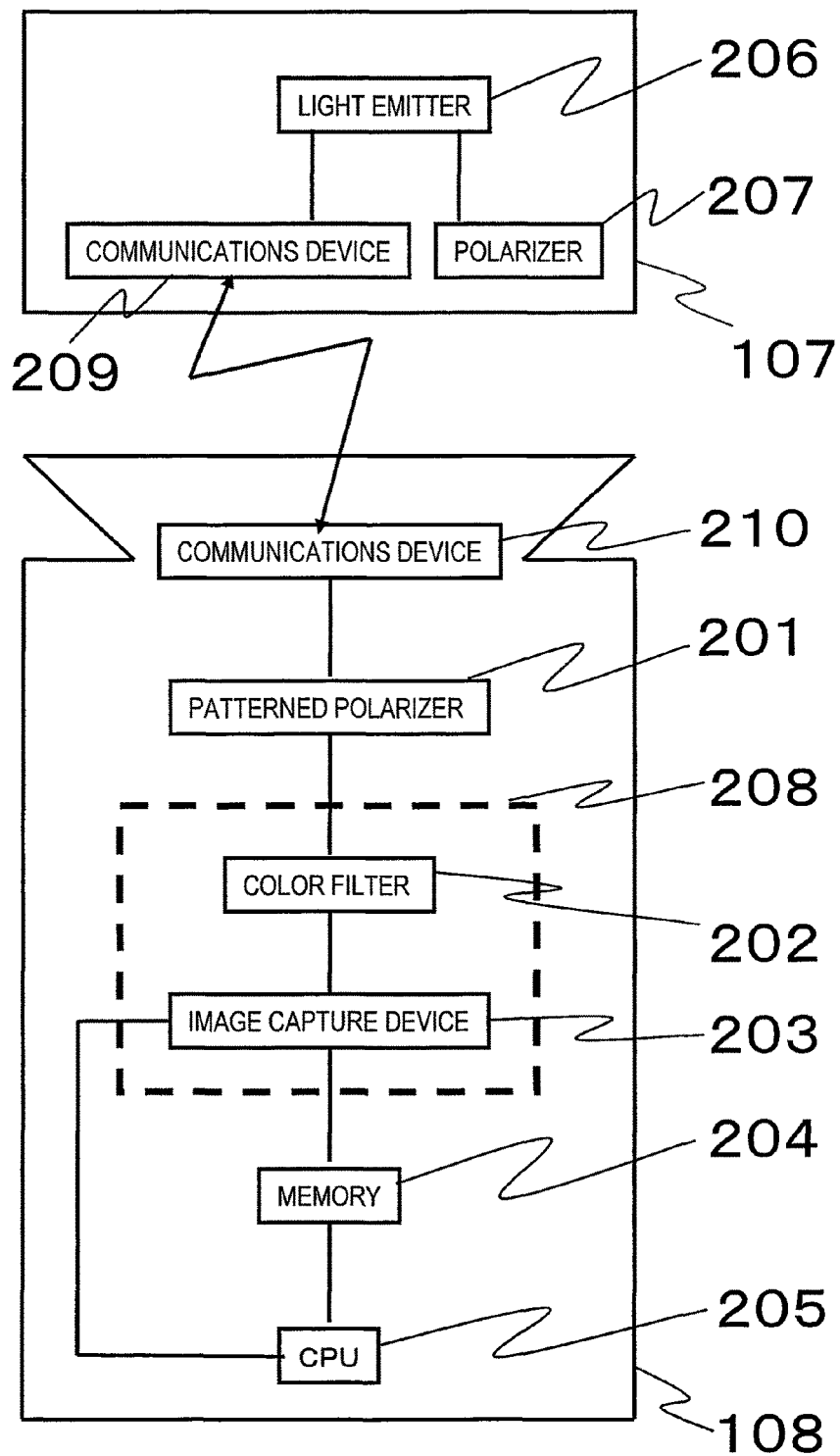
FIG. 34 illustrates an exemplary configuration for another camera in which the image processing apparatus of the second preferred embodiment of the present invention is built.

FIG. 32 is a block diagram illustrating another image separation system according to the second preferred embodiment of the present invention. In FIG. 32, the same element as what is also shown in FIG. 29 is identified by the same reference numeral as its counterpart's and a detailed description thereof will be omitted herein. The difference from the system shown in FIG. 29 is that both the projector 107 and the image processing apparatus 108 have a communication section 109, 110 according to this preferred embodiment. FIG. 33 is a flowchart illustrating the procedure of image separation processing steps to be done by the projector 107 and the image processing apparatus 108 of this preferred embodiment. In FIG. 33, the same processing step as what is also shown in FIG. 2 is identified by the same reference numeral as its counterpart's and a detailed description thereof will be omitted herein to avoid redundancies. Furthermore, FIG. 34 illustrates an exemplary configuration for a camera with the image processing apparatus of this preferred embodiment and for the projector. In FIG. 34, the same element as what is also shown in FIG. 31 is identified by the same reference numeral as its counterpart's and a detailed description thereof will be omitted herein.

First of all, in Step S101, the projector 107 projects polarized light toward the object by the light projecting section 101 as described above. Next, the projector 107 gets a signal indicating the projection of light transmitted by its communication section 209 to the image processing apparatus 108 (in Step S111). The image processing apparatus 108 receives that signal indicating the projection of light at its communication section 210 (in Step S112). Then, the color and polarization obtaining section 102 gets an object's image captured by an image sensor through the patterned polarizer 201 and the color filter 202, thereby obtaining a color polarized image, which is a color image with color and polarization information (in Step S102). After that, polarization information, a color image and a light source color vector are obtained as described above by performing the processing steps S103 through S107, thereby getting the image separated eventually.

The communication section 109 may transmit not only the signal indicating the projection of light but also information about the color vector of the light source to the image processing apparatus 108. In that case, the light source color information processing section 105 may obtain the light source color vector information based on the signal received at the communication section 110.

The image separation system of this preferred embodiment separates the projector 107 from the image processing apparatus 108 and synchronizes projection of light and capturing of image with each other via communications, thereby getting image component separation done highly accurately although its size is small.

Model-based Image Synthesis Using Image Separation

The image component separating technique of the present invention can be used particularly effectively in model-based image synthesis processing for use in digital archiving, for example. According to the model-based image synthesis, the light source direction and viewing direction of an image captured can be changed arbitrarily. Thus, it is an important method for presenting captured image data interactively. On top of that, it is a very effective method for giving a sense of presence to the viewer, too. That is why the model-based image synthesis processing is applicable to a virtual museum and Augmented Reality (AR), for example. According to the conventional model-based image synthesis, an image captured is separated into multiple components such as specular reflection and diffuse reflection components and mutually different models are applied to the respective components. However, since the specular reflection and diffuse reflection components have been separated from each other insufficiently according to the conventional technique, the image quality would be degraded as described above. Such a problem will arise for the following reasons. Specifically, when parameters are estimated for the respective models, different specular reflection and diffuse reflection components from actual ones are used. As a result, the parameters estimated are also different from actual ones. And if an images was synthesized using such non-actual parameters, a viewpoint converted image or a light source changed image produced would have a significant error.

By adopting the image component separating technique of the present invention, however, model-based image synthesis can get done with the image quality hardly deteriorated. Hereinafter, such a technique will be described in detail.

Figure 35:
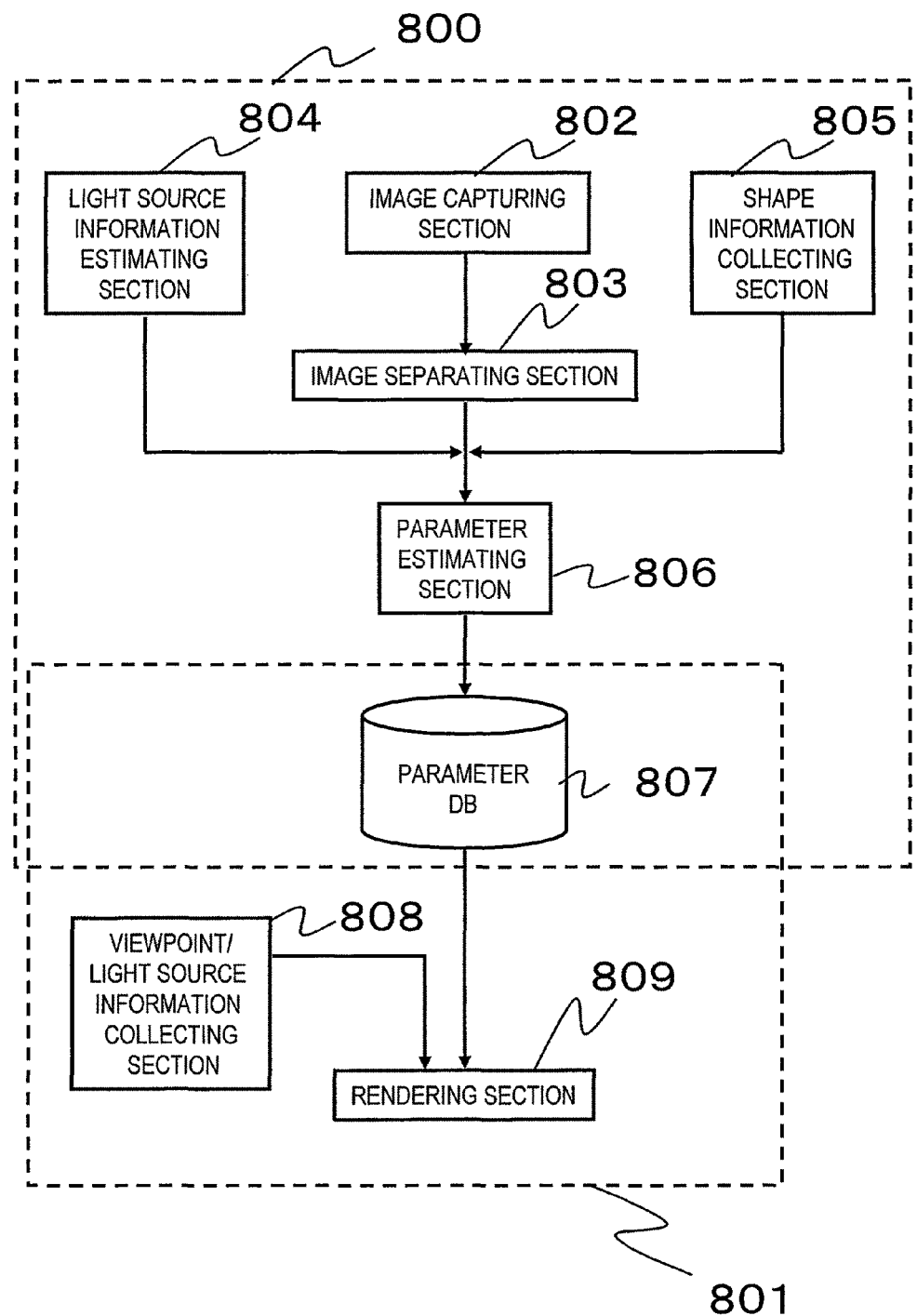
FIG. 35 is a block diagram illustrating an exemplary configuration for an image synthesizer according to the present invention.

First of all, the concept of this processing will be outlined. The image synthesis processing of the present invention is carried out by a parameter estimator 800 and an image synthesizer 801 by using the following five kinds of input information:

diffuse reflected image of the object,
 specular reflected image of the object,
 three-dimensional shape information of the object,
 position, color and illuminance of the light source, and
 information about the viewpoint and light source of the synthesized image FIG. 35 is a block diagram illustrating a configuration for a parameter estimator 800 and an image synthesizer 801 according to a preferred embodiment of the present invention. The parameter estimator 800 shown in FIG. 35 includes: an image capturing section 802 for capturing an object's image using an image capture device; an image separating section 803 for separating the image into a specular reflection component and a diffuse reflection component by the image separating method described above; a light source information estimating section 804 for estimating light source information including information about the direction, position, intensity, color and spectrum of a light source that irradiates the object; a shape information collecting section 805 for obtaining, as shape information, information about a normal to the object's surface or information about its three-dimensional position; a parameter estimating section 806 for estimating a reflection model parameter by modeling the light source information that has been estimated by the light source information estimating section and the shape information that has been obtained by the shape information collecting section for each of the multiple components that have been separated by the image separating section 803 with respect to the object's image captured; and a parameter DB (database) 807 for storing the reflection parameter that has been estimated by the parameter estimating section 806. The image synthesizer 801 includes: a viewpoint/light source information collecting section 808 for obtaining information about the viewpoints and light sources of an image to be synthesized; and a rendering section 809 for synthesizing the multiple images in accordance with the viewpoint and light source information that has been obtained by the viewpoint/light source information collecting section 808 by using the model parameter information that is stored in the parameter DB 807.

Figure 36:
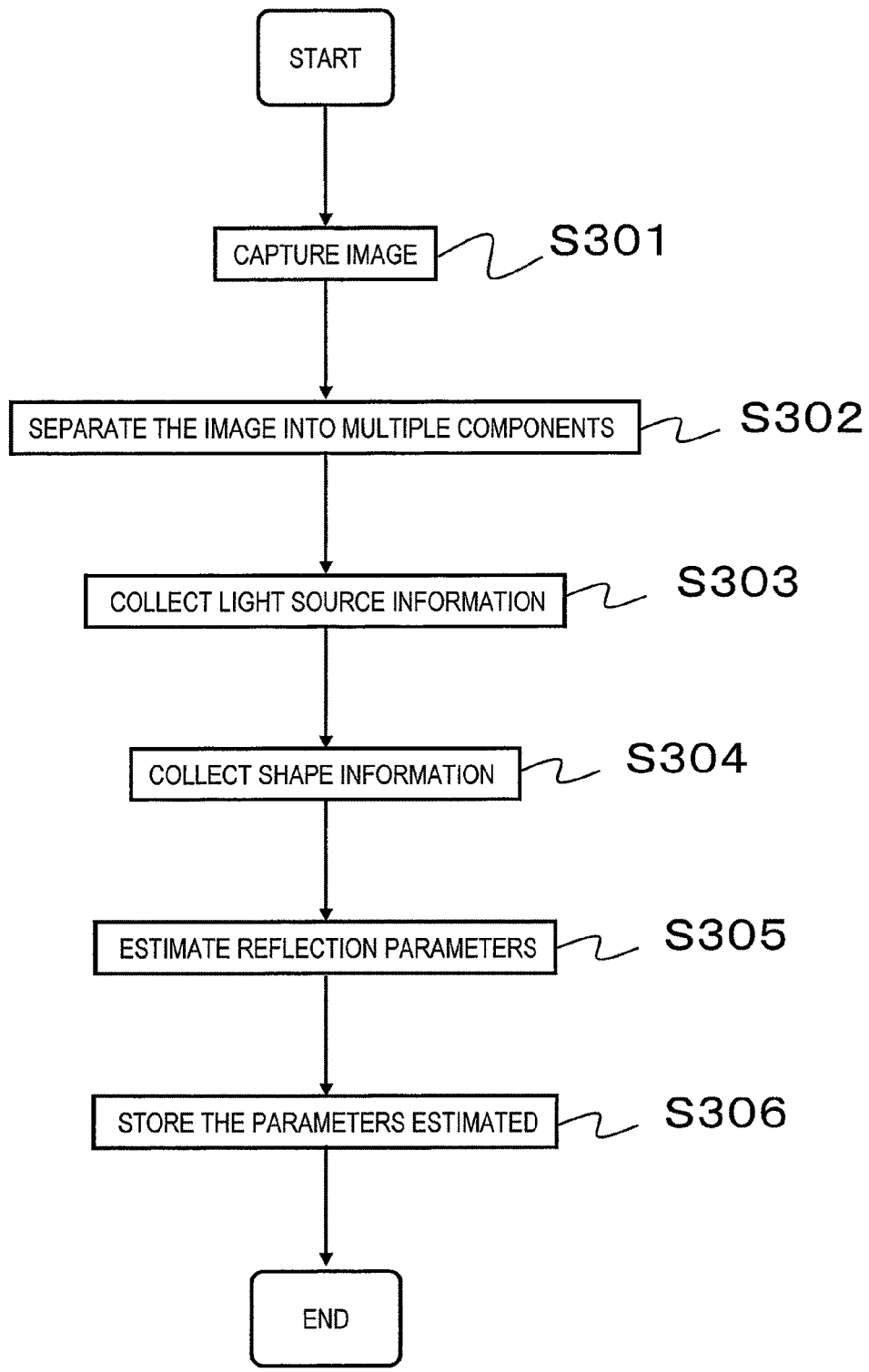
FIG. 36 is a flowchart showing the flow of parameter estimation processing in an image synthesizing method according to the present invention.
Figure 37:
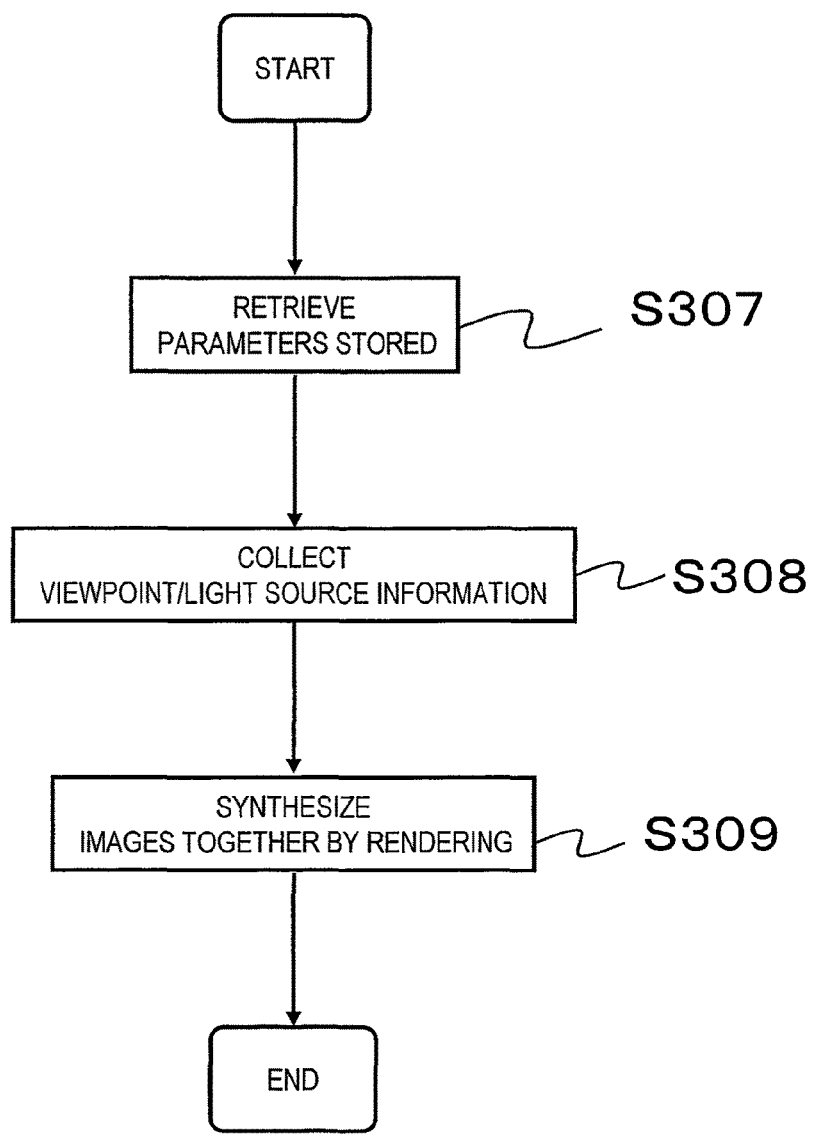
FIG. 37 is a flowchart showing the processing flow of image synthesis processing in an image synthesizing method according to the present invention.

FIGS. 36 and 37 are flowcharts showing the procedure of parameter estimating processing and the procedure of image synthesizing processing according to the image synthesizing method of this preferred embodiment.

First of all, the procedure of the parameter estimating processing will be described. As shown in FIG. 36, the image capturing section 802 gets a color intensity calculated by the color information processing section 103 described above (in Step S301). Alternatively, the image capturing section 802 may also get a weighted sum of the polarization maximum and minimum intensities $I_{max}$ and $I_{min}$ (such as $I_{max}+I_{min}$ or $I_{max}+2 \cdot I_{min}$) calculated by the polarization information processing section 104. Next, the image separating section 803 separates the image that has been captured by the image capturing section 802 into a diffuse reflection component and a specular reflection component by the image separating method described above (in Step S302). Then, the light source information estimating section 804 collects information about the direction, color and illuminance of the light source as light source information (in Step S303). The shape information collecting section 805 obtains, as the object's shape information, information about a normal to the object's surface or information about its three-dimensional position (in Step S304). The parameter estimating section 806 estimates reflection parameters by mutually different methods by applying the light source information estimated by the light source information estimating section and the shape information obtained by the shape information collecting section to the diffuse reflected and specular reflected images that have been separated by the image separating section 803 (in Step S305). Then, the parameter DB 807 stores the respective reflection parameters of the diffuse reflection and specular reflection components that have been obtained by the parameter estimating section 806 and the shape information obtained by the shape information collecting section S305 as model parameters (in Step S306).

Next, the procedure of image synthesizing processing will be described. As shown in FIG. 37, first of all, the rendering section 809 retrieves the model parameter information that is stored in the parameter DB 807 (in Step S307). The viewpoint/light source information collecting section 808 obtains information about the viewpoints of the image to be synthesized and information about the directions, colors and illuminances of the light sources (in Step S308). Then, the rendering section 809 synthesizes the image in accordance with the viewpoint and light source information that has been obtained by the viewpoint/light source information collecting section 808 by using the model parameter information stored in the parameter DB 807 (in Step S309).

Figure 38:
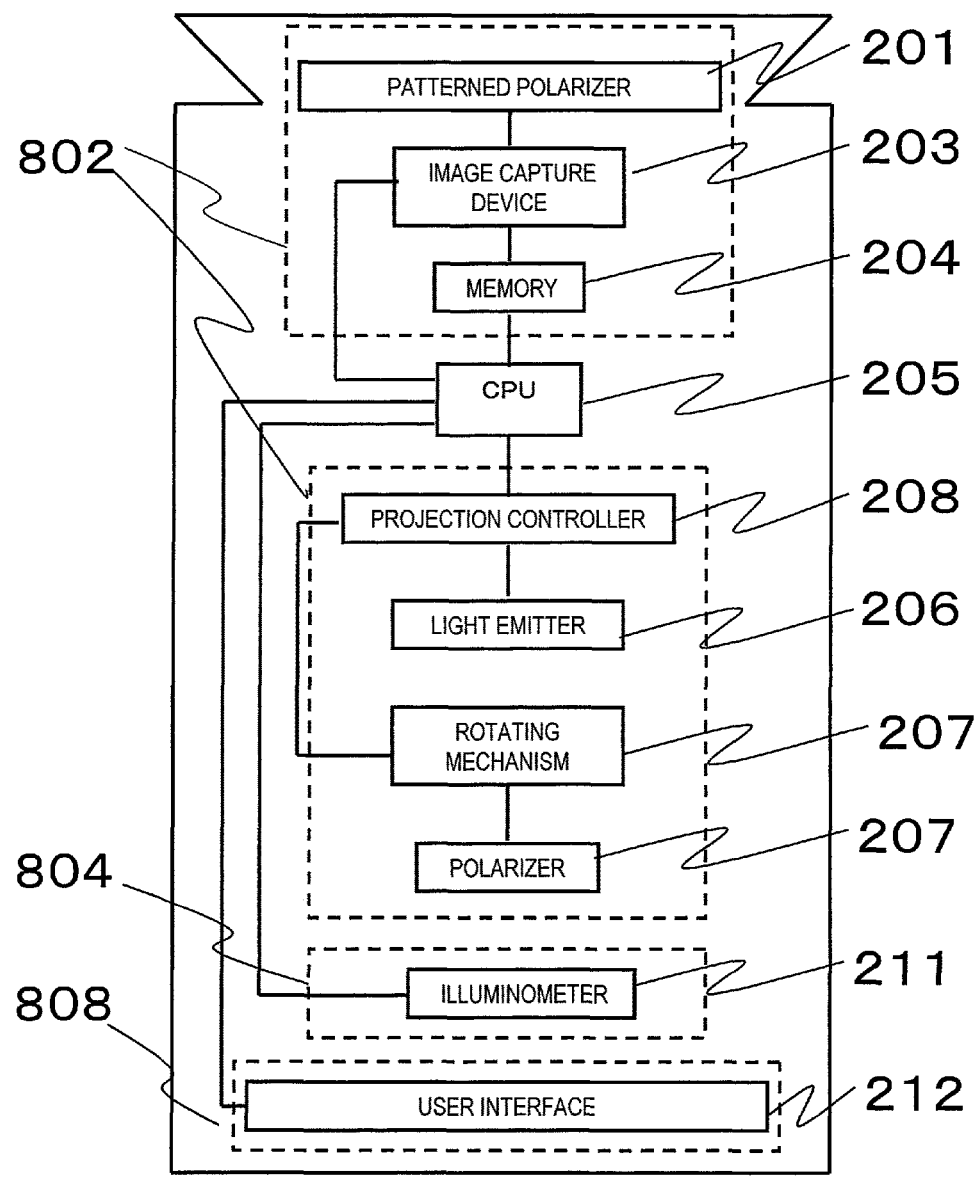
FIG. 38 illustrates an exemplary configuration for a camera in which the image synthesizer of the present invention is built.

Furthermore, FIG. 38 illustrates a configuration for a camera including the image synthesizer of this preferred embodiment. In this preferred embodiment, the functions of the image separating section 803, the light source information estimating section 804, the shape information collecting section 805, the parameter estimating section 806 and the rendering section 809 are supposed to be performed by getting a program executed by a CPU 205. However, part or all of those functions could be performed by hardware components as well. Also, the viewpoint/light source information collecting section 808 may be implemented as a user interface section 212. Furthermore, a memory 204 stores, as model parameters, the polarized image that has been captured by the image capturing section 802, the images representing the specular reflection and diffuse reflection components obtained by the image separating section 803, the light source information estimated by the light source estimating section, the shape information obtained by the shape information collecting section 805, the reflection parameter information estimated by the parameter estimating section 807, and the viewpoint/light source information obtained by the viewpoint/light source information collecting section.

Hereinafter, their processing will be described one by one.

First of all, the parameter estimator 800 will be described.

The image capturing section 802 gets an object's color image captured by the color and polarization obtaining section 102 and the color information processing section 103 using an image capture device such as a CCD or a CMOS. The image thus captured is preferably stored with a sufficiently high intensity resolution so that the specular reflection component with very high intensity and the diffuse reflection component are not saturated at the same time. For that purpose, an image capture device with a wide dynamic range such as a cooling CCD camera or a multi-exposure image sensor is preferably used. Such an image capturing section may get the weighted sum of the polarization maximum and minimum intensities $I_{max}$ and $I_{min}$ (e.g., $I_{max}+I_{min}$ or $I_{max}+2 \cdot I_{min}$) obtained by the polarization information processing section 103 as described above. Among other things, $I_{max}+I_{min}$ represents an image that is equivalent to an image to be captured under a linearly polarized light source without using a polarizer. For that reason, by performing image processing using $I_{max}+I_{min}$, the processing can be carried out in the same way as in a normal situation where polarization is not used.

The image separating section 803 separates the image that has been captured by the image capturing section 802 into diffuse reflection and specular reflection components by the image separating method described above.

The light source information estimating section 804 collects, as light source information, information about the direction, color and illuminance of the light source. To obtain those pieces of information, a specular reflector, of which the shape is already known, may be arranged near the object to collect estimated light source information from the specular reflector image that has been captured by the image capture device 208 (see Masayuki Kanbara and Naokazu Yokoya, "Vision-Based Augmented Reality in View of Degree of Optical Matching by Estimating Light Source Environment in Real Time", Technical Report of the Institute of Electronics, Information and Communication Engineers, Pattern Recognition and Media Understanding, PRMU 2002-190, pp. 7-12, 2003, for example). This processing will be described in detail later.

The light source information estimating section 804 collects those pieces of information by using a sphere 601 that can be regarded as a specular reflector as shown in FIG. 15, for example. The mirror ball 601 is supposed to be arranged near an object and its position and the direction of its normal are supposed to be already known. An image of such a mirror ball 601 is captured by the image capturing section 802. In that case, the shooting environment is reflected on the mirror ball 601. Such a reflected image is produced at such a position on the mirror ball where the viewing direction and the direction toward the reflected object are quite opposite to each other with respect to a normal to that mirror ball. That is why if the position of the mirror ball and the direction of its normal are already known, the direction to the reflected object can be detected based on the reflected image on the specular surface. Also, considering the light source has a high light intensity, the direction to the light source can be determined by detecting a pixel with high light intensity from the image of the mirror ball that has been shot. Furthermore, if the reflectance of the mirror ball is also known, the light source illuminance information such as the color and radiance information of the light source can also be obtained.

Optionally, as the light source information, information about the position of the light source may also be obtained in addition to, or instead of, the information about the direction to the light source. To do that, stereoscopic image processing technique, which is well known in the field of image processing, may be adopted either by using two such mirror balls or by using multiple images that have been captured with the positions of the image capture device changed.

Instead of always shooting such a mirror ball, light source information that has been collected previously through shooting operations in the past may also be used. Such a method will be effective in a situation where the light source environment never changes as in an indoor surveillance camera, for example. In that case, the mirror ball may be shot and its light source information may be collected when the camera is installed.

Alternatively, the light source information estimating section 804 may also estimate the direction to the light source by using the object itself, not a reference object such as the sphere 601 that can regarded as a specular reflector. Hereinafter, such an alternative method will be described. First of all, a pixel with the highest intensity is selected from an image area in which the object's image has been captured. Since the surface normal information, which is a piece of object's shape information, has been estimated by the shape information collecting section 805 as will be described later, the direction of a normal to such a pixel with the highest intensity is already known. Supposing a light source that is located in the regular reflection direction is reflected on that pixel with the highest intensity, the direction to the light source can be estimated by the direction of the normal as in the method that uses the reference object.

Optionally, the irradiance may be measured as a piece of light source information by providing an illuminometer 211 for the image capture device 701. It will be described later exactly how to use the irradiance information.

The shape information collecting section 805 obtains, as a piece of object's shape information, information about the surface normal or information about the three-dimensional position of the object. As a means for collecting object's shape information, any existent technique such as slit light projection, patterned light projection or a laser radar method could be used, for example.

However, the shape information does not have to be obtained by one of these techniques. Optionally, a stereo viewing method that uses multiple cameras, a motion stereo method that uses the motion of the camera, a photometric stereo method that uses an image that has been captured with the positions of the light source changed, a method for measuring the distance to the object using a millimeter wave or an ultrasonic wave, or a method that uses the polarization property of reflected light (see, for example, U.S. Pat. No. 5,028, 138 and Daisuke Miyazaki and Katsushi Ikeuchi, "A Method to Estimate Surface Shape of Transparent Objects by Using Polarization Raytracing Method", Transaction of the Institute of Electronics, Information and Communication Engineers, Vol. J88-D-II, No. 8, pp. 1432-1439, 2005) could also be used. In the following description, the photometric stereo method and the method that uses the polarization property will be described.

The photometric stereo method is a technique for estimating the direction of a normal to the object and the reflectance using three or more images with mutually different light source directions. For instance, a method according to H. Hayakawa, "Photometric Stereo under a light source with arbitrary motion", Journal of the Optical Society of America A, Vol. 11, pp. 3079-89, 1994 is a technique for estimating the following parameters by finding six or more points with the same reflectance on the image as known information and using them as a constraint condition with information about the position of the light source still kept unknown:

object information: direction of a normal to each point on the image and reflectance light source information: direction to the light source and its illuminance at a point where the object is observed In this example, the photometric stereo method is carried out by using only a diffuse reflected image that has been separated by the diffuse reflection and specular reflection separating technique described above. Such a technique originally supposes that the object is a total diffuse reflector. That is why if such a technique were applied to an object with a specular reflection area, a significant error would be caused. However, by using only the diffuse reflection component separated, the estimation error due to the presence of the specular reflection component can be eliminated.

A diffuse reflected image with a different light source direction is represented by following intensity matrix $I_d$:

$$I_d = \begin{bmatrix} i_{d1(1)} & \wedge & i_{dF(1)} \\ M & O & M \\ i_{d1(P)} & \wedge & i_{dF(P)} \end{bmatrix} \quad (22)$$

In Equation (22), $i_{df(p)}$ represents the intensity at a pixel p of the diffuse reflected image in a light source direction f. In this case, the number of pixels of the image is P and the number of images captured in mutually different light source directions is F. According to the Lambertian model, the intensity of the diffuse reflected image can be represented by the following Equation (23):

$$i_{f(p)} = (\rho_{dp} \cdot n_p^T) \cdot (t_f \cdot L_f) \quad (23)$$

In Equation (23), $\rho_{dp}$ represents the reflectance (albedo) of the pixel p, $n_p$ represents the normal vector of the pixel p, $t_f$ represents the irradiance of the light source f, and $L_f$ represents the direction vector of the light source f.

The following Equations can be derived from Equations (22) and (23):

$$I = R \cdot N \cdot L \cdot T = S \cdot M \quad (24)$$

$$R = \begin{bmatrix} \rho_1 & & 0 \\ & O & \\ 0 & & \rho_P \end{bmatrix}$$

$$N = [n_1 \wedge n_P]^T = \begin{bmatrix} n_{1x} & n_{1y} & n_{1z} \\ M & M & M \\ n_{Px} & n_{Py} & n_{Pz} \end{bmatrix}$$

$$L = [L_1 \wedge L_F] = \begin{bmatrix} l_{x1} & \wedge & l_{xF} \\ l_{y1} & \wedge & l_{yF} \\ l_{z1} & \wedge & l_{zF} \end{bmatrix}$$

-continued $$T = \begin{bmatrix} t_1 & & 0 \\ & O & \\ 0 & & t_F \end{bmatrix} \quad (25)$$

$$S = [s_1 \wedge s_P]^T = \begin{bmatrix} s_{1x} & s_{1y} & s_{1z} \\ M & M & M \\ s_{Px} & s_{Py} & s_{Pz} \end{bmatrix} = R \cdot N$$

$$M = [M_1 \wedge M_F] = \begin{bmatrix} m_{x1} & \wedge & m_{xF} \\ m_{y1} & \wedge & m_{yF} \\ m_{z1} & \wedge & m_{zF} \end{bmatrix} = L \cdot T$$

In this case, R, N, L, T, S and M will be referred to herein as a surface reflection matrix, a surface normal matrix, a light source direction matrix, a light source intensity matrix, a surface matrix and a light source matrix, respectively.

In this case, if a singular value decomposition is used, Equation (24) can be expanded as follows:

$$I = U \cdot \sum \cdot V \quad (26)$$

$$U = [U' U'']$$

$$\Sigma = \begin{bmatrix} \Sigma' & 0 \\ 0 & \Sigma'' \end{bmatrix}$$

$$V = \begin{bmatrix} V' \\ V'' \end{bmatrix}$$

where $$U^T \cdot U = V^T \cdot V = V \cdot V^T = E$$

and where E represents a unit matrix, U' represents a P×3 matrix, U'' represents a P×(F−3) matrix, Σ'' represents a (F−3)×(F−3) matrix, V' represents a 3×F matrix, and V'' represents a (F−3)×F matrix. In this equation, U'' and V'' would be the orthogonal basis of signal components U' and V' (i.e., noise components). In this case, if a singular value decomposition is used, Equation (26) can be modified as follows:

$$\hat{I} = U'' \cdot \Sigma' \cdot V' = \hat{S} \cdot \hat{M}$$

$$\hat{S} = U' \cdot (\pm [\Sigma']^{1/2})$$

$$\hat{M} = (\pm [\Sigma']^{1/2}) \cdot V' \quad (27)$$

That is to say, by solving Equation (27), the shape information and the light source information can be both obtained at the same time, but the instability of the following 3×3 matrix A still remains:

$$S = \hat{S} \cdot A \quad (28)$$

$$M = A^{-1} \cdot \hat{M} \quad (29)$$

In this case, A is an arbitrary 3×3 matrix. To collect the shape information and the light source information, this matrix A should be obtained. To do that, it should be known in advance that the reflectances at six or more points on the screen are equal to each other. For example, supposing the reflectances at six arbitrary points k1 through k6 are equal to each other, $$(s_{k1})^2 = (s_{k2})^2 = (s_{k3})^2 = (s_{k4})^2 = (s_{k5})^2 = (s_{k6})^2 = 1 \quad (30)$$

then the following Equation (31) can be derived based on Equations (25), (28) and (30):

$$(s_{ki})^2 = (\hat{s}_{ki}^T \cdot A)^2 = (\hat{s}_{ki}^T \cdot A)^T \cdot (\hat{s}_{ki}^T \cdot A) = (\hat{s}_{ki}^T \cdot A) \cdot (\hat{s}_{ki}^T \cdot A)$$
$$= \hat{s}_{ki}^T \cdot A \cdot A^T \cdot \hat{s}_{ki} = 1 \quad (31)$$

Furthermore, if $$B = A \cdot A^T \quad (32)$$

then Equation (31) can be modified into $$\hat{s}_{ki}^T \cdot B \cdot \hat{s}_{ki} = 1 \quad (33)$$

In this case, as it can be seen from Equation (32) that the matrix B is a symmetric matrix, the number of unknowns of the matrix B is six. That is to say, if it is already known that the reflectances at six or more points on the screen are equal to each other, Equation (33) can be solved.

Also, if the matrix B is already known, then the matrix A can be solved by applying a singular value decomposition to Equation (32).

Furthermore, based on Equations (28) and (29), the shape information and the light source information are collected.

As can be seen from the foregoing description, if three or more images of an object, of which six or more pixels with the same reflectance are already known, are captured with the light source directions changed, the following information can be obtained:
  object information: normal vectors and reflectances at those points on the images, and
  light source information: light source direction vector and radiance at the observation point on the object.

However, the reflectance of the object and the radiance of the light source obtained by the processing described above are relative ones. To obtain absolute values, a different kind of known information such as reflectances that are already known at six or more points on the screen is required.

As described above, according to the photometric stereo method and the method that uses the polarization property, surface normal information is collected. On the other hand, according to the slit light projection method and stereoscopic viewing method, information about the three-dimensional position of the object is collected. The information about a normal to the surface of an object is a piece of information about the gradient in a very small space of the three-dimensional position information of the object. And both of these pieces of information are subject's shape information.

By performing the processing steps described above, the shape information collecting section 805 obtains the surface normal information as a piece of subject's shape information or information about the three-dimensional position of the object.

In summary, the following pieces of information are obtained as a result of the processing described above:
  diffuse reflected image of the object,
  specular reflected image of the object,
  information about the three-dimensional position of the object, and
  position and illuminance of the light source.

Next, the parameter estimating section 806 estimates the respective reflection parameters of the diffuse and specular reflection components that have been separated from each other by the image component separating section 803 by mutually different methods. First of all, it will be described how to process the diffuse reflection component.

The parameter estimating section 806 estimates the albedo of the object by using the diffuse reflection component that has been separated by the image separating section 803. Since the albedo is not affected by light source information, robust processing that is highly resistant to a light source variation is realized by performing processing using an albedo image.

Hereinafter, such processing will be described. First of all, an object's reflection property will be described. Supposing a dichroic reflection model, the intensity of an object is represented as the sum of diffuse and specular reflection components by the following Equation (34):

$$I_a + I_d + I_s \qquad (34)$$

In Equation (34), I is the intensity of the object that has been captured by the image capture device, $I_a$ is ambient light component, $I_d$ is diffuse reflection component, and $I_s$ is specular reflection component. As used herein, the "ambient light component" means indirect light produced by having the light source's light scattered by an object, for example. The ambient light component has been scattered here and there in the space and casts dim light even to a shadow area that the light does not reach directly. That is why the ambient light component is often regarded as noise.

Supposing the ambient light component is so little as to be negligible as noise, an image can be separated into a diffuse reflection component and a specular reflection component.

As can be seen from Equation (23), the diffuse reflection component satisfies the following Equation (35):

$$\rho_{dp} = \frac{i_{f(p)}}{t_f \cdot \cos\theta_i} \qquad (35)$$

In Equation (35), $\theta_i$ is the angle formed between the normal vector of the object and the light source direction vector. In this case, the angle $\theta_i$ is already known to the light source information estimating section 804 and the shape information collecting section 805. Also, since the irradiance $t_f$ of the light source can also be estimated as will be described later, the albedo $\rho_{dp}$ of the object can be obtained by this Equation (35).

Alternatively, instead of calculating the object's albedo, a pseudo albedo may also be calculated by multiplying the albedo by the radiance of the light source as in the following equation and used:

$$t_f \cdot \rho_{dp} = \frac{i_{f(p)}}{\cos\theta_i}$$

Next, it will be described how to estimate the reflection parameter of the specular reflection component.

The parameter estimating section 806 estimates a parameter representing an object by reference to the object's normal information that has been obtained by the shape information collecting section 805 and the diffuse and specular reflected images that have been separated by the image separating section 803. Hereinafter, a method that uses a Cook-Torrance model, which is used extensively in the field of computer graphics, will be described as an example.

According to the Cook-Torrance model, a specular reflected image is modeled by the following equations:

$$I_s = K_s \rho_{s,\lambda} \qquad (36)$$

$$K_s = \frac{1}{\pi} E_i k_s \qquad (37)$$

-continued $$\rho_{s,\lambda} = \frac{F_\lambda DG}{n \cdot V} \qquad (38)$$

$$F_\lambda = \frac{1}{2} \frac{(g_\lambda - c)^2}{(g_\lambda + c)^2} \left( 1 + \frac{[c(g_\lambda + c) - 1]^2}{[c(g_\lambda - c) + 1]^2} \right) \qquad (39)$$

$$c = L \cdot H \qquad (40)$$

$$g_\lambda = \sqrt{n_\lambda^2 - 1 + c^2} \qquad (41)$$

$$D = \frac{1}{4m^2 \cos^4\beta} \exp\left\{ -\frac{\tan^2\beta}{m^2} \right\} \qquad (42)$$

$$G = \min\left\{ 1, \frac{2(n \cdot H)(n \cdot V)}{(V \cdot H)}, \frac{2(n \cdot H)(n \cdot L)}{(V \cdot H)} \right\} \qquad (43)$$

$$E_i = \sum_{j=0}^{n-1} I_j n \cdot L_j \qquad (44)$$

Figure 39:
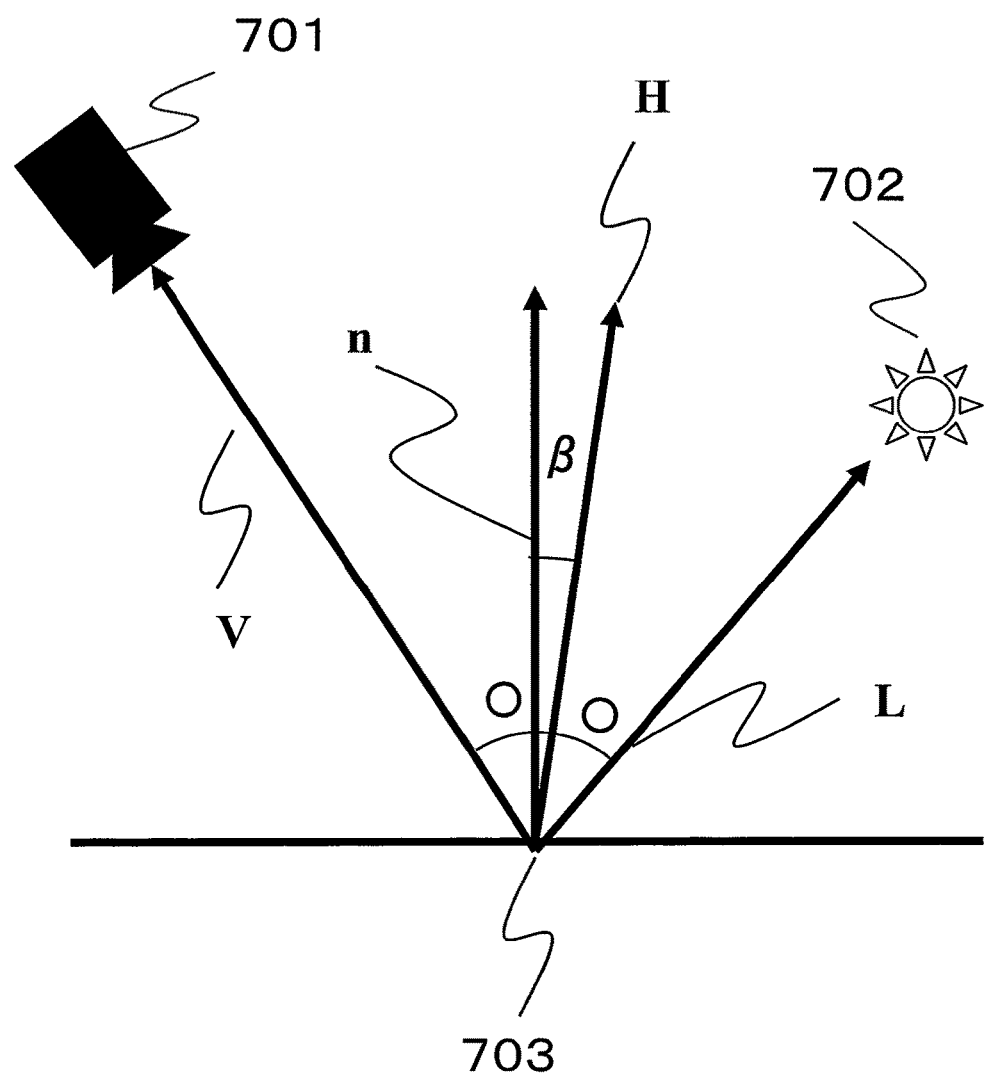
FIG. 39 is a schematic representation illustrating the relation between a normal vector, a line-of-sight vector, and a light source direction vector.

In this case, $E_i$ represents the irradiance, $\rho s$, $\lambda$ represents the bidirectional reflectance of the specular reflection component at a wavelength $\lambda$, n represents the object's normal vector, V represents the line of sight vector, L represents the light source direction vector, H represents an half-way vector between the line of sight vector and the light source direction vector, and $\beta$ represents the angle formed between the half-way vector H and the normal vector n (see FIG. 39). Furthermore, F$\lambda$ represents a Fresnel coefficient, which is calculated by Fresnel's formula as the ratio of light beams reflected from the surface of a dielectric, D represents a microfacet distribution function, and G represents a geometric attenuation factor indicating how much shielding is affected by the degree of unevenness at the object's surface. Furthermore, n$\lambda$ represents the object's refractive index, m represents a coefficient indicating the roughness of the object's surface, $I_j$ represents the radiance of the incident light, and $k_s$ represents the coefficient of the specular reflection component.

Furthermore, if the Lambertian model represented by Equation (23) is adopted, Equation (34) can be expanded as follows:

$$I = I_a + I_d + I_s = I_a + K_D + K_s \rho_{s,\lambda} \qquad (45)$$

where $$K_D = \frac{1}{\pi} S_r E_i k_d \rho_d \qquad (46)$$

$$S_r = \frac{dpx \cdot dpy}{2\pi r^2} \qquad (47)$$

In these equations, $\rho d$ represents the reflectance (albedo) of the diffuse reflection component, dpx and dpy represents the x- and y-direction lengths of a single pixel of the image capture device, r represents the distance of the image capture device from the point of observation O, and $k_d$ is a coefficient that satisfies the following equation:

$$k_d + k_s = 1 \qquad (48)$$

Figure 40:
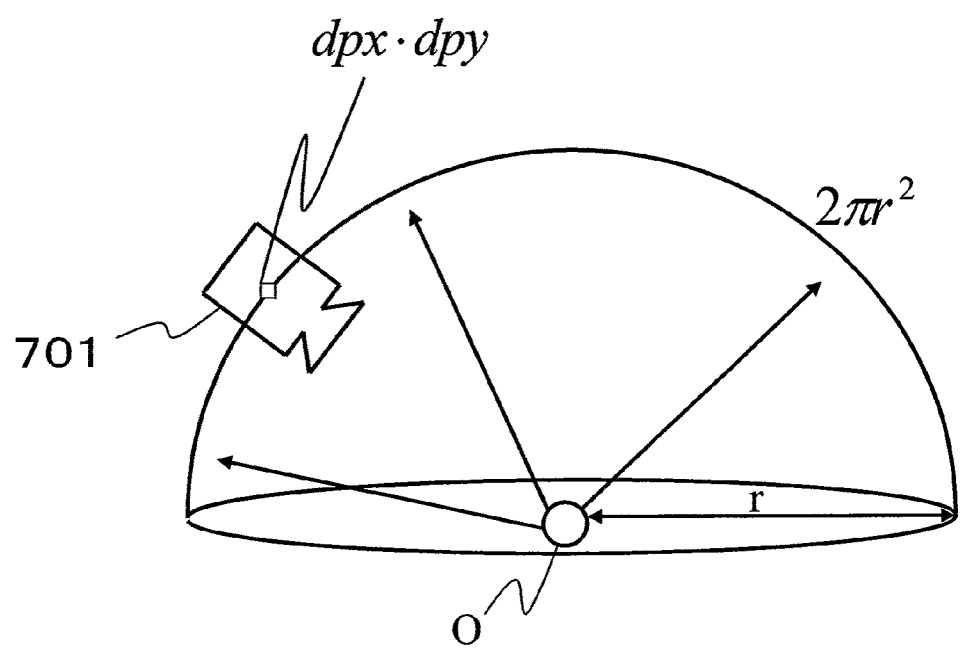
FIG. 40 is a schematic representation illustrating what the constant Sr representing a difference in intensity between diffuse and specular reflection components is.

Sr is a constant that expresses the difference between the diffuse and specular reflection components and indicates that the diffuse reflection component reflects energy from the object toward every direction. FIG. 40 is a schematic representation illustrating what that constant Sr is. In FIG. 40, the diffuse reflection component energy that has been reflected from a point of observation O spreads hemispherically. In this case, since the image capture device 701 is located at a distance r from the point of observation O, the ratio $S_r$ of the energy that reaches one of the image sensors of the image capture device to the total energy reflected from the point of observation O is represented by Equation (47).

Thus, the parameter estimating section 806 estimates the reflection parameter of the specular reflection component by Equations (36) to (47).

To sum up the equations described above, the known parameters for use to make parameter estimation and the parameters to estimate are as follows:

(Known parameters):
ambient light component $I_a$,
diffuse reflection component $I_d$,
specular reflection component $I_s$,
object's normal vector n,
light source direction vector L,
line of sight direction vector V,
half-way vector H,
angle β formed between the half-way vector H and the normal vector n,
x- and y-direction lengths dpx and dpy of a single pixel of the image capture device 701, and
distance r of the image capture device 701 from the point of observation O.

(Parameters to estimate):
irradiance $E_i$,
coefficient $k_s$ of the specular reflection component,
object's surface roughness m, and
object's refractive index ηλ.

In this case, the coefficient $k_d$ of the diffuse reflection component and the reflectance (albedo) $ρ_d$ of the diffuse reflection component are also unknown parameters. However, those parameters are not to be estimated because it is only the parameters of the specular reflection component that need to be estimated.

Figure 41:
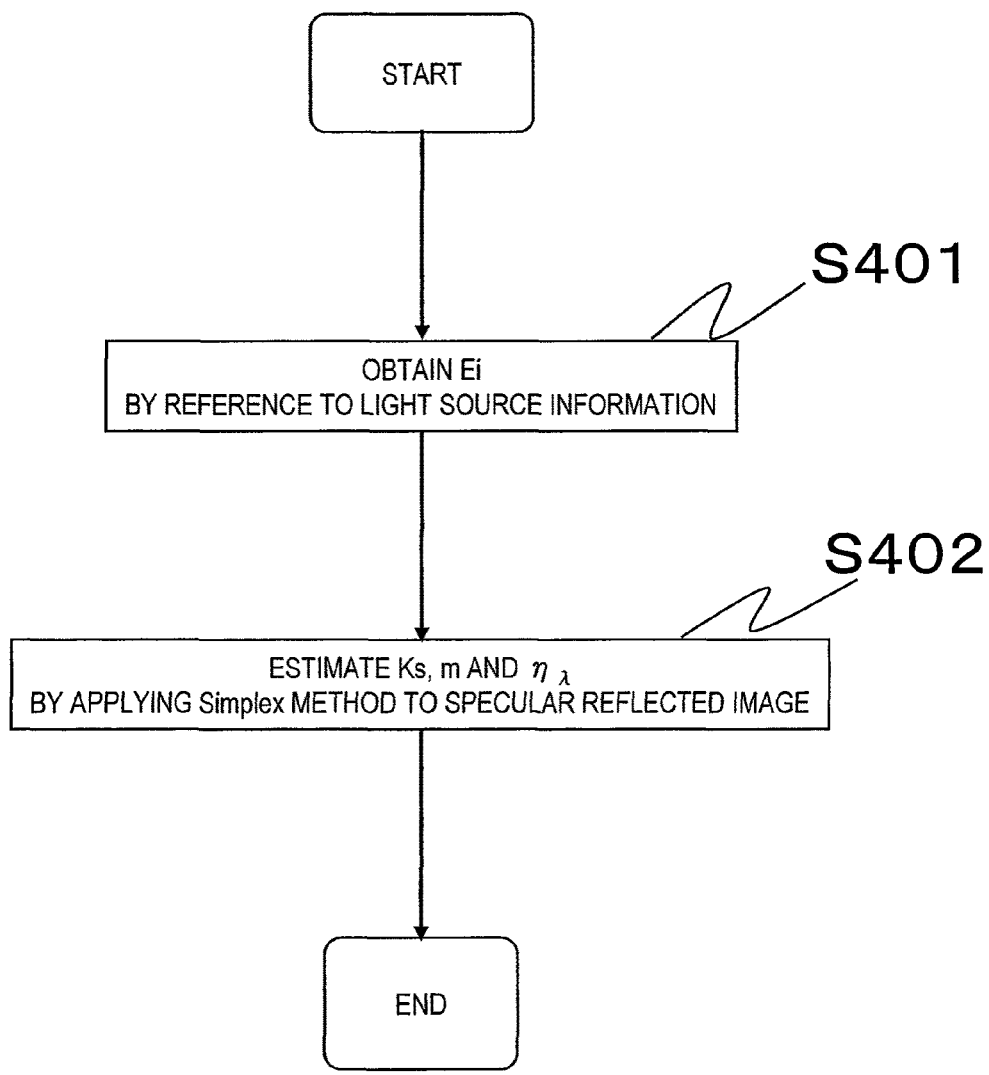
FIG. 41 shows how to get parameter estimation done on a specular reflected image in the image synthesis processing according to a preferred embodiment of the present invention.

FIG. 41 illustrates the procedure of the processing to be done by the parameter estimating section 806. This processing consists of the following two stages.

First of all, the irradiance $E_i$ is estimated by reference to the light source information (in Step S401). In this case, information about the position of the light source that has been obtained by the light source information estimating section 804, information about the distance of the image capture device from the object that has been obtained by the shape information collecting section 805, and the light source illuminance that has been estimated by the light source information estimating section 804 are used. And the irradiance $E_i$ can be calculated by the following Equation (49):

$$E_i = \frac{R_1^2}{R_2^2} \cdot \frac{\cos\theta_1}{\cos\theta_2} \cdot I_i \quad (49)$$

Figure 42:
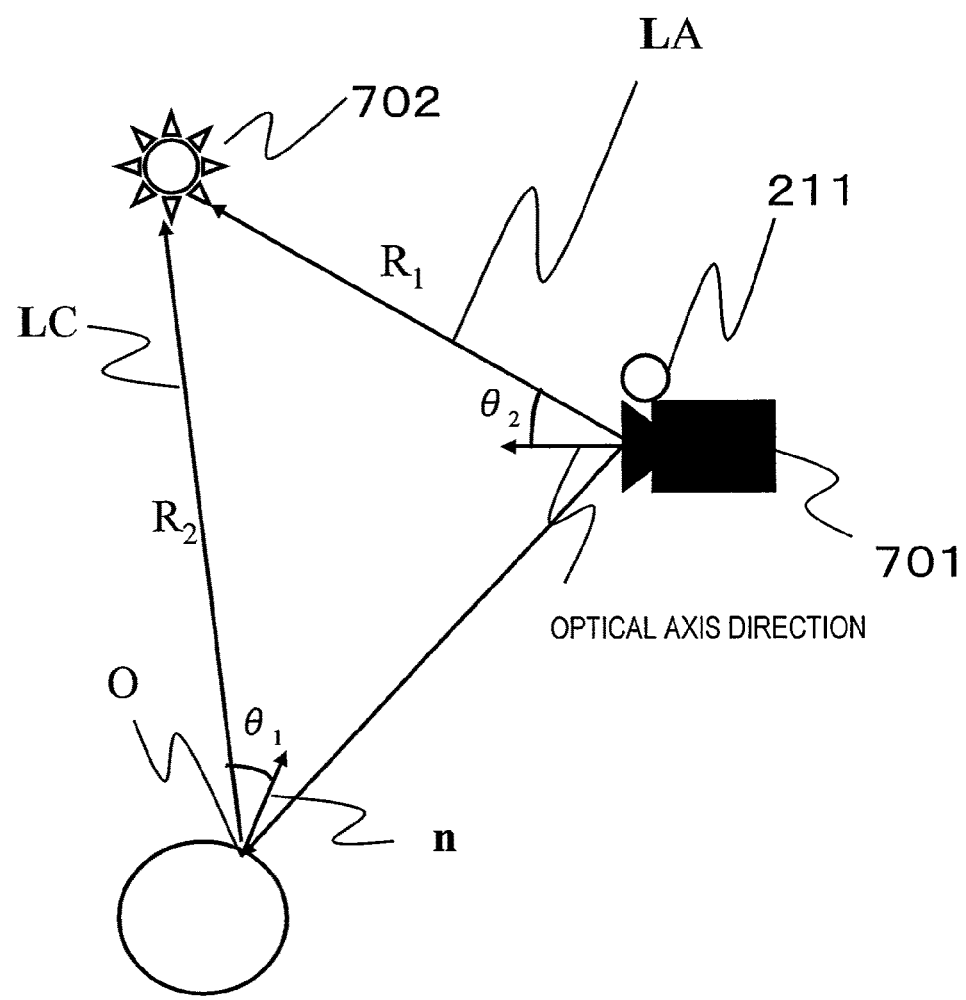
FIG. 42 illustrates the concept of respective parameters of an equation that represents an incident illumination.

An illuminometer 211 is supposed to be provided for the image capture device 701 as described above. In Equation (49), $I_i$ represents the irradiance of the light source 702 that has been measured with the illuminometer 211, $R_1$ represents the distance of the image capture device 701 as measured from the light source 702, $R_2$ represents the distance of the light source 702 as measured from the point of observation O, $θ_1$ represents the angle formed between the normal vector n at the point of observation O and the light source direction vector LC, and $θ_2$ represents the angle formed between the optical axis direction at the image capture device 701 and the light source direction vector LA (see FIG. 42). In this case, if the size of the object is believed to be sufficiently smaller than the distance $R_2$ of the light source 702 from the point of observation O, then the distance $R_2$ becomes constant at any point of observation O on the object. In that case, $(R_1/R_2)$ becomes a constant in Equation (49) and no longer needs to be obtained by actual measurement. Also, $θ_1$ is already known. This is because the normal vector n at the point of observation O is already known from the shape information collecting section 805 and the light source direction vector LC is already known from the light source information estimating section 804. Likewise, if the position of the light source has been estimated by the light source information estimating section 804, $θ_2$ is already known, too. Consequently, the entire right side of Equation (49) is known in that case.

Next, in Step S402, the unknown parameters m, ηλ and $k_s$ are estimated by simplex method, which is a method for optimizing a function by changing the sizes and shapes of a figure called "simplex" with variables assigned to the respective vertices of that simplex (see Noboru Ota, "Fundamentals of Color Reproduction Optics", pp. 90-92, Corona Publishing Co., Ltd.) The simplex is a collection of (n+1) points in an n-dimensional space, where n is the number of unknowns to estimate and is three in this example. Thus, the simplex is a tetrahedron. If the respective vertices of the simplex are represented with a vector $x_i$, new vectors are defined as follows:

$$x_h = \underset{x_i}{\mathrm{argmax}}\{f(x_i)\}, \quad i = 1, 2, \ldots, n+1 \quad (50)$$

$$x_s = \underset{x_i}{\mathrm{argmax}}\{f(x_i)\}, \quad i \neq h$$

$$x_l = \underset{x_i}{\mathrm{argmin}}\{f(x_i)\}, \quad i = 1, 2, \ldots, n+1$$

$$x_0 = \sum \frac{x_i}{n+1}, \quad i \neq h, \quad i = 1, 2, \ldots, n+1 \quad (51)$$

In this case, $$\underset{x_i}{\mathrm{argmax}}\{f(x_i)\},$$

and $$\underset{x_i}{\mathrm{argmin}}\{f(x_i)\},$$

are vectors $x_i$ that respectively maximize and minimize the function $f(x_i)$. Furthermore, the three kinds of operations for use in this method are defined as follows:

1. Produce a mirror image:

$$x_r = (1+α)x_0 - αx_h \quad (52)$$

2. Extension:

$$x_e = βx_r + (1-β)x_h \quad (53)$$

3. Contraction:

$$x_c = γx_h + (1-γ)x_0 \quad (54)$$

where α (>0), β (>1) and γ (1>γ>0) are coefficients.

The simplex method is based on the expectation that if one of the vertices of the simplex that has the greatest function value is selected, the function value of its mirror image will decrease. If this expectation is right, the minimum value of the function can be obtained by repeating the same process a number of times. That is to say, the parameter given by the initial value is repeatedly updated by three kinds of operations until the error from the target, represented by an estimate function, becomes less than a threshold value. In this example, m, ηλ and ks were used as parameters and the difference $\Delta I_s$ between the respective specular reflection component images calculated by Equation (36) and obtained by the image separating section 803 as represented by the following Equation (55) was used as the estimate function:

$$\Delta I_s = \sum_j \sum_i M_{s(i,j)} (i'_{s(i,j)} - i_{s(i,j)})^2 \qquad (55)$$

In Equation (55), $i_{s(i,j)}'$ and $i_{s(i,j)}$ represent the estimated value $I_s'$ of the specular reflected image calculated and the intensity of a pixel (i, j) of the specular reflection component image $I_s$ obtained by the image separating section 803, respectively, and $M_{s(i,j)}$ represents a function that becomes one if the pixel (i, j) has a specular reflection component but becomes zero otherwise.

Figure 43:
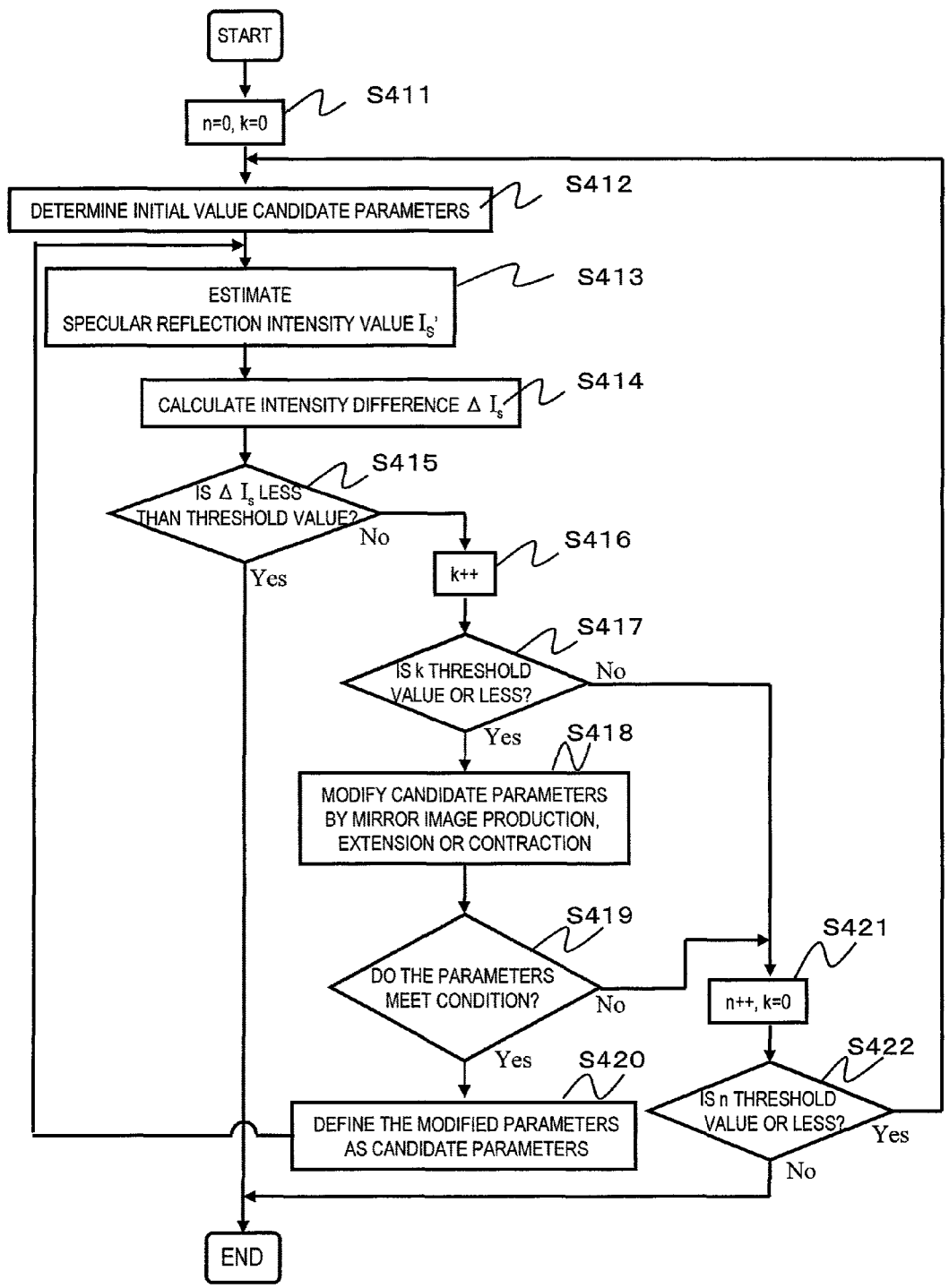
FIG. 43 is a flowchart illustrating the flow of parameter estimation processing according to a simplex method.

Hereinafter, this processing will be described in detail. FIG. 43 is a flowchart illustrating the procedure of the processing.

First of all, in Step S411, counters n and k that memorize the number of times of update of iterative operations are reset to zero. In this case, the counter n counts the number of times the initial value has been updated. On the other hand, the counter k counts the number of times a candidate parameter according to the simplex method has been updated with respect to an initial value.

Next, the initial values of candidate parameters m', ηλ' and $k_s'$ for parameters to estimate are determined using random numbers (in Step S412). In this case, the range of generating the initial values was determined as follows by the physical constraints on the respective parameters:

$m \geq 0$ $\eta \lambda \geq 1.0$ $0 \leq k_s \leq 1.0$ $0 \leq F_\lambda \leq 1.0$ $0 \leq D$ \hspace{2cm} (56)

Next, the candidate parameters thus obtained are substituted for Equation (36), thereby obtaining the estimated value $I_s'$ of the specular reflected image (in Step S413). Furthermore, the difference $\Delta I_s$ between the estimated value $I_s'$ of the specular reflected image thus calculated and the specular reflection component image obtained by the image separating section 803 is calculated by Equation (55) and defined as an estimate function for the simplex method (in Step S414). If $\Delta I_s$ thus obtained is sufficiently small (i.e., if the answer to the query of the processing step S415 is Yes), then the parameter estimation is supposed to be a success and the candidate parameters m', ηλ' and $k_s'$ are selected as estimated parameters m, ηλ and $k_s$ to end the processing. On the other hand, if $\Delta I_s$ is large (i.e., if the answer to the query of the processing step S415 is No), then candidate parameters are updated by simplex method.

Before the candidate parameters are updated, the number of times of update is checked out. First of all, the counter k that memorizes the number of times of update is incremented by one (in Step S416), thereby checking the count of the counter k (in Step S417). If the count of the counter k is sufficiently large (i.e., if the answer to the query of the processing step S417 is NO), it is determined that even if the update is simply repeated, it does not seem that the optimum value will be reached because the iterative operations have been performed a good number of times but a local minimum has been reached. In that case, the initial values are changed to get out of the local minimum. For that purpose, the counter n is incremented by one, while the counter k is reset to zero (in Step S421). And by seeing if the count of the counter n is greater than the threshold value, it is determined in Step S422 whether the processing should be simply carried on or should be ended by regarding this processing as a failure. In this case, if n is greater than the threshold value (i.e., if the answer to the query of the processing step S422 is No), then the given image is regarded as non-estimable to end the processing. On the other hand, if n is smaller than the threshold value (i.e., if the answer to the query of the processing step S422 is Yes), then a different initial value is selected from the range of Equation (56) in Step S412 to carry out the same series of processing steps all over again. Such a threshold value for k may be 100, for example.

Meanwhile, if it is determined in Step S417 that the count of the counter k is equal to or smaller than the threshold value (i.e., if the answer to the query of the processing step S417 is Yes), then the candidate parameters are changed by Equations (52) to (54) in Step S418. This processing step will be described in detail later.

Next, it is determined in Step S419 whether or not the candidate parameters thus modified are meaningful as solutions. That is to say, if the simplex method is performed repeatedly, then a modified parameter could come to have a physically meaningless value (e.g., a roughness parameter m could have a negative value). That is why such a meaningless value needs to be removed. To do that, the following condition may be given, for example, and the parameter may be regarded as meaningful if the condition is satisfied but may be regarded as meaningless otherwise.

$0 \leq m$ $1.0 \leq \eta \lambda$ $0.0 \leq k_s \leq 1.0$ $0.0 \leq D$ $0.0 \leq F_\lambda \leq 1.0$ \hspace{2cm} (57)

These values can be obtained from the object. As for the refractive index ηλ, for example, it can be determined by the material of the object. For instance, it is known that plastic has a refractive index of 1.5 to 1.7 and glass has a refractive index of 1.5 to 1.9. Thus, these values may be used. That is to say, if the object is made of plastic, its refractive index ηλ could be set to be 1.5 to 1.7.

If the modified parameter satisfies Inequalities (57) (i.e., if the answer to the query of the processing step S419 is Yes), then the candidate parameter is presumed to have a meaningful value, and therefore, defined to be a new candidate parameter in Step S420 to repeat the same update processing all over again (in Step S413). On the other hand, if the modified parameter fails to satisfy the Inequalities (57) (i.e., if the answer to the query of the processing step S419 is No), then the update processing on that initial value is aborted and update is started over with a new initial value in Step S421.

Figure 44:
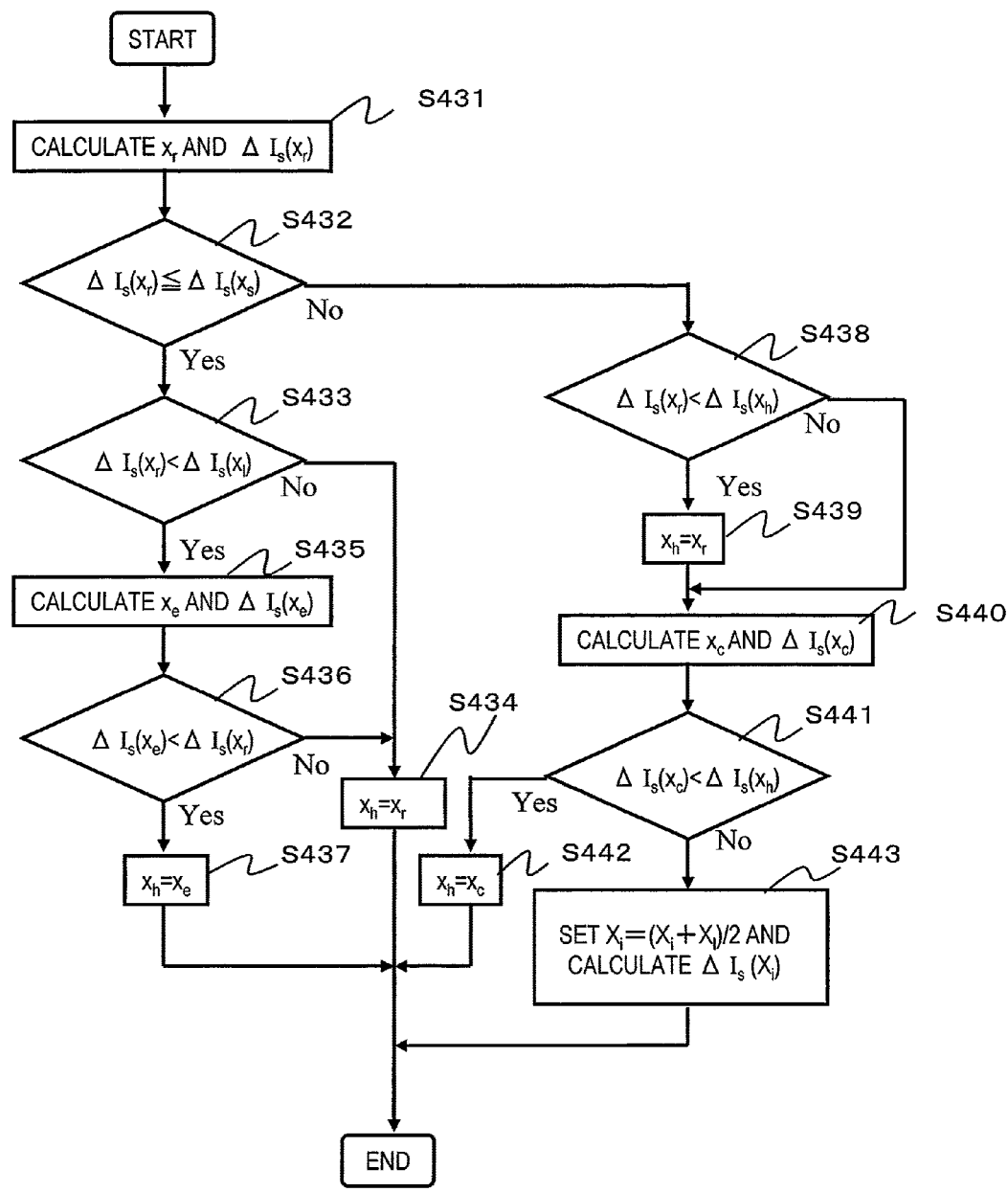
FIG. 44 is a flowchart illustrating the flow of parameter update processing according to the simplex method.

Hereinafter, the modification processing step S418 will be described in further detail. FIG. 44 is a flowchart illustrating the procedure of that processing step. In this processing step, the candidate parameters m', ηλ' and ks' are represented as a vector and used as a parameter x:

$x = [m' \eta_{s,\lambda}' k_s']^T$

First of all, a parameter $x_r$ that has been subjected to a mirror image operation is calculated by Equations (50) to (52) and the difference $\Delta I_s(x_r)$ from the specular reflection component image at $x_r$ is calculated by Equation (55) in Step S431. Next, $\Delta I_s(x_r)$ thus calculated is compared to $\Delta I_s(x_s)$, which has resulted in the second worst estimate function, in Step S432. If $\Delta I_s(x_r)$ is smaller than $\Delta I_s(x_s)$ (i.e., if the answer to the query of the processing step S432 is Yes), then the estimated value $\Delta I_s(x_r)$ that has been subjected to the mirror image operation is compared to $\Delta I_s(x_s)$ that has resulted in the best estimated value (in Step S433). In this processing step, if $\Delta I_s(x_r)$ is equal to or greater than $\Delta I_s(x_1)$ (i.e., if the answer to the query of the processing step S433 is No), $x_h$ that has resulted in the worst estimated value is changed into $x_r$ (in Step S434) to end the processing.

On the other hand, if $\Delta I_s(x_r)$ is smaller than $\Delta I_s(x_1)$ (i.e., if the answer to the query of the processing step S433 is Yes), expansion processing is carried out using Equation (54) to calculate a parameter $x_e$ and the difference $\Delta I_s(x_e)$ from the specular reflection component image at $x_e$ in Step S435. Next, $\Delta I_s(x_e)$ thus obtained is compared to $\Delta I_s(x_r)$ that has been obtained by mirror image processing (in Step S436). If $\Delta I_s(x_e)$ is smaller than $\Delta I_s(x_r)$ (i.e., if the answer to the query of the processing step S436 is Yes), $x_h$ that has resulted in the worst estimated value is changed into $x_e$ (in Step S437) to end the processing.

On the other hand, if $\Delta I_s(x_e)$ is equal to or greater than $\Delta I_s(x_r)$ (i.e., if the answer to the query of the processing step S436 is No), $x_h$ that has resulted in the worst estimated value is changed into $x_r$ (in Step S434) to end the processing.

Meanwhile, if $\Delta I_s(x_r)$ is found to be greater than $\Delta I_s(x_s)$ in Step S432 (i.e., if the answer to the query of the processing step S432 is No), the estimated value $\Delta I_s(x_r)$ that has been obtained by mirror image processing is compared to the currently worst estimated value $\Delta I_s(x_h)$ (in Step S438). If $\Delta I_s(x_r)$ is smaller than $\Delta I_s(x_h)$ (i.e., if the answer to the query of the processing step S438 is Yes), $x_h$ that has resulted in the worst estimated value is changed into $x_r$ (in Step S439) to calculate a parameter $x_c$ that has been subjected to the contraction processing and the difference $\Delta I_s(x_c)$ from the specular reflection component image at $x_c$ by Equation (53) (in Step S440). On the other hand, if $\Delta I_s(x_r)$ is equal to or greater than $\Delta I_s(x_h)$ (i.e., if the answer to the query of the processing step S438 is No), then parameter $x_c$ that has been subjected to the contraction processing and the difference $\Delta I_s(x_c)$ from the specular reflection component image at $x_c$ are calculated without changing $x_h$ (in Step S440).

Next, $\Delta I_s(x_c)$ thus obtained is compared to the worst estimated value $\Delta I_s(x_h)$ in Step S441. In this case, if $\Delta I_s(x_c)$ is smaller than $\Delta I_s(x_h)$ (i.e., if the answer to the query of the processing step S441 is Yes), then $x_h$ that has resulted in the worst estimated value is changed into $x_c$ (in Step S442) to end the processing.

On the other hand, if $\Delta I_s(x_c)$ is equal to or greater than $\Delta I_s(x_h)$ (i.e., if the answer to the query of the processing step S441 is No), then every candidate parameter $x_i$ (where i=1, 2, 3, 4) is changed by the following equation to end the processing:

$$x_i = \frac{1}{2}(x_i + x_l)$$

By repeatedly performing these processing steps, m, $\eta\lambda$ and $k_s$, which are unknown parameters for a specular reflected image, are estimated.

As a result of the processing described above, every unknown parameter can be estimated.

Figure 46:
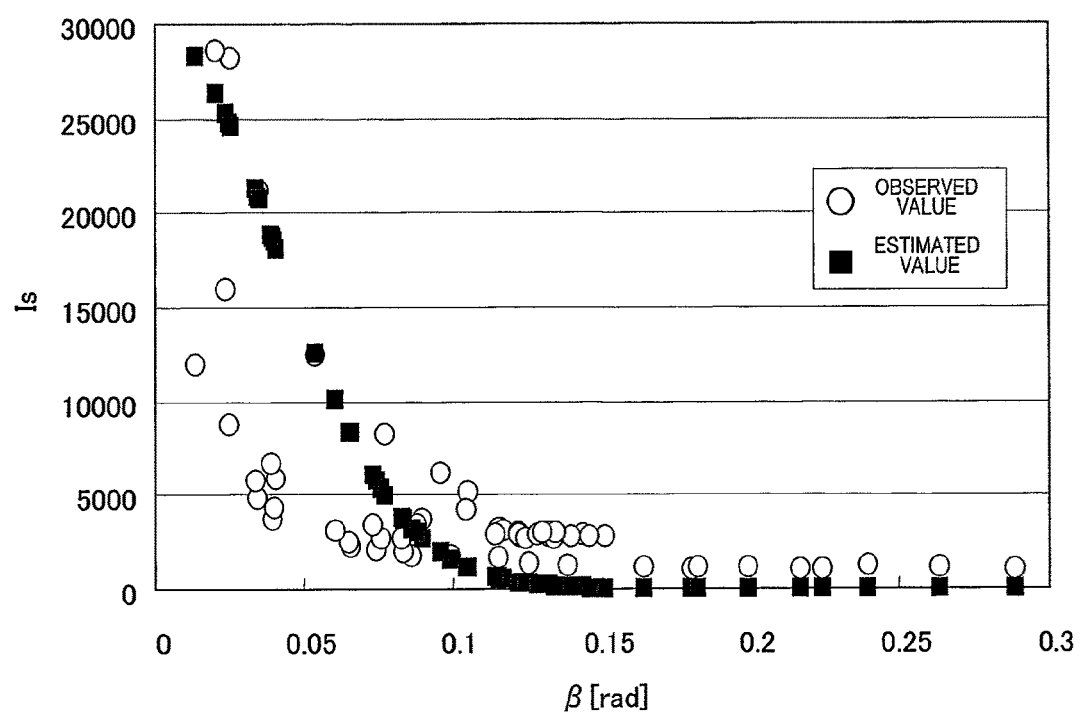
FIG. 46 schematically shows relations between the intensity Is of a specular reflection component and the half-way vector β that were obtained by using a conventional image processing apparatus to point out problems with the conventional method.
Figure 47:
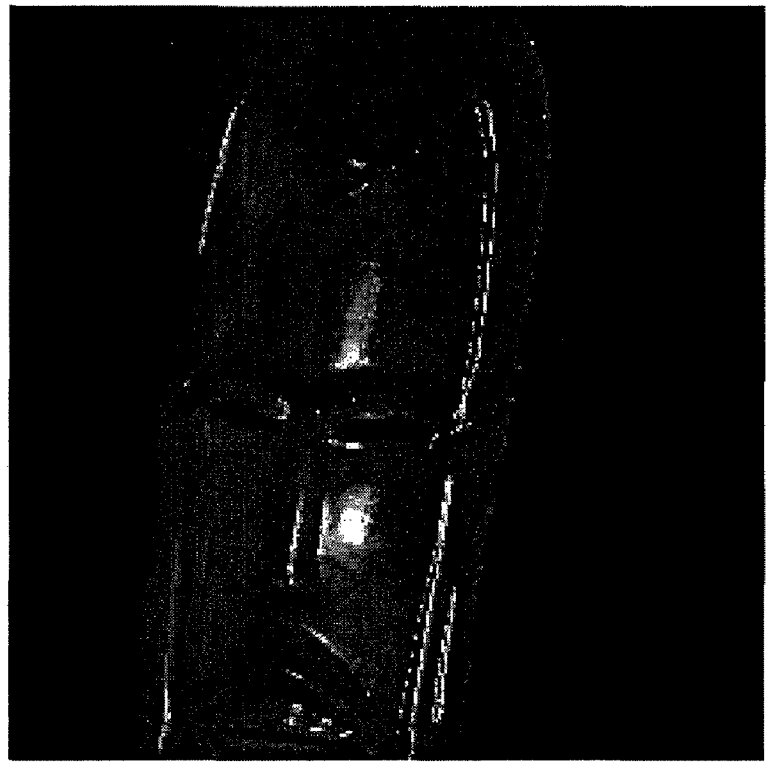
FIG. 47 shows a synthesized image that was obtained by the conventional image separating method by reference to polarization information.

FIG. 45(*a*) is a graph representing how the intensity Is of the specular reflection component (ordinate) changes with the half-way vector β as for the area A shown in FIG. 45(*b*) (abscissa). In FIG. 45(*a*), the open circle ○ plots the intensity Is observed for the area A, while the solid square ■ plots each estimated parameter of the Cook-Torrance model. FIG. 46 is a graph plotted by conventional image separating technique that uses polarization information. On the other hand, FIG. 47 shows a synthesized image obtained by the conventional image separating technique using polarization information. As can be seen, if parameter estimation has failed, the synthesized image will look quite different from that of the real object. As can be seen from these drawings, according to the conventional image separating technique, reflection parameters cannot be estimated successfully because the accuracy of separating specular and diffuse reflection components ensured by the conventional technique is not so good. As a result, the synthesized image will look quite different from the image of the actual object. According to the image separating technique of the present invention, however, such a problem never arises.

The model for use to estimate parameters does not have to be the Cook-Torrance model but may also be a Torrance-Sparrow model, a Phong model, or a simplified Torrance-Sparrow model (see, for example, K. Ikeuchi and K. Sato, "Determining Reflectance Properties of an Object Using Range and Brightness Images", IEEE Transactions on Pattern Analysis and Machine Intelligence, Vol. 13, No. 11, pp. 1139-1153, 1991).

Likewise, the parameter estimating method does not have to be the simplex method, either, but may also be any other general parameter estimating method such as a gradient method or a minimum square method.

The processing described above may be carried out either on a pixel-by-pixel basis or by separating a given image into multiple areas son that a set of areas with an equal parameter are estimated on an area basis. If the processing is carried out on a pixel-by-pixel basis, samples, of which a known parameter such as object's normal vector n, light source direction vector L or line-of-sight vector V has changed, are preferably obtained by moving the light source, the image capture device or the object. On the other hand, if the processing is carried out on an area-by-area basis, the best parameters are preferably estimated by changing the image separation techniques so that the parameters obtained are less varied from one area to another.

The parameter DB 807 stores, as model parameters, the reflection parameters of diffuse and specular reflection components that have been obtained by the parameter estimating section 806 and the shape information obtained by the shape information collecting section 805. FIG. 48 summarizes the model parameters that are stored in the parameter DB 307.

By performing these processing steps, the parameter estimating section 800 estimates the parameters of the diffuse and specular reflection components and stores the parameter information estimated in the parameter DB 807.

Next, the image synthesizer 801 shown in FIG. 35 will be described.

The viewpoint/light source information collecting section 808 collects information about the viewpoints and light sources of the image to be synthesized. To do that, the user may enter the viewpoint position, the position and illuminance of the light source, and ambient light component information. Optionally, if a CG image is rendered on a real world to produce an augmented reality, for example, light source information may be estimated using the light source information estimating section 804.

The rendering section 809 synthesizes the image in accordance with the viewpoint and light source information that has been obtained by the viewpoint/light source information collecting section 808 by using the model parameter information that is stored in the parameter DB 807. Specifically, the rendering section 809 performs rendering on a diffuse reflection component and a specular reflection component separately and then combines together the diffuse and specular reflection components that have been subjected to the rendering with the ambient light component information, thereby synthesizing the image.

First, the diffuse reflection component will be described. As described above, an albedo image is obtained by dividing the diffuse reflection component image by the inner product of a light source vector and an object's normal vector. That is why by applying the light source direction vector information that has been obtained by the viewpoint/light source information collecting section 808 to the albedo image (that has been estimated by the parameter estimating section 806 and) stored in the parameter DB and the shape information (that has been obtained by the shape information collecting section 805), a synthesized diffuse reflection component can be obtained. Specifically, the inner product of a light source direction vector that has been obtained by the viewpoint/light source information collecting section 808 and the object's normal vector is calculated and then multiplied by the albedo image, thereby obtaining a synthesized diffuse reflection component image. If information about multiple light sources has been input by the viewpoint/light source information collecting section 808, a diffuse reflection component image is synthesized with each of those light sources and their images are added together, thereby obtaining a single synthesized diffuse reflection component image.

Next, the specular reflection component will be described. A synthesized specular reflection component can be obtained by applying the light source direction vector information that has been obtained by the viewpoint/light source information collecting section 808 to the specular reflection parameter (that has been estimated by the parameter estimating section 806 and) stored in the parameter DB and the shape information (that has been obtained by the shape information collecting section 805). Specifically, by substituting the parameters that are estimated by Equations (36) to (44), a synthesized specular reflection component image is produced.

By synthesizing together the diffuse reflection component image, the specular reflection component image and the ambient light component information that has been obtained by the viewpoint/light source information collecting section 808, the rendering section 809 produces a synthesized image in accordance with the viewpoint and light source information that has been obtained by the viewpoint/light source information collecting section 808.

As described above, by applying the image processing techniques of the present invention, a model-based image synthesis, which can be used in digital archiving, for example, can be done highly accurately.

INDUSTRIAL APPLICABILITY

According to the image processing techniques of the present invention, specular and diffuse reflection components can be separated from each other more accurately by using polarization information and color information as two different kinds of information. Since such image separation processing can be done even on an image that has been captured as a snapshot, the present invention can be applied effectively to various types of digital still cameras, digital movie cameras, and surveillance cameras.

REFERENCE SIGNS LIST

101 light projecting section
102 color and polarization obtaining section
103 color information processing section
104 polarization information processing section
105 light source color information collecting section
106 image component separating section
107 projector
108 image processing apparatus
109 communication section
110 communication section

The invention claimed is:

1. An image processing apparatus for capturing an object's image and separating the object's image into multiple components, the apparatus comprising:
    a light projecting section for projecting linearly polarized light, which has been emitted from a light source, toward the object;
    a color and polarization obtaining section for getting a color polarized image of the object;
    a polarization information processing section for generating color and polarization information based on an association between the intensity of the light that has been transmitted through a polarizer with three or more polarization principal axis directions and the polarization principal axis directions for each of unit pixels that form the color polarized image;
    a light source color information collecting section for collecting color information of the light source; and
    an image component separating section for separating the image into multiple components based on the color and polarization information and the color information of the light source.

2. The image processing apparatus of claim 1, comprising a color information processing section for generating a color image based on the color polarized image,
    wherein the image component separating section separates the color image into multiple components.

3. The image processing apparatus of claim 1, wherein the color and polarization obtaining section includes:
    a polarizer that has three or more different polarization principal axis directions;
    a color filter, which is arranged so as to face the polarizer; and
    an image sensor that receives light that has been transmitted through the polarizer and the color filter.

4. The image processing apparatus of claim 3, wherein the polarization information processing section generates at least one of a polarization minimum color component and a polarization amplitude color component as the color and polarization information.

5. The image processing apparatus of claim 4, wherein the image component separating section separates the color vector of each of the pixels that form the object's image into a diffuse reflection component and a specular reflection component.

6. The image processing apparatus of claim 4, wherein the image component separating section separates the color vector of each of the pixels that form the object's image into a diffuse reflection non-polarized component, a diffuse reflection polarized component and a specular reflection polarized component.

7. The image processing apparatus of claim 5, wherein the image component separating section separates at least a portion of the object's image as a shadow area.

8. The image processing apparatus of claim 5, wherein the image component separating section separates the color and polarization information into the respective color vectors of the light source and the polarization minimum color component.

9. The image processing apparatus of claim 8, wherein the image component separating section separates the polarization amplitude color component into the respective color vectors of the light source and the polarization minimum color component.

10. The image processing apparatus of claim 5, wherein the image component separating section separates the color image into the respective color vectors of the light source and the polarization minimum color component.

11. The image processing apparatus of claim 1, wherein the color and polarization obtaining section performs synchronized processing with the light projecting section.

12. The image processing apparatus of claim 3, characterized in that the light projecting section is arranged separately from the color and polarization obtaining section.

13. An image processing system that comprises a projector and an image processing apparatus and that captures an object's image and separates the object's image into multiple components,
wherein the projector includes a light projecting section for projecting linearly polarized light, which has been emitted from a light source, toward the object, and
wherein the image processing apparatus includes:
a color and polarization obtaining section for getting a color polarized image of the object by receiving light that has been transmitted through a polarizer with three or more different polarization principal axis directions at a color filter;
a color information processing section for generating a color image based on the color polarized image;
a polarization information processing section for generating color and polarization information based on an association between the intensity of the light that has been transmitted through the polarizer and the polarization principal axis directions for each of unit pixels that form the color polarized image;
a light source color information collecting section for collecting color information of the light source; and
an image component separating section for separating the color image into multiple components by reference to the color and polarization information and the color information of the light source.

14. An image processing system that comprises a projector and an image processing apparatus and that captures an object's image and separates the object's image into multiple components,
wherein the projector includes:
a light projecting section for projecting linearly polarized light, which has been emitted from a light source, toward the object; and
a communication section for transmitting a signal indicating projection of light to the image processing apparatus, and
wherein the image processing apparatus includes:
a communication section for receiving the signal indicating the projection of the light from the projector;
a color and polarization obtaining section for getting a color polarized image of the object by receiving light that has been transmitted through a polarizer with three or more different polarization principal axis directions at a color filter;
a color information processing section for generating a color image based on the color polarized image;
a polarization information processing section for generating color and polarization information based on an association between the intensity of the light that has been transmitted through the polarizer and the polarization principal axis directions for each of unit pixels that form the color polarized image;
a light source color information collecting section for collecting color information of the light source; and
an image component separating section for separating the color image into multiple components by reference to the color and polarization information and the color information of the light source.

15. The image processing system of claim 14, wherein the communication sections exchange not only the signal indicating projection of the light but also the color information of the light source, and wherein the light source color information collecting section obtains the color information of the light source from the communication sections.

16. An image processing method for capturing an object's image and separating the object's image into multiple components, the method comprising the steps of:
projecting linearly polarized light, which has been emitted from a light source, toward the object;
getting a color polarized image of the object by receiving light that has been transmitted through a polarizer with three or more different polarization principal axis directions at a color filter;
processing color information to generate a color image based on the color polarized image;
processing polarization information to generate color and polarization information, which is color information about the polarized light received, based on an association between the intensity of the light that has been transmitted through the polarizer and the polarization principal axis directions for each of unit pixels that form the color polarized image;
collecting color information of the light source; and
separating the color image into multiple components by reference to the color and polarization information and the color information of the light source.

17. A program stored on a non-transitory machine-readable medium for use in an image processing apparatus that captures an object's image and separates the object's image into multiple components,
wherein the program, when executed by a computer, carries out the respective processing steps of the image processing method of claim 16.

18. A model-based image synthesizing apparatus that comprises a parameter estimator and an image synthesizer and that synthesizes an images,
wherein the parameter estimator includes:
an image capturing section for capturing an object's image;
an image separating section for separating the image that has been captured by the image capturing section into multiple components by the image processing method of claim 16;
a light source information estimating section for estimating light source information including information about at least one of the direction, position, intensity, color and spectrum of a light source that irradiates the object;

a shape information collecting section for obtaining, as shape information, information about a normal to the object's surface or information about its three-dimensional position;

a parameter estimating section for estimating a reflection model parameter by modeling the light source information that has been estimated by the light source information estimating section and the shape information that has been obtained by the shape information collecting section for each of the multiple components that have been separated by the image separating section with respect to the object's image captured; and a parameter DB for storing the reflection parameter that has been estimated by the parameter estimating section, and wherein the image synthesizer includes:

a viewpoint/light source information collecting section for obtaining information about the viewpoints and light sources of an image to be synthesized; and a rendering section for synthesizing the image in accordance with the viewpoint and light source information that has been obtained by the viewpoint/light source information collecting section by using the reflection parameter that is stored in the parameter DB.

19. A model-based image synthesizing method that comprises a parameter estimating step and an image synthesizing step and that is used to synthesize an image, wherein the parameter estimating step includes:

an image capturing step for capturing an object's image;

an image separating step for separating the image that has been captured by the image capturing section into multiple components by the image processing method of claim 16;

a light source information estimating step for estimating light source information;

a shape information collecting step for obtaining, as shape information, information about a normal to the object's surface or information about its three-dimensional position; and a parameter estimating step for estimating a reflection model parameter for each of the multiple components that have been separated by the image separating section with respect to the object's image captured, wherein the image synthesizing step includes the steps of:

a viewpoint/light source information collecting step for obtaining information about the viewpoints and light sources of the an image to be synthesized; and a rendering step for synthesizing the image in accordance with the viewpoint and light source information that has been obtained in the viewpoint/light source information collecting step by using the reflection parameter that has been estimated in the shape information collecting step.

* * * * *